United States Patent [19]

Mallgren et al.

[11] Patent Number: 5,490,241
[45] Date of Patent: Feb. 6, 1996

[54] INTERACTIVE COMPUTER GRAPHICS SYSTEM FOR MAKING PRECISE DRAWINGS

[75] Inventors: William R. Mallgren; Janaia M. Donaldson, both of Nevada City, Calif.

[73] Assignee: Xerox Corporation, Stamford, Conn.

[21] Appl. No.: 573,085

[22] Filed: Aug. 24, 1990

Related U.S. Application Data

[63] Continuation-in-part of Ser. No. 417,521, Oct. 6, 1989, abandoned.

[51] Int. Cl.⁶ ................................. G06T 11/20
[52] U.S. Cl. .................. 395/140; 395/155; 395/141; 395/142
[58] Field of Search ...................... 395/133, 140, 395/141, 142, 143, 155, 161

[56] References Cited

U.S. PATENT DOCUMENTS

| | | | |
|---|---|---|---|
| 4,835,528 | 5/1989 | Flinchbaugh | 345/159 |
| 5,237,647 | 8/1993 | Roberts et al. | 395/119 |

FOREIGN PATENT DOCUMENTS

203324  12/1986  European Pat. Off. .

OTHER PUBLICATIONS

Sutherland, *Sketchpad: A Man–Machine Graphical Communication System*, Conf, Proc. Spring Joint Computer Conf. (1963).
Bier, *Snap–Dragging*, Siggraph 86 Proceedings, vol. 20, No. 4 Aug. 18–22, 1986, pp. 233–240.
Neuman, *Principles of interactive Computer Graphics*, McGraw–Hill, 1979.
Nielson et al, "Direct Manipulation Techniques for 3D Objects Using 2D Locator Devices", *Workshop on Interactive 3D Graphics*, 23 Oct. 1986, Chapel Hill, U.S., pp. 175–182.
AutoCad Release 10, Computer–Aided Engineering Journal, Apr. 1989, vol. 6(2):71.
Kargas, A. et al., *Interpretation of Engineering Drawings as Solid Models*, Computer–Aided Engineering Journal, Apr. 1988, vol. 5(2):67–78.
Mastering AutoCad (Second Edition), George Omura. Through Release 9 With AutoShade for 3–D Packed With Tips & Tricks. Pp. 444–457. (Sybex Inc., San Francisco, CA), 1988.
Xerox Pro Illustrator Reference (Version 2.0) pp.i—index–9. Xerox Corporation, El Segundo, CA (1988).

*Primary Examiner*—Heather R, Herndon
*Assistant Examiner*—Anton Fetting
*Attorney, Agent, or Firm*—Townsend and Townsend and Crew

[57] ABSTRACT

A computer-aided illustration system and method emulate the set of tools that are typically available to the traditional technical illustrator and also provide the user with the ability to easily create illustrations in various two-dimensional projections, including paraline and perspective projections. The techniques described include: (1) providing moving polar grids which restrict a drawing to a user-specified geometry; (2) combining arbitrary user-specified directional constraints with several types of gravity, in a manner which enables a user to easily create new objects in alignment with previously drawn objects; (3) interrelating constraint systems and geometries (as delineated in the polar grids) with gravity, thereby providing the user with an effortless way to create objects with complex geometric interdependencies; and (4) adapting tools from linear geometry to work in non-linear projection planes (paraline and perspective).

22 Claims, 50 Drawing Sheets

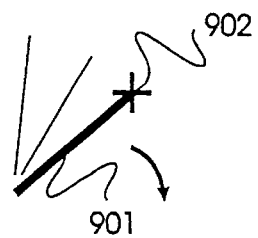 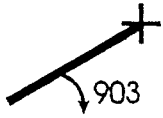 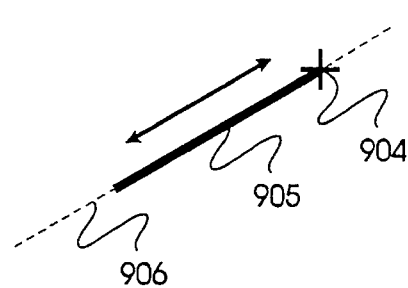
FIG. 9A        FIG. 9B        FIG. 9C
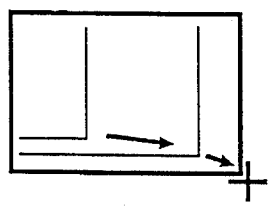 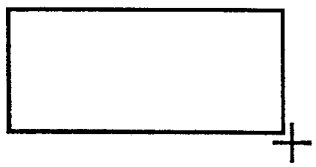 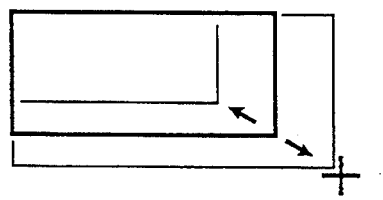
FIG. 9D        FIG. 9E        FIG. 9F
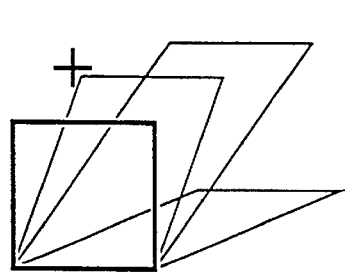 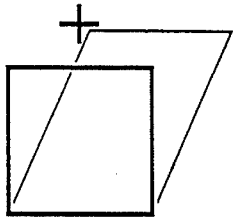 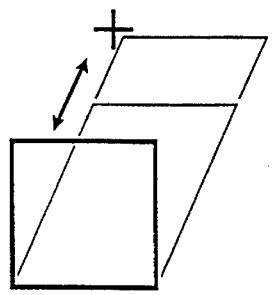
FIG. 9G        FIG. 9H        FIG. 9I

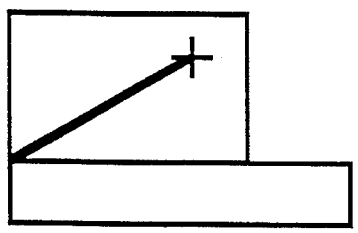
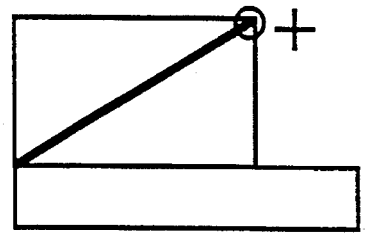
FIG. 12A         FIG. 12B
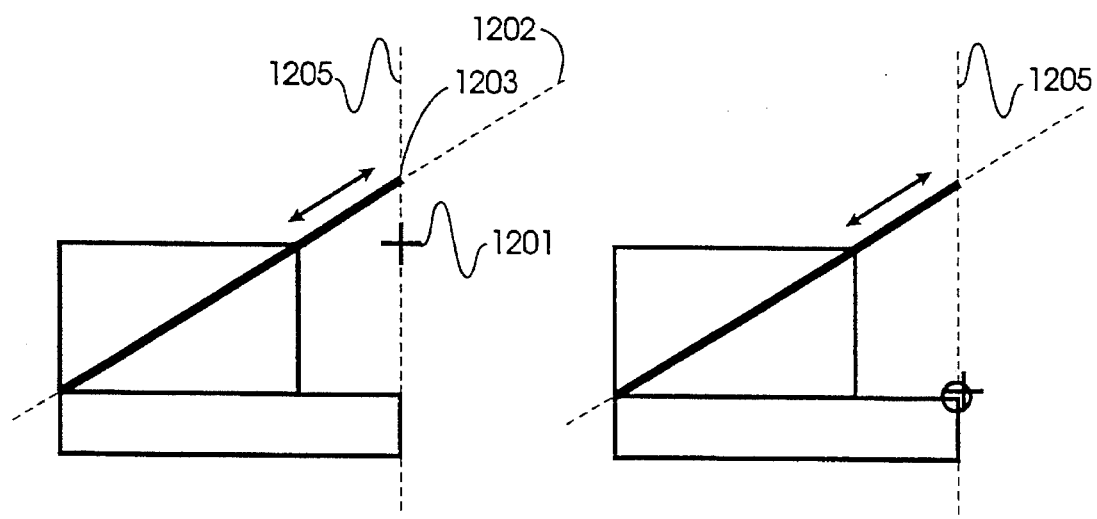
FIG. 12C         FIG. 12D

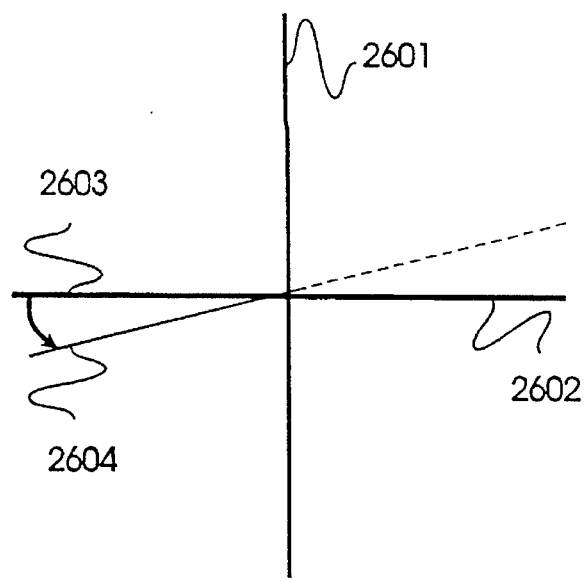
FIG. 26A
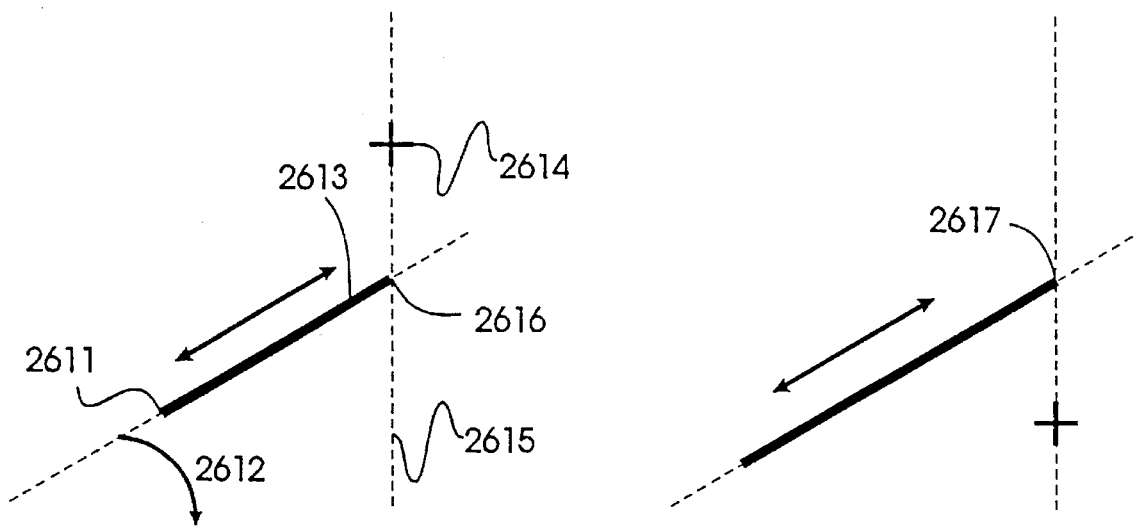
FIG. 26B
FIG. 26C

INTERACTIVE COMPUTER GRAPHICS SYSTEM FOR MAKING PRECISE DRAWINGS

The present invention is a continuation-in-part of application Ser. No. 07/417,521 filed on Oct. 6, 1989, now abandoned, the disclosure of which is incorporated herein by reference.

BACKGROUND OF THE INVENTION

This invention relates generally to interactive computer-aided illustration systems for making precise drawings of user-specified objects. Specifically, it relates to a system for emulating the drawing tools employed by draftsmen to create such drawings in various two-dimensional and three-dimensional geometries.

When creating technical illustrations by hand, graphic artists have traditionally relied upon standard drawing tools such as a compass, ruler, technical pen, french curve, and transfer screen. However, this system is inefficient and tedious for complex illustrations, especially when an artist is creating three-dimensional views of objects on two-dimensional display systems.

Computer-aided illustration systems have automated these tasks. These systems represent each element (lines, shapes, letter forms) as an independent object with its own attributes. In such a system, instead of creating an entire line by drawing continuously, as one would do by hand, the user plots only those points necessary to define the line. For example, the user places "anchor" and "control" points with a pointing device (such as a "mouse"). Next, the computer generates the object specified by these points. The real power of such object-based systems lies in their ability to rapidly create precise geometric images and to manipulate an image by maneuvering its control points.

Typically, computer-aided illustration systems provide the artist with a set of simple drawing tools or graphic primitives from which he or she may generate more complicated constructs. The geometric relation between the individual elements in a drawing may be critical, yet an artist's hand can rarely achieve the mathematical precision of a computer-based illustration system. Thus special cursor-positioning techniques were developed.

For example, Sutherland describes a positioning technique based upon the use of a light pen (Sutherland, Sketchpad: A Man-machine Graphical Communication System, Proceedings—Spring Joint Computer Conference, 1963). In that implementation, a user aims a light pen at a picture part. The exact location of the light pen is ignored in favor of a "pseudo pen location" which is exactly on the part aimed at. If no object is aimed at, the pseudo pen location and actual pen location are identical. Thus this system compensates for the user's imprecise cursor placement by locking onto a point on the existing drawing.

Sutherland also describes a system of constraint satisfaction. Here a user is able to specify to the system mathematical conditions on previously drawn parts, which are automatically satisfied by the computer to make the drawing take the exact shape desired. In other words, a constraint is a rule that the input coordinates must obey.

There are several different types of constraint systems based on the solution of simultaneous equations. See, for example, Newman, Principles of Interactive Computer Graphics, McGraw-Hill, 1979. A common constraint is the "modular constraint" which forces the input point to lie on a stationary grid. In linear geometry, for example, the system displays a two-dimensional array of grid dots at user-specified intervals. Control points placed by the user are mapped to the nearest grid point. Thus, the grid guides the artist in the placement of control points. In contrast to this "fully constrained" grid, one may use a "partially constrained" grid. For example, a linear grid may be partially constrained either horizontally or vertically. In such a system, control points are confined to lie on grids which are either horizontal or vertical lines. Regardless of the type, grids are characteristically easy to implement and learn. Nevertheless, the grid system only provides a limited degree of the exactness required for precision drawings. Additional constraints must usually be superimposed on such systems.

"Directional constraints" force input points to lie along user-specified lines. For example if a system is horizontally constrained, only horizontal lines may be drawn. While constraint-oriented systems have the power to achieve many different types of precision, still further types of drawing aids have been developed for use in lieu of, or in addition to, constraints.

Bier discloses "gravity-active" points and "alignment objects." See, Bier, Snap-Dragging, SIGGRAPH '86 Proceedings, Vol. 20, No. 4, Aug. 18–22, 1986, 233–240. Bier's concept, as embodied in the Gargoyle system, made use of a "caret." While the cursor always moves with the mouse, the caret "snaps" to gravity-active points. Control points are placed at the position of the caret. Gargoyle includes gravity at object edges and at intersections of objects. Object edge gravity provides snap along the outline of an object. Intersection gravity occurs at the intersections of object lines or outlines.

Alignment objects are visible construction aids that emulate the draftsman's tools, such as a ruler and compass. The user requests the construction of alignment objects in two steps. First, the user identifies those vertices and segments in the scene at which the alignment lines should be constructed; these are now "hot." Next the user specifies a drawing command, for example, lines. Gargoyle combines the vertices and segments made "hot" with others suggested by heuristics. The resulting vertices and segments are called "triggers" which may trigger the construction of alignment objects.

While grid and constraint systems have been recently implemented in non-linear angular geometry, present systems are still of limited usefulness for drawing two-dimensional views of three dimensional objects. For example, Xerox Pro Illustrator (version 2.0) provides a limited moving grid system for angular geometries. The angular grid is a polar grid with axes at evenly spaced fixed angles. The origin lies at the last control point placed by the user. The next control point is constrained to lie on a grid axis. The control points may be further constrained to fixed intervals on the axes.

Directional constraints are used in the Xerox Pro Illustrator (version 2.0), as in other systems, to further constrain or confine the drawing area. The system can be "horizontally constrained" so that a control point may only be placed if it is horizontally aligned with the prior control point, regardless of where the hardware cursor is located. Similarly, a vertically constrained control point would necessarily be vertically aligned with the preceding control point.

In Xerox Pro Illustrator (version 2.0) gravity is limited to control points. Control point gravity enables one to lock on to an object's control points. An ellipse, for example, has nine control points.

The limited moving grids, gravity, and directional constraints of Xerox Pro Illustrator (version 2.0) and other prior systems are useful for linear and angular geometries, but these tools are still not ideally suited for drawing common two-dimensional representations of three-dimensional objects, such as paraline and perspective projections. There is a need for a computer-aided illustration system which provides a consistent geometric orientation permitting the user to easily create illustrations of different geometries on two-dimensional surfaces.

SUMMARY OF THE INVENTION

In this interactive computer graphics system, the user "draws" on a display with a pointing device, such as a mouse. The invention emulates the set of tools which are typically available to the traditional graphic artist, such as a ruler and a compass.

Recognizing the need for a computer-aided illustration system which provides a consistent geometric orientation permitting the user to easily create illustrations of different geometries on two-dimensional surfaces, the present invention provides different control techniques for creating and editing user-specified objects in linear, angular, paraline and perspective geometries. The techniques include: (1) providing special moving polar grids which restrict a drawing to a user-specified geometry; (2) combining arbitrary user-specified directional constraints with several types of gravity, in a manner which enables a user to easily create new objects in alignment with previously drawn objects; (3) interrelating constraint systems and geometries (as delineated in the special grids) with gravity, thereby providing the user with an effortless way to create objects with complex geometric interdependencies; and (4) adapting tools from linear geometry to work in non-linear projection planes (paraline and perspective).

BRIEF DESCRIPTION OF THE DRAWINGS

FIGS. 2A and 2C are stationary grids, while FIGS. 2B, 2D, 2E, and 2F are moving grids.

FIGS. 9A–9I illustrate how lock angle constraint is used to create different geometric objects.

FIGS. 12A, 12B, 12C, and 12D illustrate the use of vertical alignment with a lock angle.

FIGS. 26A–C illustrate how the GetFarthestAngle procedure operates.

DETAILED DESCRIPTION OF THE PREFERRED EMBODIMENT

Introduction

Figure 1:
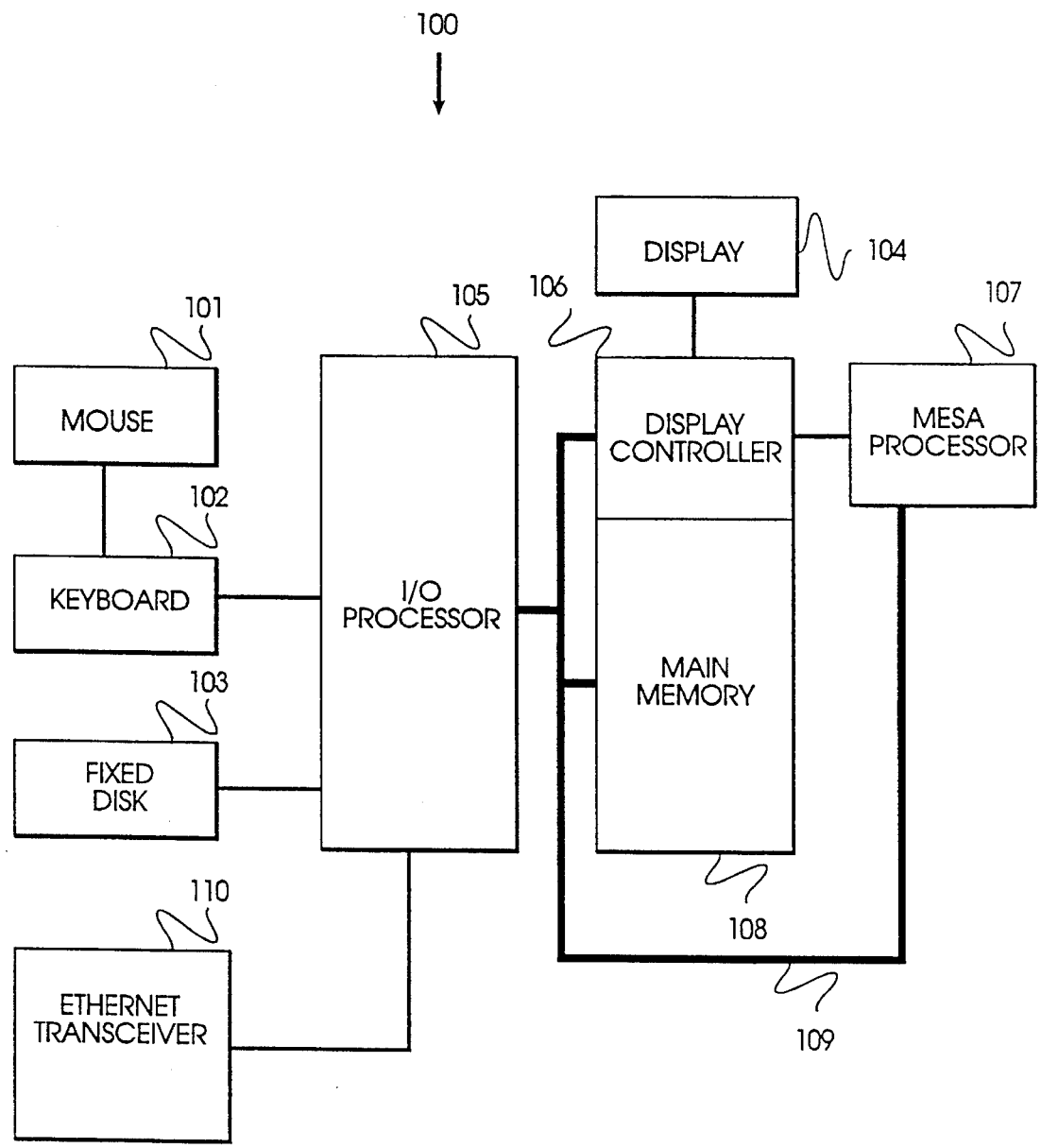
FIG. 1 is a simplified functional block diagram of a computer system in which the present invention may be embodied.

The invention can be embodied on a computer system, such as system 100 of FIG. 1, comprising a central processor 107, a main memory 108, a cursor-control device or mouse 101, a keyboard 102, a fixed disk 103, a display monitor 104 with a controller 106, and an I/O processor 105. The various components communicate through a system bus 109 or similar architecture. The user enters commands and data with keyboard 109 and/or mouse 107. Computer system 100 communicates results through display device 104, such as a cathode-ray tube or a printer. Communication with other systems can be accomplished by an Ethernet transceiver 110 coupled to I/O processor 105. In the preferred embodiment, an appropriately programmed Xerox 6085 workstation (Xerox Corporation, Rochester, N.Y.) is used.

System 100 provides the user with a choice among several geometric modes. A geometric mode is an underlying state the system is in, providing a consistent geometric orientation for drawing and editing. Grids are provided to represent a particular geometry and to provide a set of geometric constraints, i.e., angles and distances for the specified geometry. The four basic geometries are: linear, angular, paraline, and perspective.

Figure 2A:
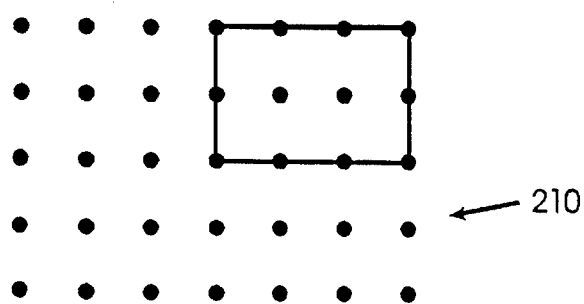
FIGS. 2A–F demonstrate the different types of grids that are available in the system.
Figure 2B:
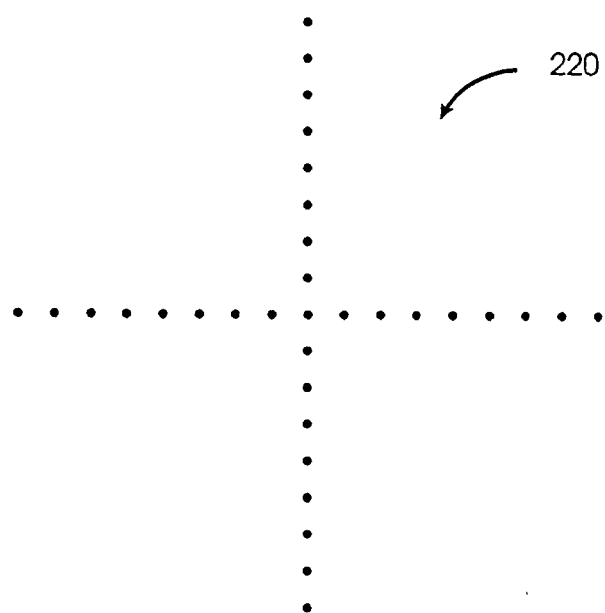
Figure 2C:
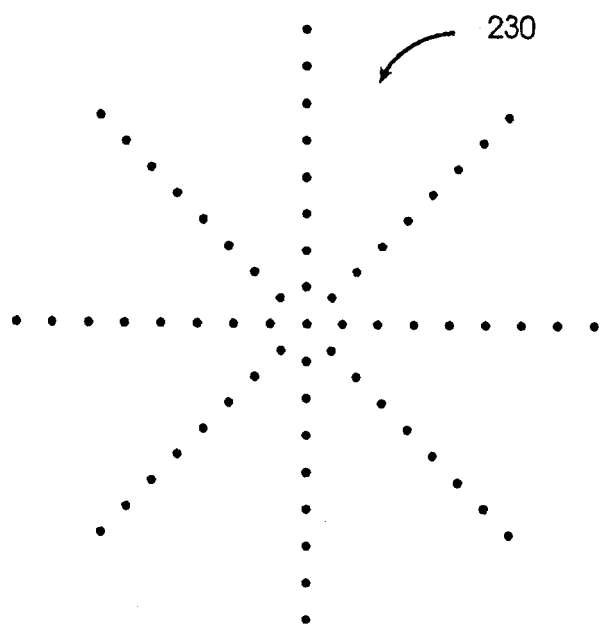
Figures 2D, 2E, 2F:
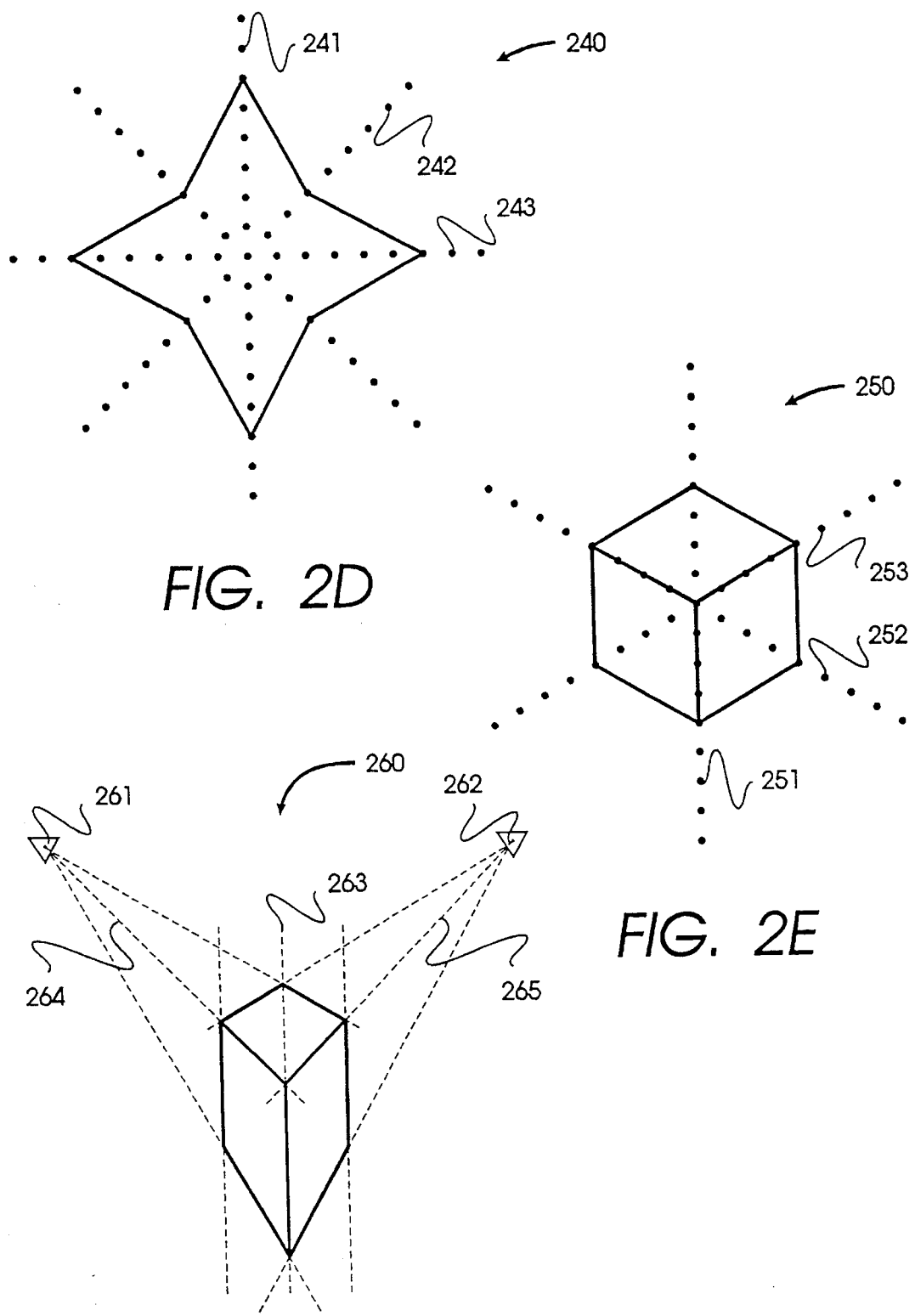

In the preferred embodiment, system 100 provides a choice among two stationary grids 210, 230 seen in FIGS. 2A and 2C. Stationary linear grid 210 is the familiar cartesian coordinate system. Stationary polar grid 230 is the polar-coordinates version of stationary linear grid 210.

System 100 also provides four different moving grids, seen in FIGS. 2B, 2D, 2E, and 2F: linear 220, angular 240, paraline 250, and perspective 260. Moving linear grid 220 and moving angular grid 240 are similar to their stationary counterparts 210, 230. For example, moving polar grid 240 has a plurality of evenly-spaced, user-specified axes 241, 242, 243 just like stationary polar grid 230. However, the origins of moving grids move in response to control point placement.

The two remaining grids, paraline grid 250 and perspective grid 260, also have moving origins but have no stationary counterparts. Paraline grid 250 is defined by three axes 251, 252, 253 whose user-specified angles are not necessarily equal. Advantageously, these angles can correspond to the standard paraline projection angles (isometric, cabinet, military, etc.). Perspective grid 260 illustrates two vanishing points 261, 262 with one fixed vertical axis 263 and two changing angles 264, 265.

Figure 3A:
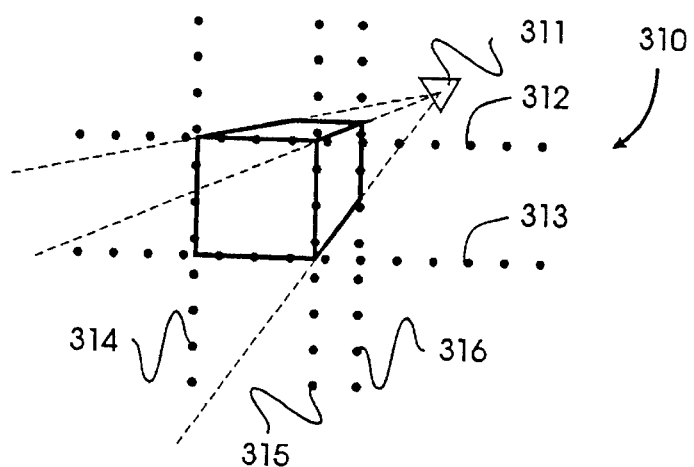
FIGS. 3A, 3B, and 3C demonstrate the three different types of perspective geometry.
Figure 3B:
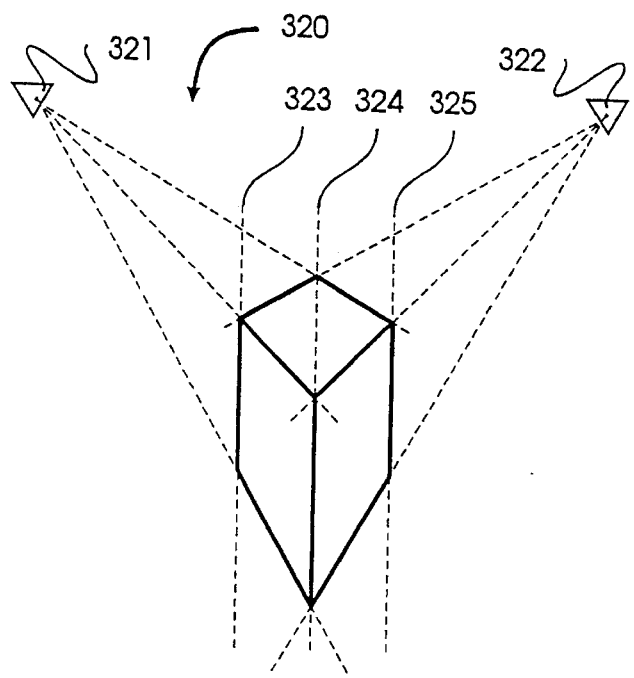
Figure 3C:
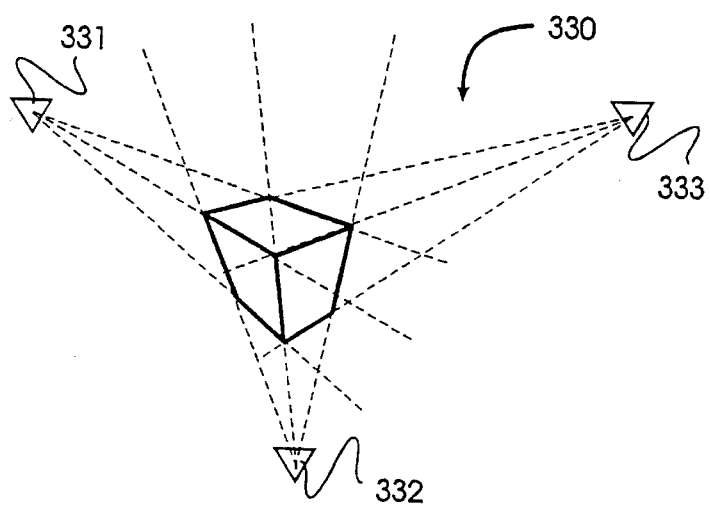

Since perspective geometry has either one, two, or three vanishing points, there are 0–2 fixed angles and 1–3 constantly changing angles which converge to the vanishing points. Referring to FIG. 3A–C, objects drawn in the perspective geometry are shown in parallel 310, angular 320, and oblique 330 perspectives. In parallel perspective 310, there is one vanishing point 311, and horizontal lines 312, 313 and vertical lines 314, 315, 316 remain parallel.

In angular perspective geometry 320, there are two vanishing points 321, 322, and vertical lines 323, 324, 325 remain parallel. In oblique perspective geometry 330, there are three vanishing points 331, 332, 333 and no parallel lines.

Figure 3D:
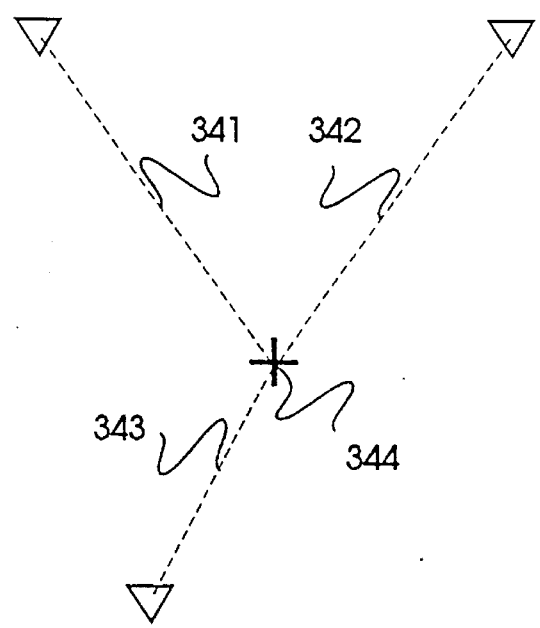
FIGS. 3D and 3E illustrate how the axes in oblique perspective geometry change when the hardware cursor is moved to a new position.
Figure 3E:
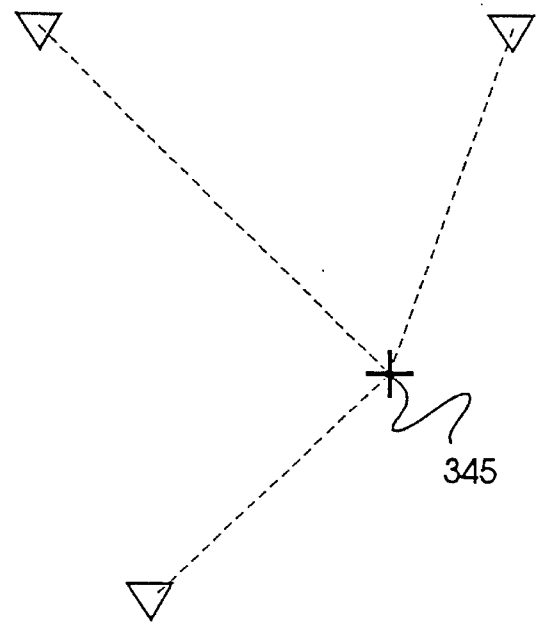
Figure 4A:
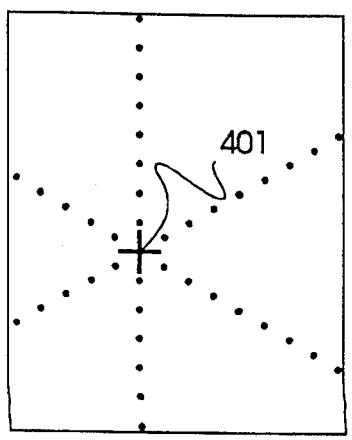
FIGS. 4A–4I indicate the utility of a moving grid for constructing a rectangle in paraline geometry.
Figure 4B:
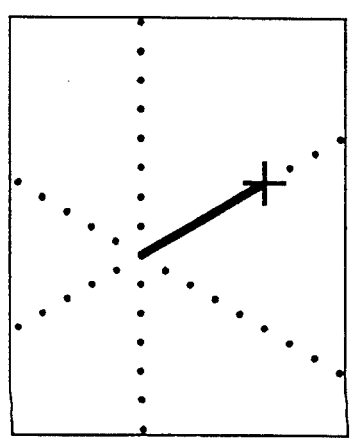
Figure 4C:
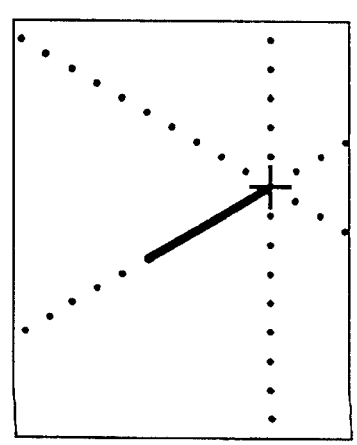
Figure 4D:
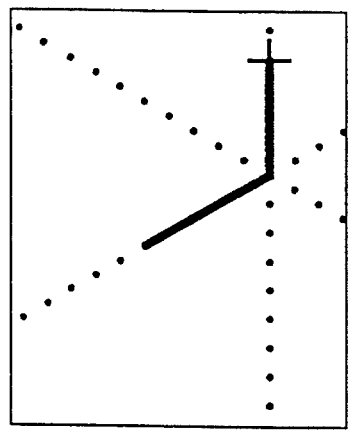
Figure 4E:
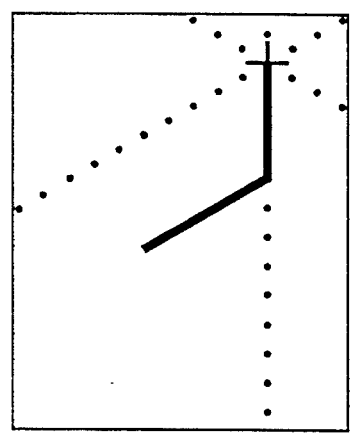
Figure 4F:
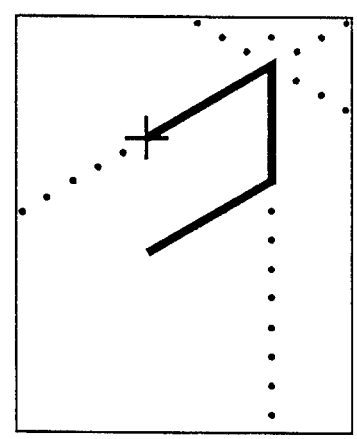
Figure 4G:
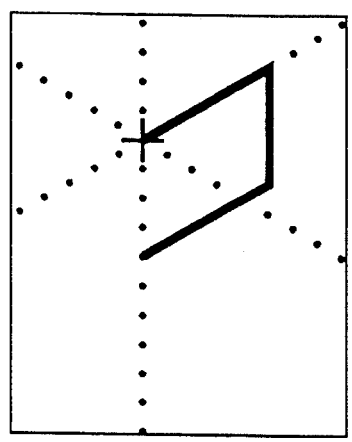
Figure 4H:
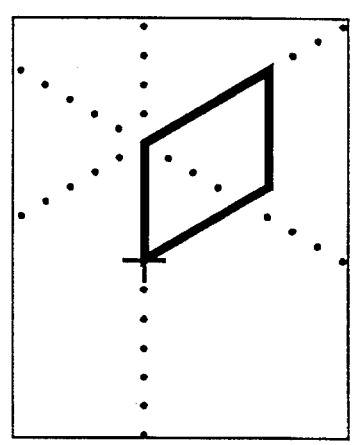
Figure 4I:
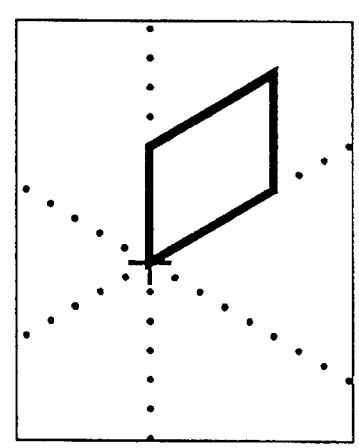

FIGS. 3D and 3E illustrate how the grid axes 341, 342, 343 change in an oblique perspective geometry as cursor 344 moves to a new location 345. There is a unique set of angles for each location.

A polar grid is more useful to the artist if the grid's origin is relative to where the artist is drawing, i.e., where the user has placed the last control point. This invention extends the idea of moving grids into all four geometries.

In a computer-aided illustration, the construction and transformation (e.g., stretch, shear, move, and flip) of objects is accomplished by the placement of control points. Referring to FIGS. 4A–4I, the user, when drawing, is free to move hardware cursor 401 to any point on the drawing surface (display 104). However, when the user places a control point, the position of hardware cursor 401 is translated into the nearest grid point. In other words, the user's control point is "gridded" to the nearest grid point. This simplifies the construction of objects which must maintain precise linear, angular, paraline, or perspective relationships. Thus, as shown in FIGS. 4A–I, the user can draw a rectangle in paraline geometry in a simple "connect-the-dot" manner by using moving grids provided by system 100.

Figure 5A:
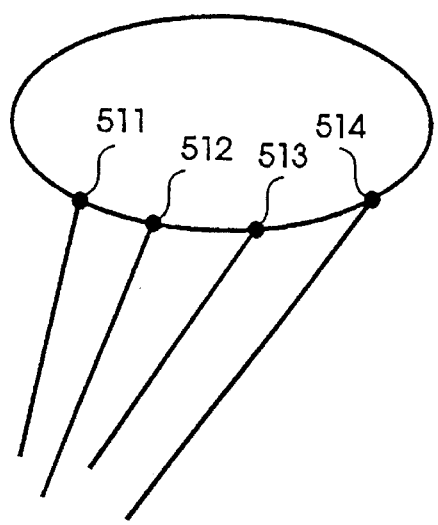
FIGS. 5A, 5B, and 5C illustrate the different types of gravity: object edge gravity, intersection gravity, and control point gravity.
Figure 5B:
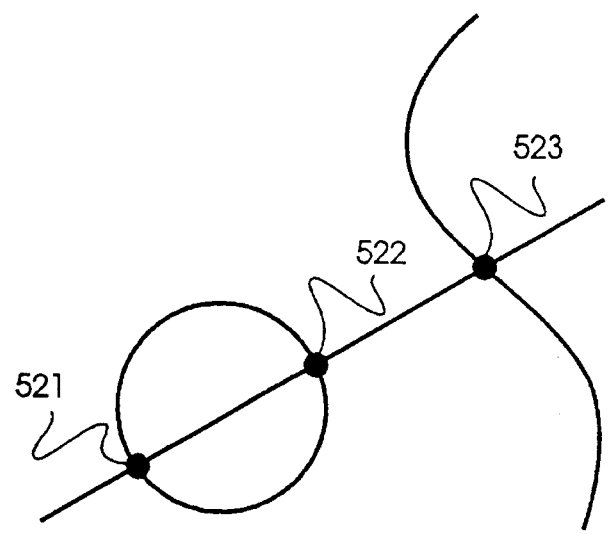
Figure 5C:
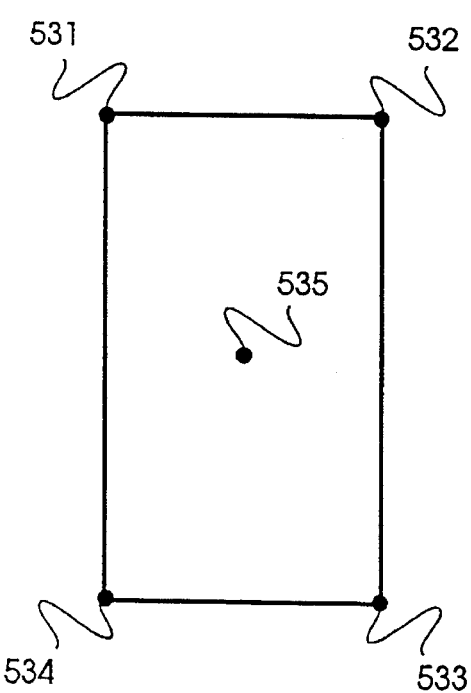

Referring to FIGS. 5A–C, in the preferred embodiment, gravity is active at objects edges 511, 512, 513, 514, at object intersections 521, 522, 523, and at control points 531, 532, 533, 534, 535. However, two new types of intersection gravity are defined: 1) intersections of objects with grid axes and 2) intersections of objects with constraint angles.

Figure 5D:
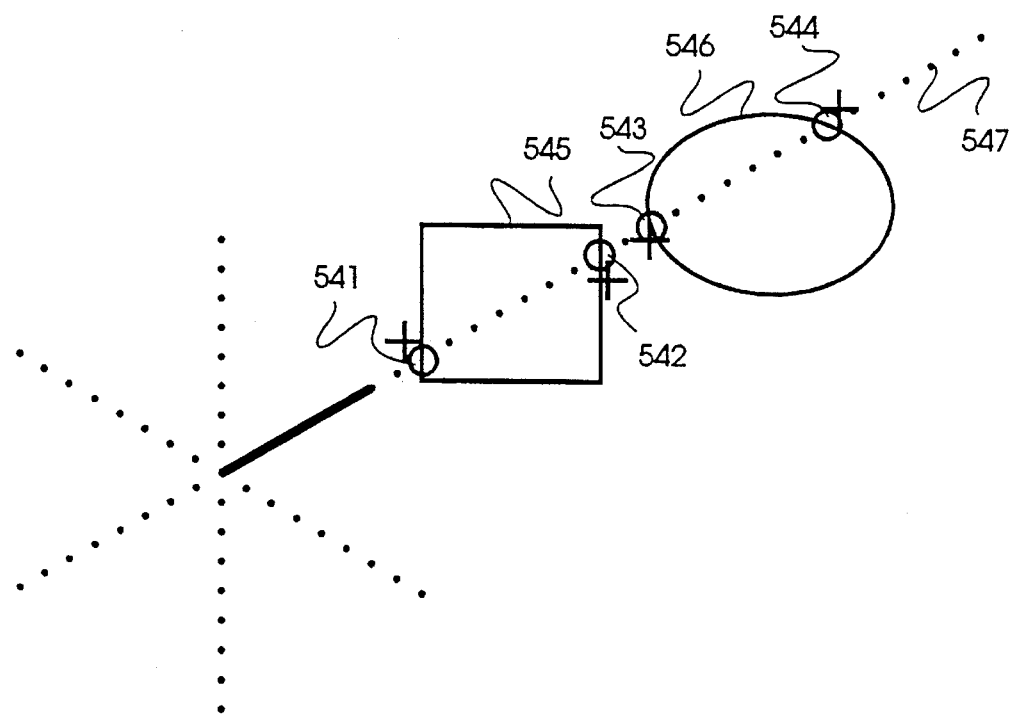
FIG. 5D illustrates the gravity points from an intersection of an object with a grid line.
Figure 5E:
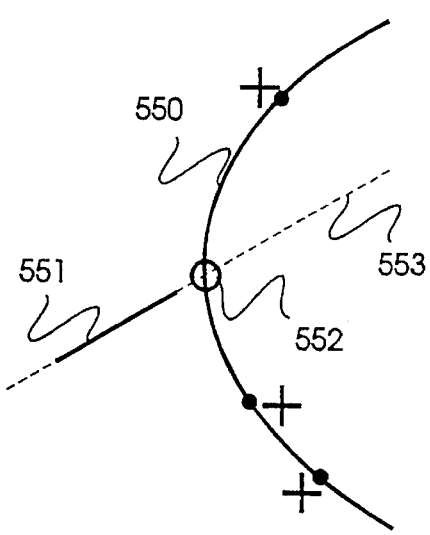
FIG. 5E illustrates that the intersection of a lock angle with an object has gravity which is greater than object edge gravity alone.

Referring to FIG. 5D, for example, gravity occurs at the intersections 541, 542, 543, 544 of objects 545, 546 with grid axis 547. Referring to FIG. 5E, gravity occurs at the intersection 552 of object 550 with constraint angle 553. Rubberbanding line 551 has been locked to constraint angle 553 and can snap onto the gravity of intersection 552.

In the preferred embodiment, gravity also combines with geometry and directional constraints to provide another dynamic drawing environment. The different kinds of gravities have different priorities. Likewise, the grids have a certain priority. Directional constraints (lock angle, horizontal, or vertical), supersede gravity and geometry, thereby constraining the placement of control points irrespective of the cursor location on a grid or gravity point.

Figure 6:
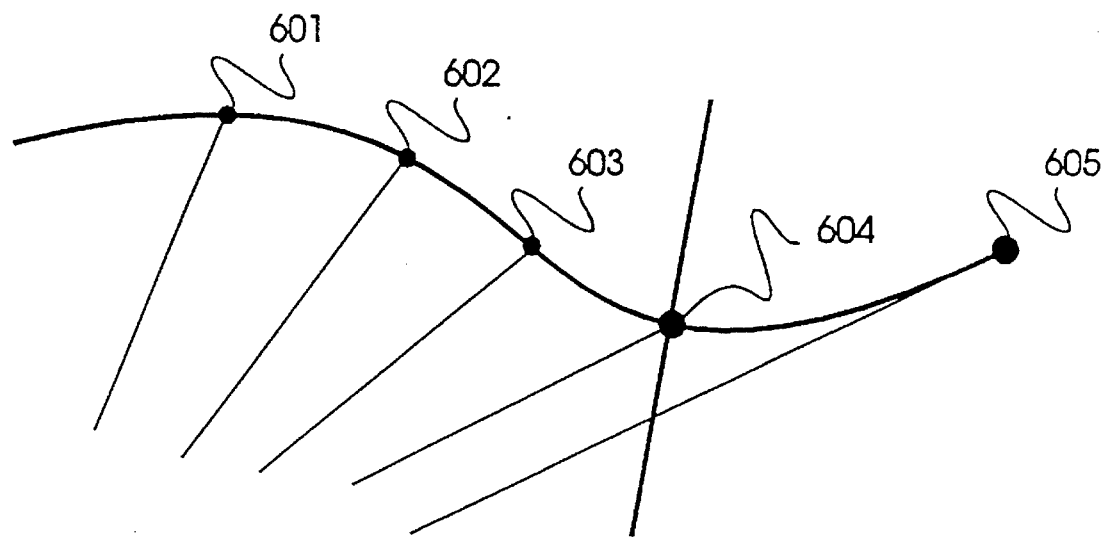
FIG. 6 illustrates the principle of gravity highlighting by showing the difference between intersection and object edge gravity.

Again referring to FIGS. 5D–E, the priority relationship of the different forms of gravity and grids is illustrated. For example, gravity to the intersection 541 of grid line 547 with object 545 supecedes gravity to either one (grid line 547 or object 545) alone. Likewise, intersection 552 of lock angle 553 and object 505 gives rise to a new gravity point which supercedes object edge gravity alone. In the preferred embodiment, the following priorities are defined (in descending order):

1) control point gravity 2) object intersection gravity 3) object gravity intersected with angle constraint direction 4) object gravity intersected with partial grid 5) object gravity Referring to FIG. 6, user feedback is illustrated. The relative priorities of gravity are partially conveyed to the user by gravity highlighting. The gravity along an object edge is shown as a small round dot 601, 602, 603, while intersection, endpoint, frame corner, and vanishing point gravity highlight as a large dot 604, 605. In the latter case, if the cursor is near, a large open circle is shown (e.g., 541, 542, 543, 544). Unlike grids, gravity will only attract the cursor if it is within a gravity field.

Figure 7A:
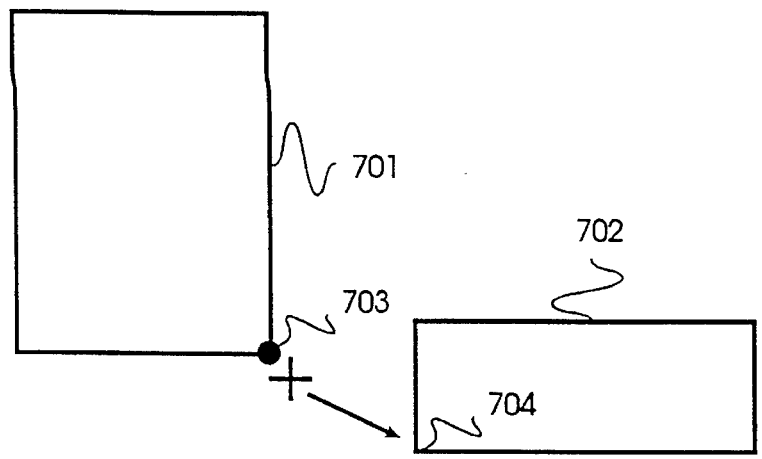
FIGS. 7A, 7B, and 7C illustrate the use of control point gravity to align two objects in a move transformation.
Figure 7B:
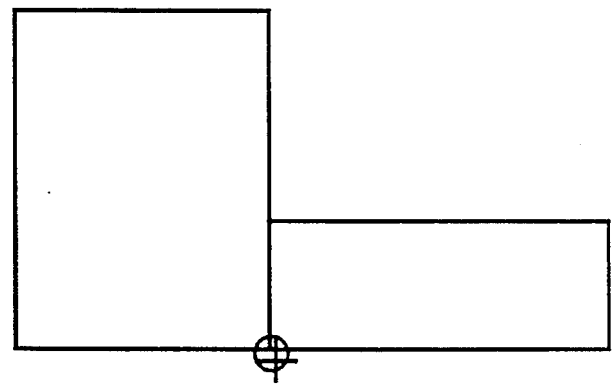
Figure 7C:
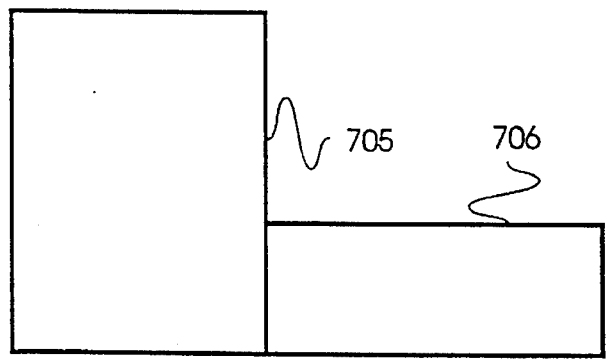
Figure 7D:
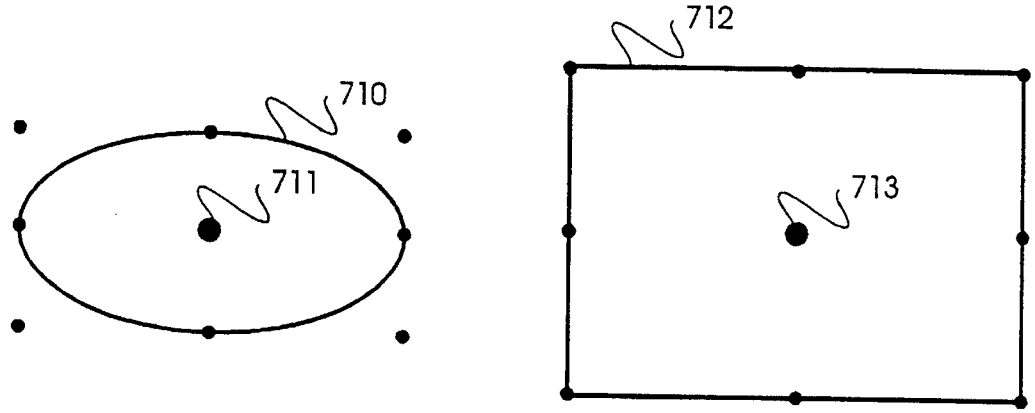
FIGS. 7D and 7E illustrate how two objects may be aligned by their centers using control point gravity.
Figure 7E:
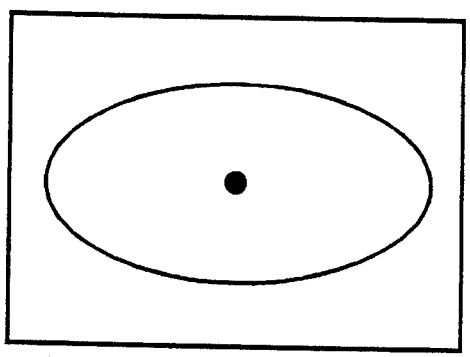

FIGS. 7A–E demonstrate the use of gravity. In FIG. 7A, the user chooses to precisely align the edge of one object 701 with that of another object 702. The user can do this by selecting object 701 by its corner 703. The user then specifies a "move" transformation and locks onto the corner 704 of object 702, using control point gravity. The completed transformation is seen in FIG. 7B. In FIG. 7C, system 100 has redrawn object 701 and object 702 as precisely aligned objects 705, 706. FIGS. 7D and 7E show how the user can also use control point gravity (centers 711, 713) to precisely center two objects 710, 712.

Figure 8A:
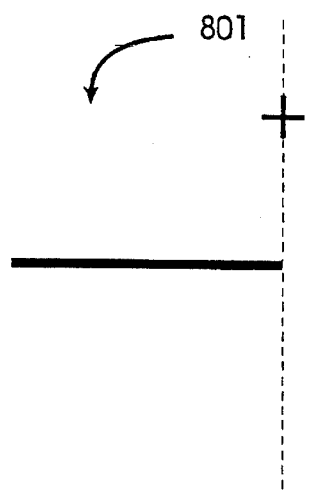
FIGS. 8A and 8B demonstrate horizontal and vertical constraints, respectively.
Figure 8B:
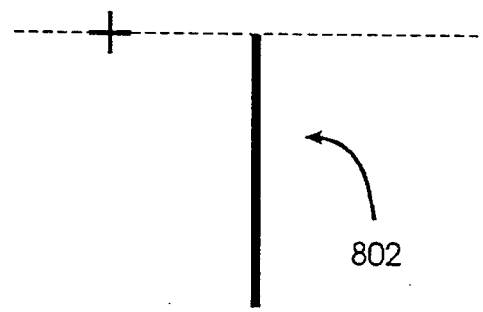
Figure 8C:
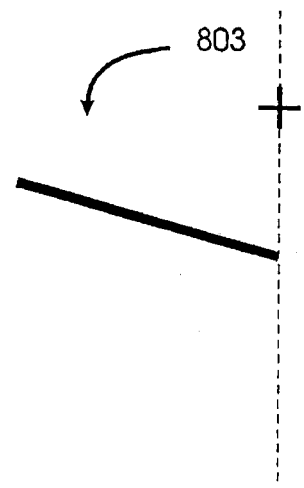
FIG. 8C illustrates the use of lock angle.

In the preferred embodiment, directional constraints are available in most drawing and editing modes. Referring to FIGS. 8A–C, the constraints available are: horizontal constraint 801, vertical constraint 802, and arbitrary, user-specified lock angle constraint 803, or no constraints.

Lock angle provides the user the ability to specify an angle and then have system 100 lock or constrain the control points to that angle. FIGS. 9A–I illustrate the advantages of this technique. In FIG. 9A, the user is freely moving the second control point 902 of line 901 ("rubberbanding"). In FIG. 9B, the user locks an arbitrary angle 903. FIG. 9C illustrates how the second control point 904 of line 905 must now lie on the temporary axis 906 of lock angle 903. This feature is extended to rectangle drawing in FIGS. 9D–F, and to shear transformation in FIGS. 9G–I.

Figure 10A:
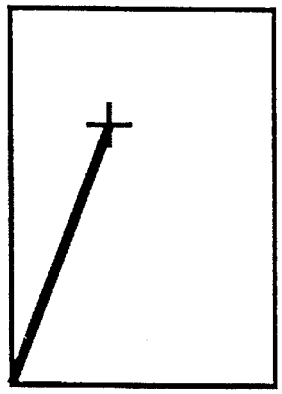
FIGS. 10A–10C illustrate how gravity is used to establish a lock angle.
Figure 10B:
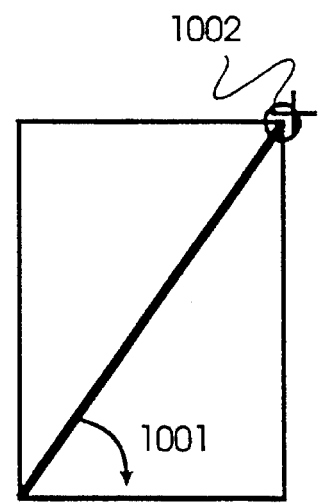
Figure 10C:
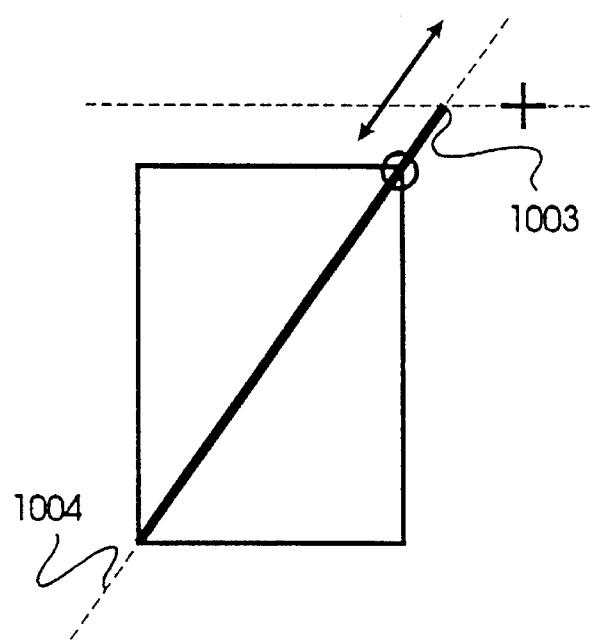
Figure 11A:
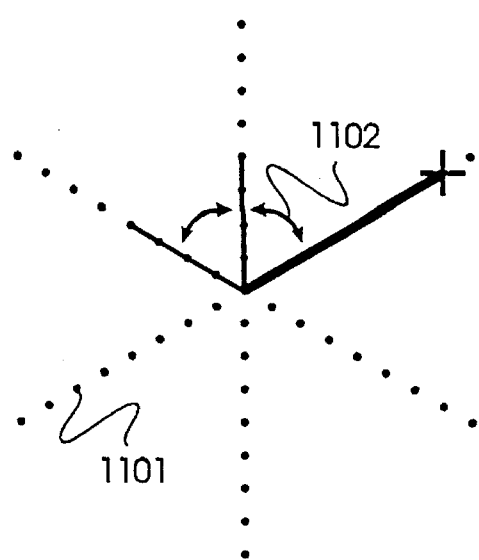
FIGS. 11A and 11B show how a lock angle is derived using geometry.
Figure 11B:
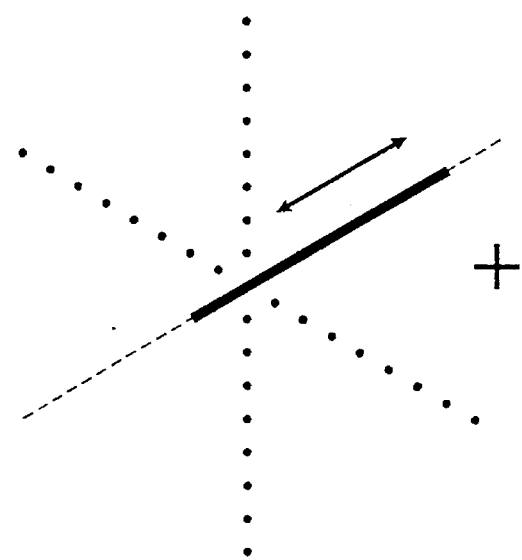

Referring to FIGS. 10A–C, the interplay of lock angle with gravity is shown. The user can establish an angle 1001 using gravity at point 1002 and then lock to that angle. Then a subsequent control point 1003 can only be placed using that lock angle. In other words, the control point 1003 must lie on a temporary axis 1004 whose angle to the horizontal axis is equal to the lock angle. User feedback is provided by an intransit or temporary image (e.g., rubberbanding line). In FIGS. 11A–B, the underlying geometry 1101 is used to establish a lock angle 1102.

As a further enhancement to lock angle technique, system 100 provides for the vertical and horizontal alignment of hardware cursors. Referring to FIGS. 12A–D, vertical alignment is demonstrated. In FIGS. 12A–B, the user establishes a lock angle using control point gravity. In FIGS. 12C–D, as cursor 1201 moves, line 1203 rubberbands such that it maintains vertical alignment (indicated by temporary axis 1205). While line 1203 is constrained by the lock angle, cursor 1201 is free to interact with other gravity points.

Figure 13:
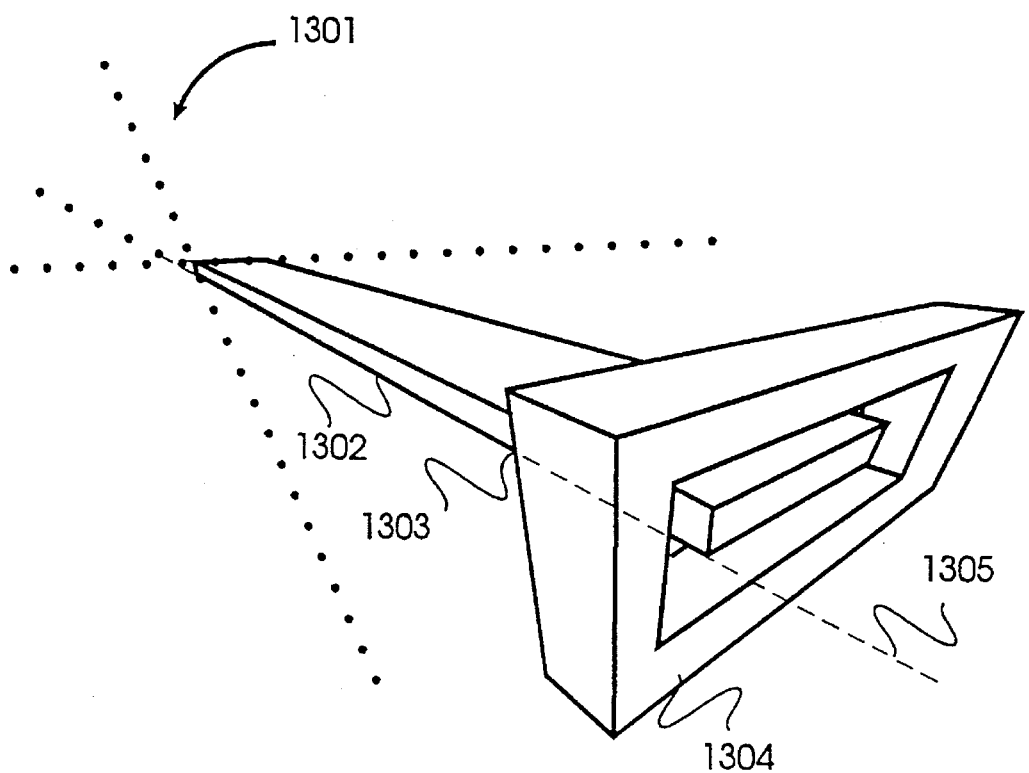
FIG. 13 shows a practical use of gravity from the intersection of a grid line and an object.

FIG. 13 shows how the combination of geometry and gravity can be used. Line 1302 is drawn by using perspective grid 1301 and gravitating to intersection 1303 of grid line 1305 with object 1304. The user can also use horizontal or vertical constraints to create an object whose control points are placed with the help of the interplay of gravity between an object and the geometry, and further constrained along a horizontal or vertical axis.

Figure 14A:
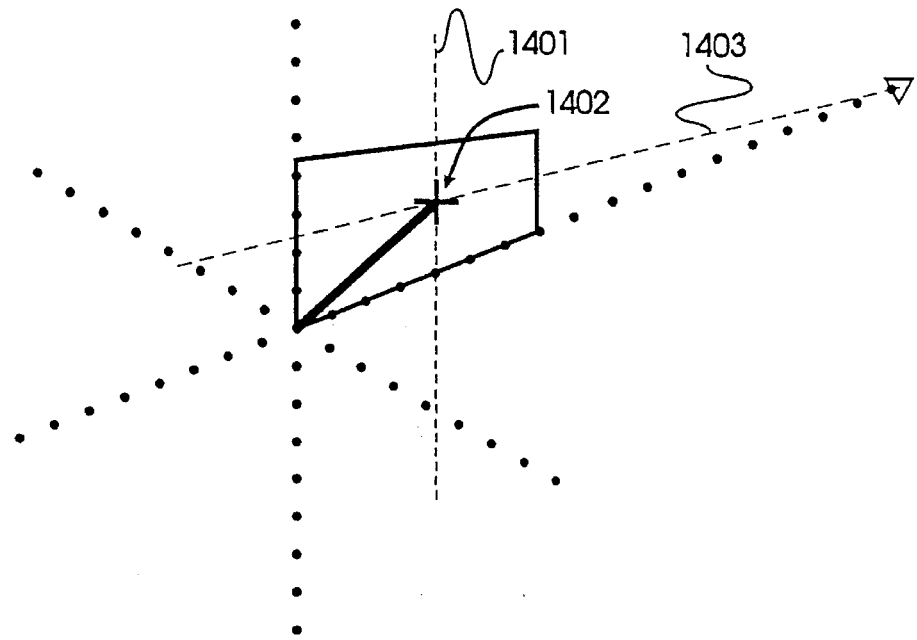
FIGS. 14A and 14B demonstrate the crosshairs in perspective geometry.
Figure 14B:
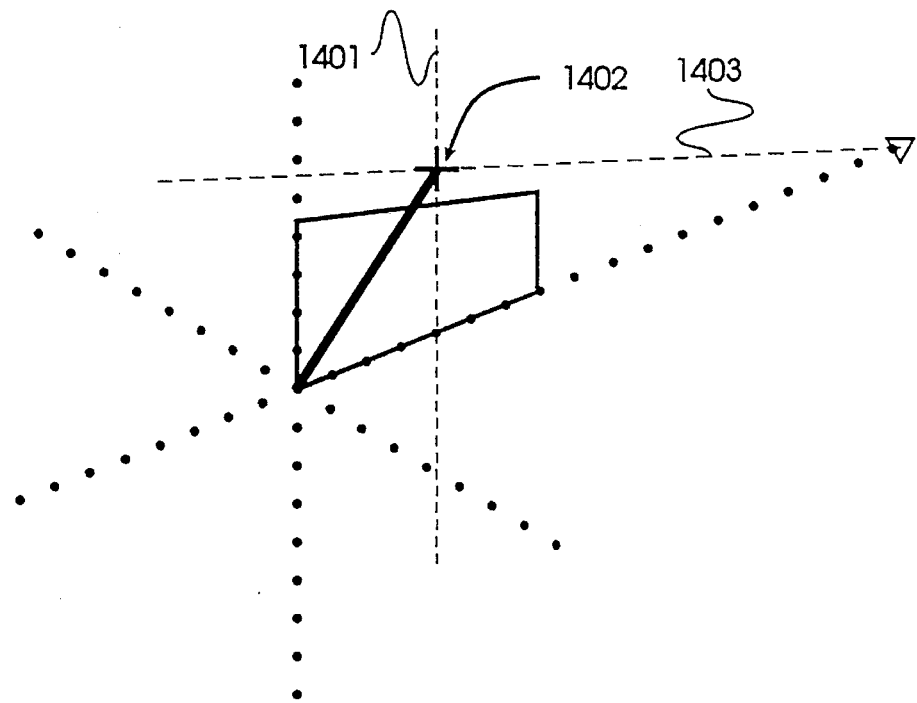

System 100 provides crosshairs (software cursor) which are indicative of the underlying geometry. FIGS. 14A–B demonstrate crosshairs 1402 that the user employs in perspective geometry. Note that vertical axis 1401 of crosshairs 1402 is fixed (one fixed angle), while the other axis 1403 is non-fixed (changing angle).

Referring to FIGS. 15A–H, the user can use the same drawing tools from linear (orthographics) geometry in paraline and perspective geometries. First, the user chooses a plane. For example, in FIGS. 15A—B, the user could specify to work in left face 1510 of a cube in paraline projection. At this point, the user is constrained to work only in the portion of the grid defining plane 1510. In other words, while the hardware cursor can move along any point on the drawing surface (display 104), the control points placed by the user are gridded to the nearest grid point on the selected plane.

Figure 15A:
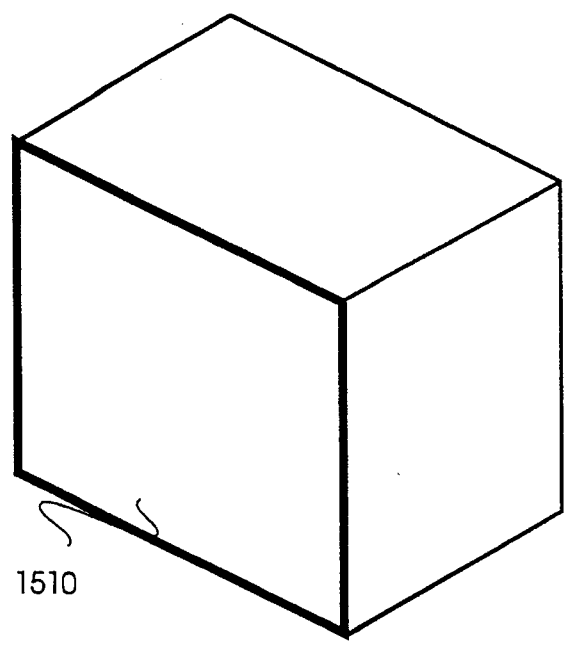
FIGS. 15A and 15B illustrate the use of linear drawing tools in a projection plane.
Figure 15B:
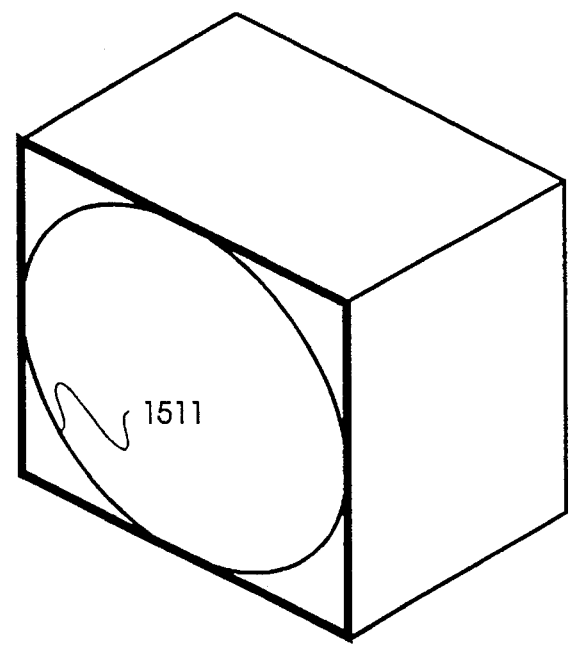

Next, the user selects the drawing tool that he or she wishes to use. FIG. 15B illustrates the use of the circle drawing tool. Since the control points of any drawn object are constrained to lie on user-specified plane 1510 (left face), circle 1511 itself will also lie on that plane. It should be apparent that the complex task of drawing objects in a projection plane is reduced to the simple task of specifying the plane and choosing the object that the user wishes drawn in that plane.

When working in a selected plane, the user still has access to the other features of this embodiment. Thus, the user might not only be constrained to a particular plane, but further be constrained horizontally and vertically relative to the selected geometry. The directional (horizontal or vertical) constraints can, thus, be used to control the placement of control points within a particular plane.

Figures 15C, 15D:
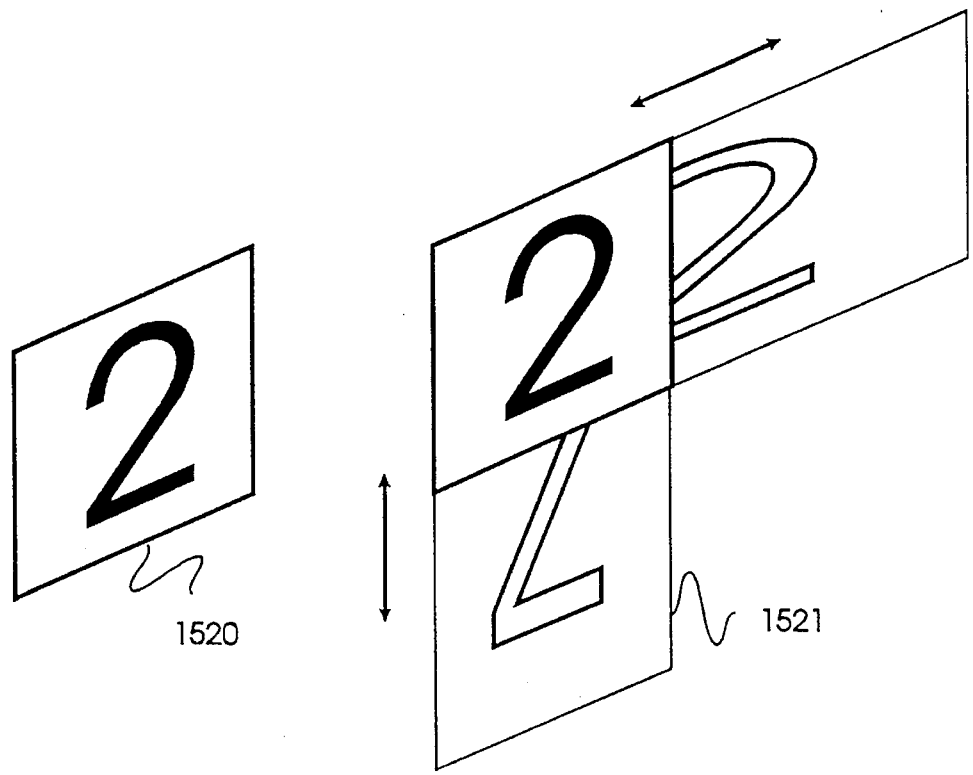
FIGS. 15C, 15D, and 15E demonstrate a stretch transformation in a projection plane while the system is vertically constrained.
Figure 15E:
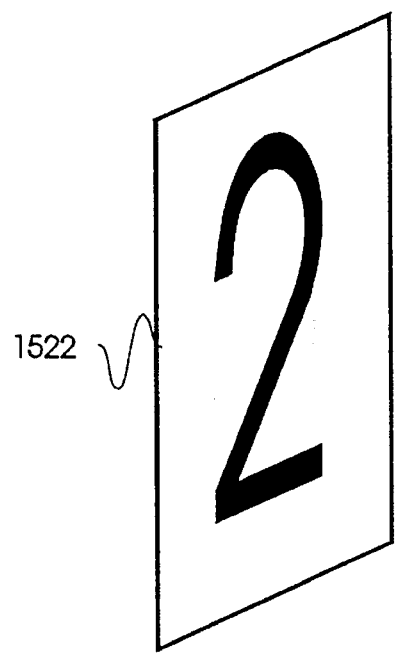

Moreover, the user can also perform transformations in a specified plane. Like object drawing, the transformation operations also require the placement of control points. Hence, when system 100 is constrained to one projection plane, any transformation that occurs must occur in that particular plane. Again the user can use the horizontal or vertical constraints to aid in the placement of the control points for the transformation in that specified plane. FIGS. 15C–E represent a "stretch" transformation while the user is working in projection plane 1520 and system 100 is vertically constrained. The user specifies a vertical constraint (indicated by the temporary image 1521), and then completes a stretch transformation 1522. In this embodiment, the transformations available are stretch, shear, flip, scale, rotate, and move.

Figure 15F:
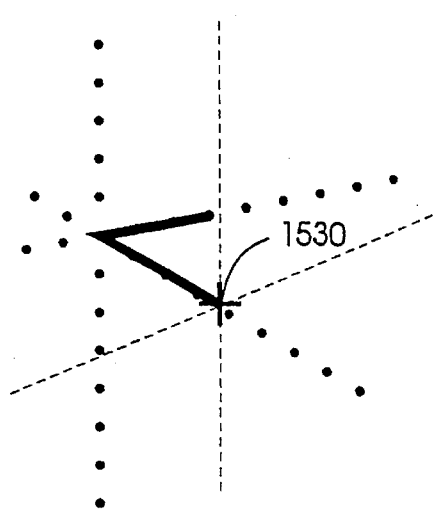
FIGS. 15F, 15G, and 15H demonstrate the use of alignment and perspective geometry.
Figure 15G:
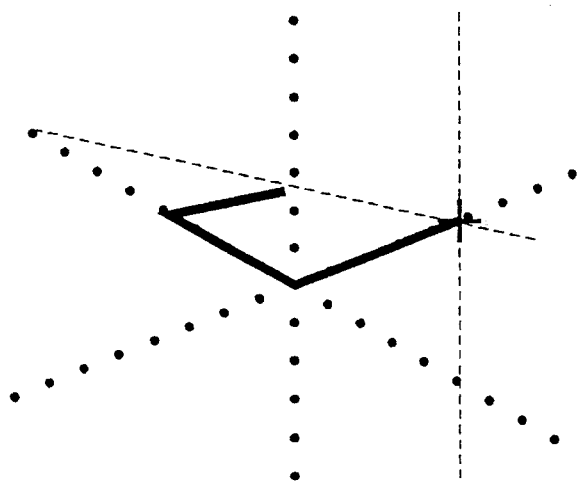
Figure 15H:
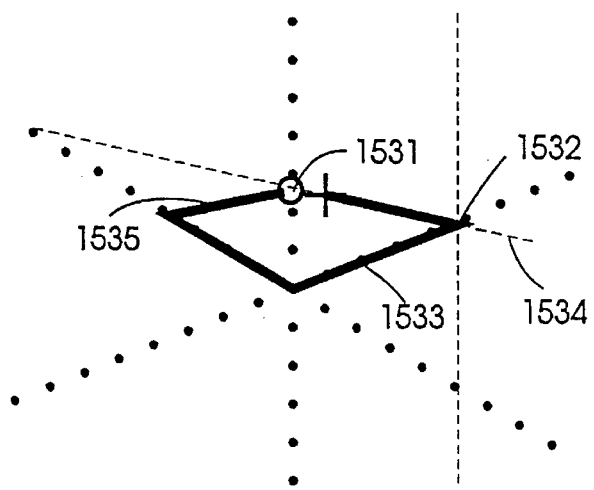

FIGS. 15F–H demonstrate the use of alignment when working in projection planes. The user can move hardware cursor 1530 to the endpoint 1531 of previously drawn line 1535 using control point (endpoint) gravity. Alignment line 1534 indicates that a control point at point 1532 is located in the user specified projection plane. Thus, both lines 1535, 1533 are parallel and aligned in perspective geometry.

Figure 16:
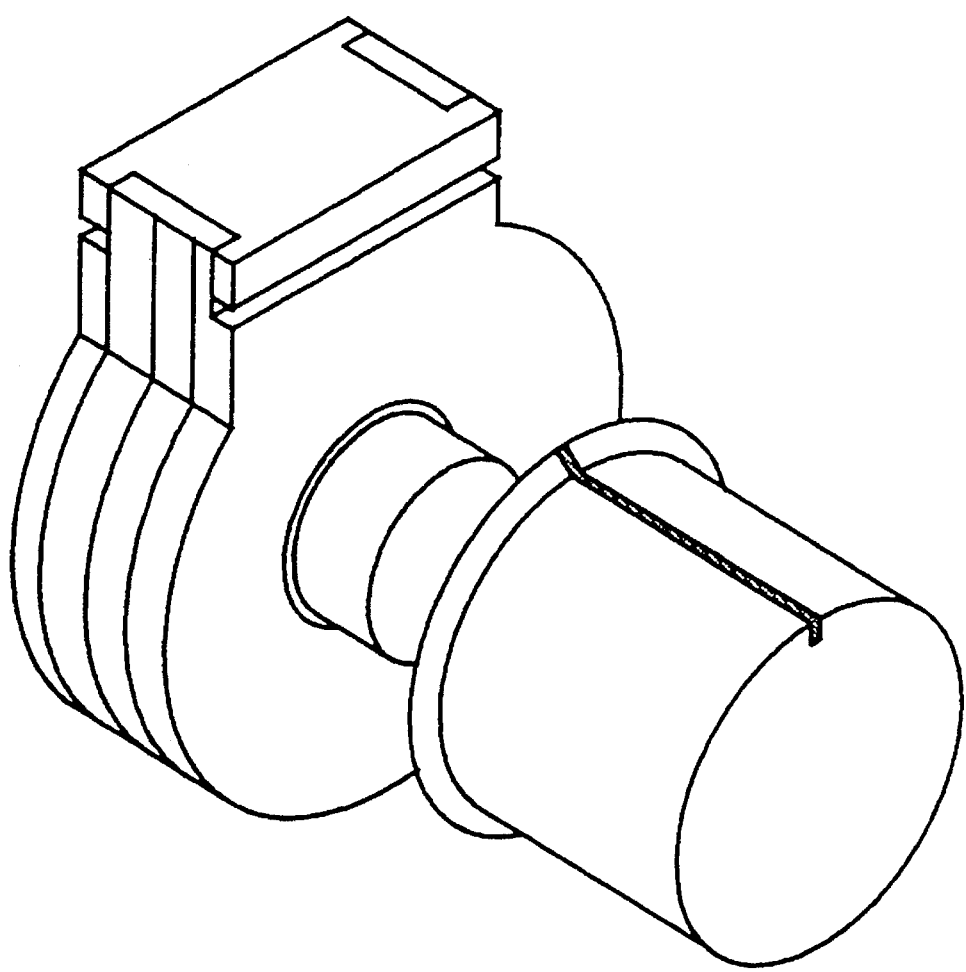
FIG. 16 illustrates the construction of a complex object using isometric ellipses.

The user can combine these operations to produce complex images, for example, isometric ellipses as illustrated in FIG. 16.

Internal Operations: Overview

Figure 17:
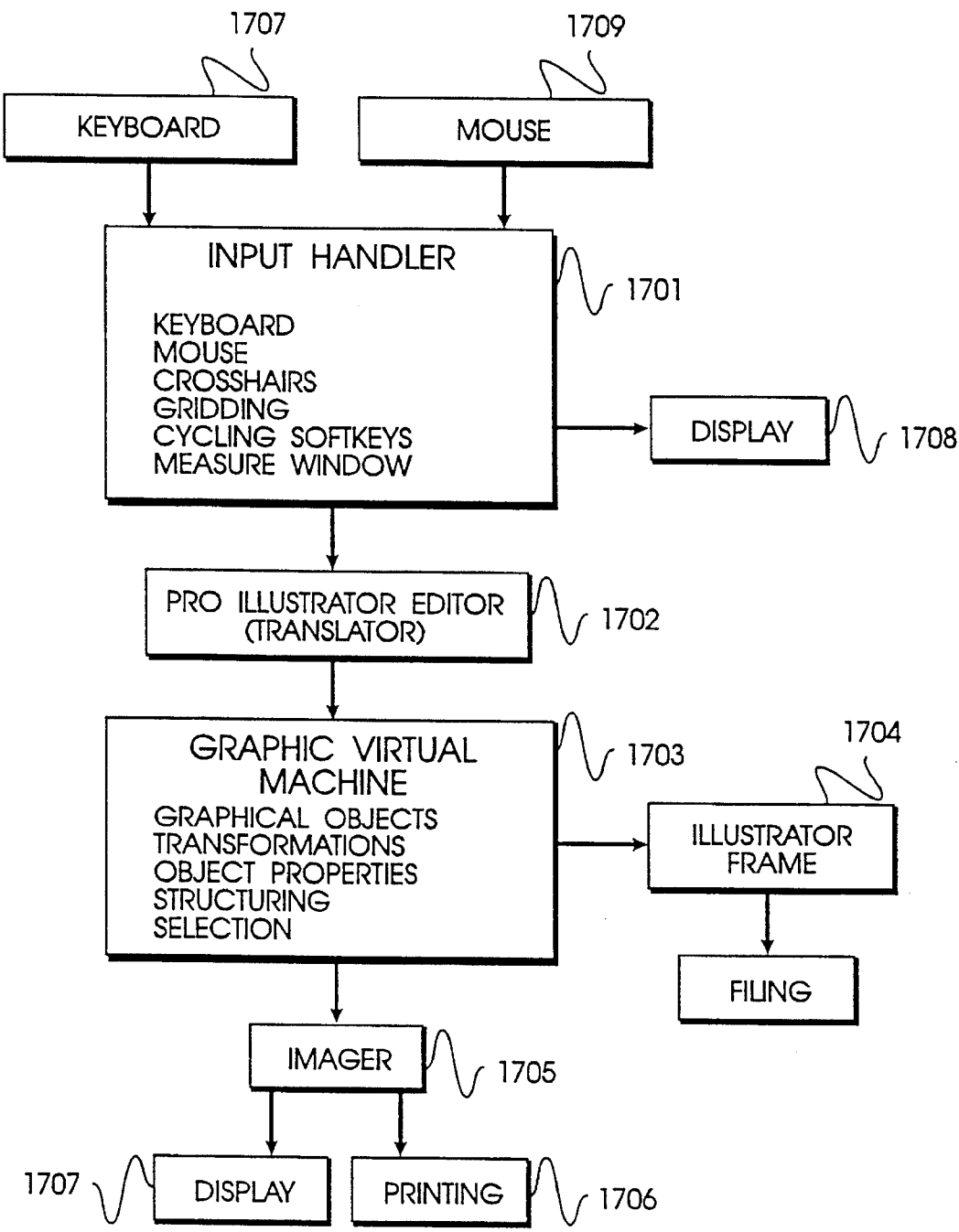
FIG. 17 is a block diagram of the computer program modules of the preferred embodiment.

As may be seen in FIG. 17 the program is divided into three basic modules: 1) Input Handler 1701, 2) Pro Illustrator Editor 1702, and 3) Graphic Virtual Machine 1703.

Input Handler 1701 processes information from either keyboard input 1707 or mouse input 1709. Its functions are responsible for the cross-hairs, gridding, and cycling softkeys (keys on display 104). Input Handler 1701 can communicate directly with the other modules 1702, 1703. In the alternative, the Input Handler can process the input itself and direct the output to display module 1708. Gravity, constraints, and portions of the geometry algorithms are located in the Input Handler.

Coupled to Input Handler 1701 is Pro Illustrator Editor 1702. It functions as a translator. Pro Illustrator Editor 1702 takes the output from Input Handler 1701, locates the appropriate function (from a translation table), and call the appropriate function in Graphic Virtual Machine 1703.

The final module, Graphic Virtual Machine 1703, is coupled to Pro Illustrator Editor 1702 and serves as a graphic engine for system 100. It contains the functions for the storage of various graphical objects as well as transformations performed on those objects. Graphic Virtual Machine 1703 sends its output to an imager 1705, which converts the data into an appropriate format for either a printing or display output 1706, 1707. In the alternative, Graphic Virtual Machine 1703 can output to Illustrator Frame 1704, which is responsible for the storage of object properties. Portions of the geometry algorithms are contained in Graphic Virtual Machine 1703.

Grids: Data Structure

Figure 18:
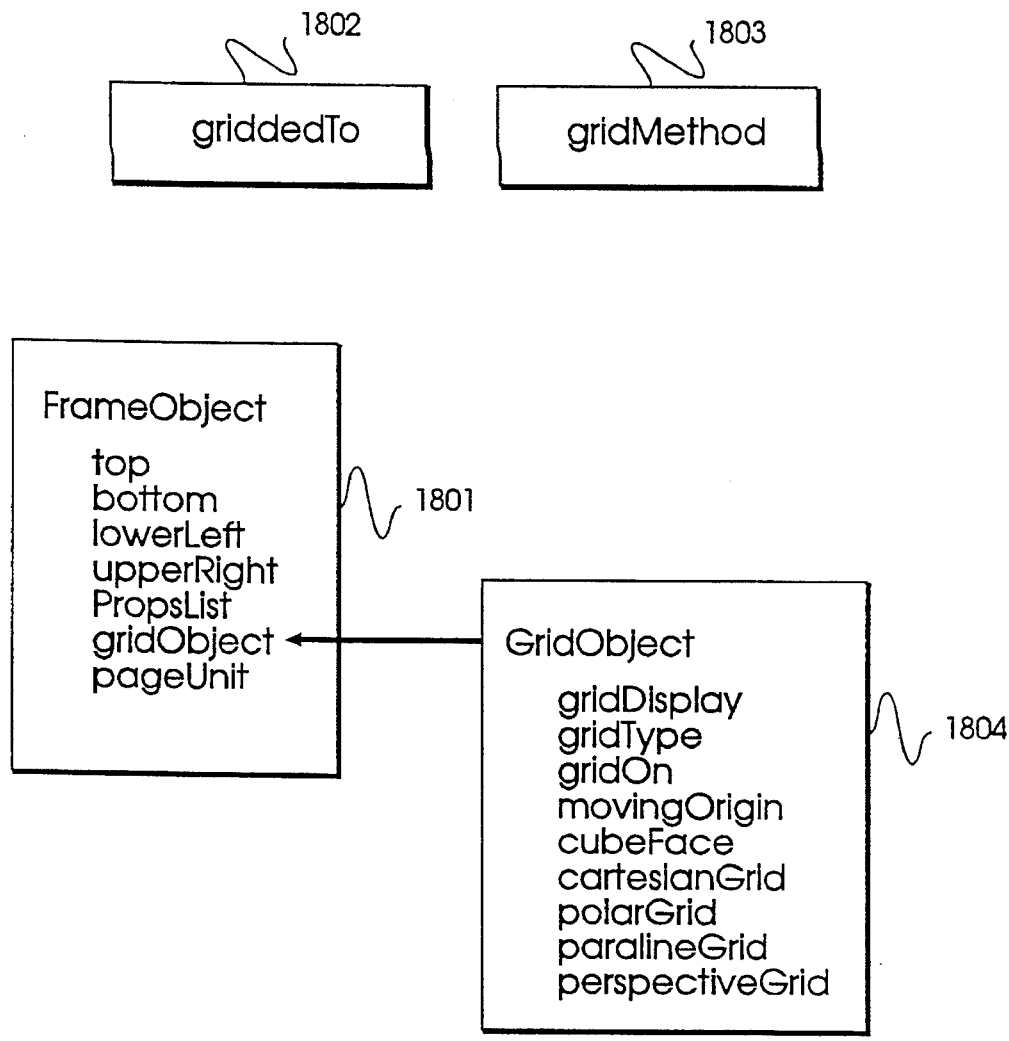
FIG. 18 is a block diagram of the main data structures for gridding.

The implementation of stationary and moving grids in the preferred embodiment will now be described. FIG. 18 illustrates the main data structures for gridding: GridObject 1804, FrameObject 1801, griddedTo 1802, and gridMethod 1803. GridObject 1804 is a record containing information for the grid display and type, moving origin, and geometry. It contains the following variables:

A. gridDisplay—is an enumerated type having a value of "dot" or "none," specifying whether or not the grid is shown as visible dots.

B. gridType—is an enumerated type having a value of cartesian, polar, paraline, perspective, or none.

C. gridOn—is a Boolean variable specifying whether the grid is in effect or not.

D. movingOrigin—is a variable storing the location of the origin if the grid is moving.

E. cubeFace—is an enumerated variable specifying in which face of a cube the user is working. It can take the value of top, left, right, or any.

The next four grid variables contain the parameters for the different grids. Regardless of which geometry is active, the data for all four grid systems is maintained in GridObject 1804 so that the user can toggle from one geometry to another.

F. cartesianGrid—is a variable of type CartesianGridObject for storing the parameters specifying the cartesian grid. Two variables, xGrid and yGrid, specify the grid intervals. The variable "origin" specifies the origin of the grid if it is stationary. The variables xOn and yon indicate whether the horizontal (xOn) and/or vertical (yOn) grids are on. A Boolean variable, is MovingPolar, specifies whether the grid is stationary or moving.

G. polarGrid—is a variable of PolarGridObject type containing the values rGrid and thetaGrid, which specify the grid interval in polar coordinates (r=radius, theta=angle); the variable origin for a stationary grid; and thetaOffset for changing the angle where the grid begins. With thetaOffset equal to zero, the first grid line (angular origin) is drawn at the 3 o'clock position. PolarGridObject also contains rOn and thetaOn for independently activating distance gridding (rOn) or angular gridding (thetaOn). The Boolean variable isMoving specifies whether the grid is stationary or moving.

H. paralineGrid—is a variable of paralineGridObject type containing the radius (rGrid) and the three angles (theta1, theta2, and theta3). These angles are initialized to the following standard isometric angles: 30 degrees, 150 degrees, and 270 degrees. The Boolean variable rOn indicates whether distance gridding is active. However, the user is not able to deactivate angular gridding for the paralineGrid as this would be redundant with the capabilities of polarGrid.

I. perspectiveGrid—is a variable of PerspectiveGridObject type containing the location of 1–3 vanishing points: vanish1, vanish2, and vanish3. As the angles are not fixed, the location of the vanishing points is specified instead of angles. The location of the respective vanishing points is contained in the variables vanish1, vanish2, and vanish3. There is no distance gridding or stationary grid origin. The variable nbrVanishPts stores the number of vanishing points used.

J. griddedTo 1802—is an enumerated variable for capturing the type of gridding that has been just performed; it can be a point, line or circle. In other words, it determines how fully constrained a location is. If system 100 is constrained to points, for example as in a linear grid, then the control points are gridded to one of the discrete dots on the lattice. In this case no intersection work is needed since a grid is fully determined. On the other hand, if system 100 is working with angular constraints then the gridding is to a line. Here system 100 does an intersection between the line and the object. If the user has specified distance constraints as opposed to angle constraints then the point is gridded to a circle of equal distance.

K. gridMethod 1803—is an enumerated variable containing the value of normal or fixedGrid. ToGrid uses this variable to determine whether to do moving gridding, no gridding, or fixed gridding. In the latter case, ToGrid ignores the moving grid, i.e., always grids according to the fixed grid.

L. FrameObject 1801—is a record variable containing the information needed to display, edit, or print an illustration that is in a frame on the display. It contains top and bottom pointers which point to the top-most and bottom-most objects in the frame. The size and coordinate system of the frame object is specified from the upper right and lower left coordinates. Next, FrameObject 1801 contains a set of property pointers. These specify the default properties (line, area, point, and text) that is to be applied to a newly created object. All the grid information stored in GridObject 1804 is part of FrameObject 1801. Each frame has its own grid for the geometry defined. The dimensions that a user specifies (millimeter, inches, etc.) are stored in a pageUnit variable.

Gridding

Figure 19:
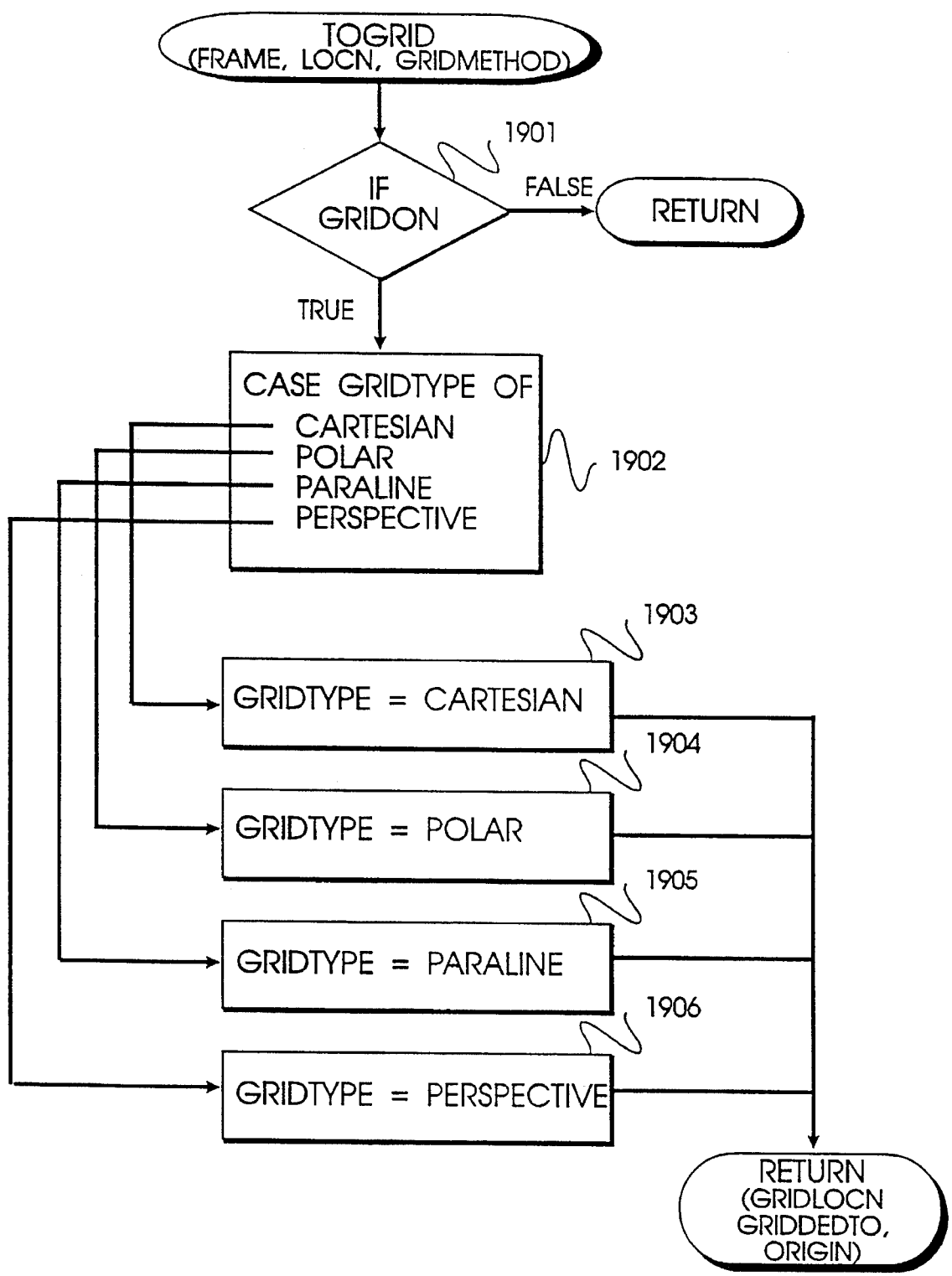
FIG. 19 is a flow chart of the ToGrid procedure.

FIG. 19 illustrates ToGrid, a procedure central to gridding. ToGrid accepts frame, locn (location), and gridMethod 1803 as parameters. The frame variable contains the definition of the frame while the locn variable specifies the hardware cursor's position. ToGrid returns a new location (gridLocn) and a griddedTo parameter (point, line, or circle). In addition, ToGrid returns the variable "origin," which may be needed in conjunction with the variable griddedTo 1802 to specify the line or circle that a point can be gridded to.

The steps of ToGrid are as follows. At step 1901, ToGrid tests whether the grid is on (gridOn=true). If the grid is off, then the procedure returns. At step 1902, the variable gridType is tested in a case statement. The branches available are gridType equal to cartesian 1903, polar 1904, paraline 1905, or perspective 1906.

Figure 20A:
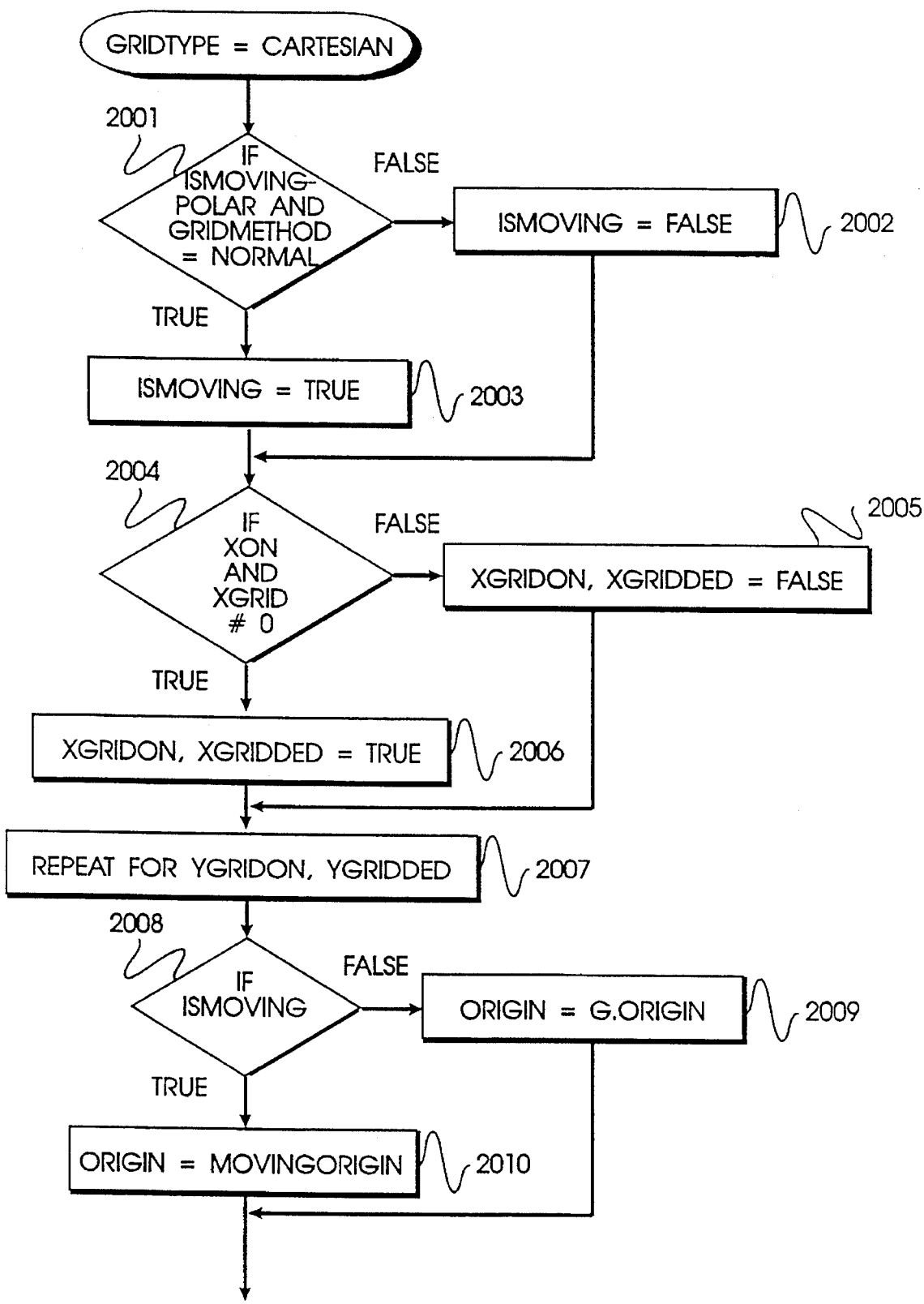
FIGS. 20A–C area flow chart of cartesian gridding.
Figure 20B:
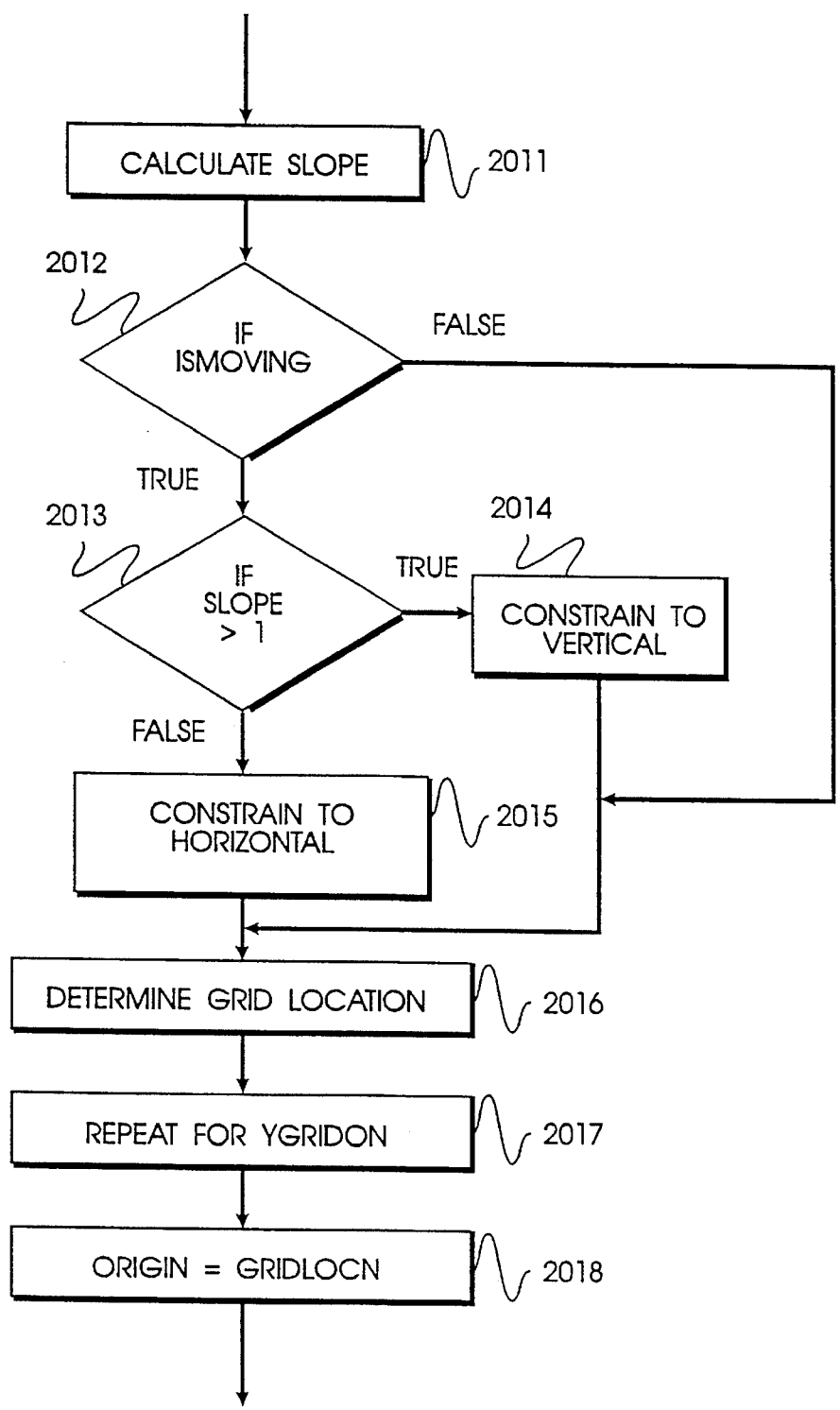
Figure 20C:
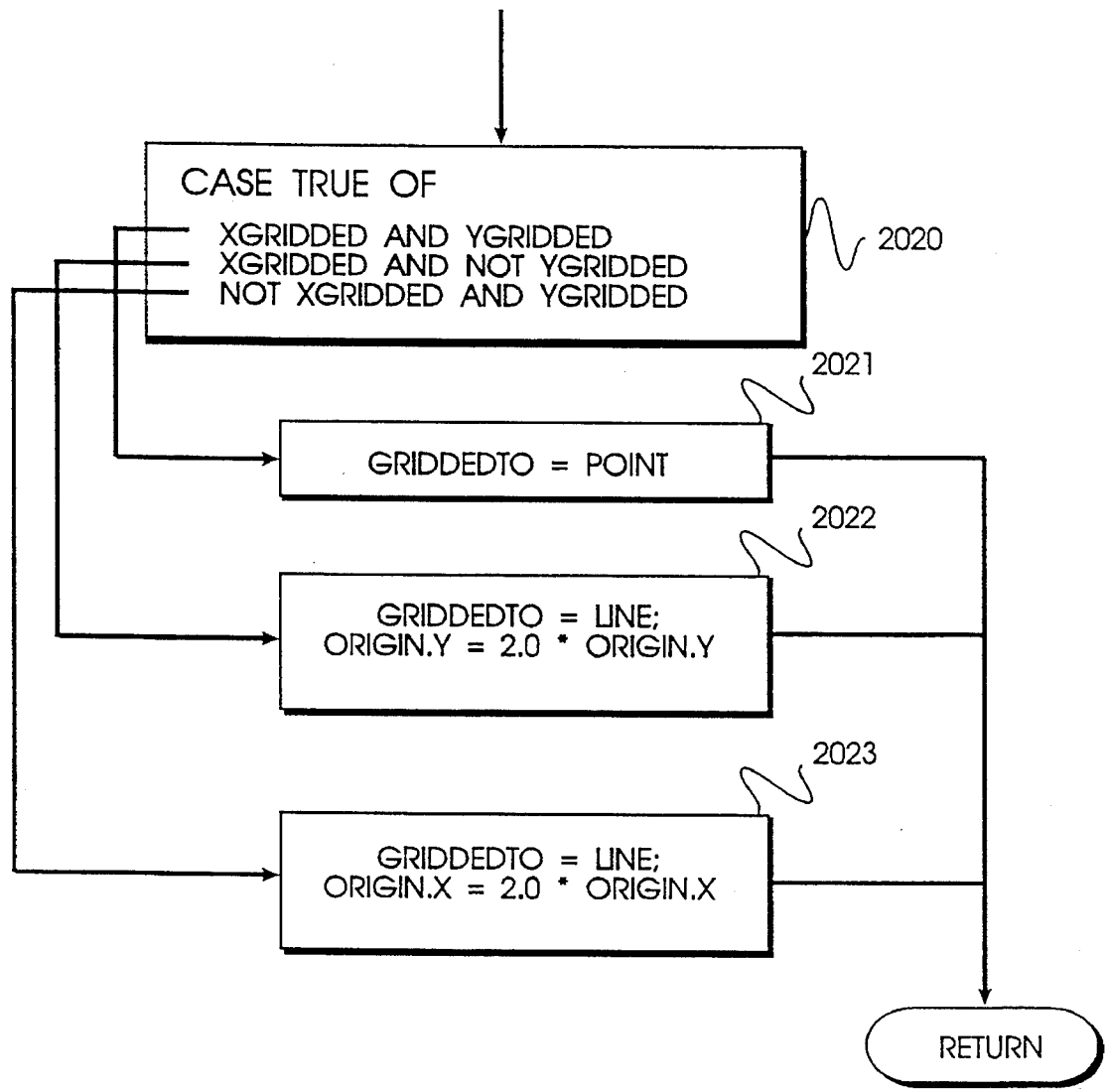

In FIGS. 20A–C, cartesian gridding is illustrated. If isMovingPolar is true and gridMethod 1803 is normal, step 2001, then the local variable isMoving is initialized to true, step 2003; otherwise, isMoving is false, step 2002. At step 2004, if the horizontal grid is on and the grid interval is not equal to zero, then the local variables xGridOn and xGridded are initialized as true at step 2006; otherwise, they are initialized to false at step 2005. This is repeated for yGridOn and yGridded at step 2007. At step 2008, if the grid is moving, then origin is set to the moving origin's value in step 2010; otherwise, it takes the stationary origin at step 2009.

Referring to FIG. 20B, to determine whether the cursor location is closer to the horizontal or vertical axis, the slope is calculated in step 2011 and compared to the value of one in step 2013. However, if the grid is stationary in step 2012, the procedure skips down to step 2016. If the slope is greater than one at step 2013, then in step 2014 the cursor point is constrained to the vertical, i.e., xGridded is set to true and xGridOn is set to false; otherwise, it is constrained horizontally at step 2015 with yGridded equal to true and yGridOn set to false.

At step 2016, the grid location is calculated. If horizontal gridding is on (xGridOn), the procedure divides the point xOffset by the grid interval, rounds to an integer and then multiplies back by the grid interval. In other words, at this point the procedure is rounding the location to the nearest grid point. By multiplying the interval back, the procedure returns the distance from the origin. Next the origin is added back to yield a location in frame coordinates. At step 2017, if vertical gridding is on (yGridOn), the gridLocn for yOffset is calculated. The origin is moved to the new grid location at step 2018.

Referring to FIG. 20C, the value for griddedTo 1802 is determined by the case statement in step 2020. If both X and Y are gridded (i.e., xGridded and yGridded are true), then a point is found and griddedTo 1802 is a point 2021. If X is gridded by not Y, then griddedTo 1802 is a vertical line 2022. If Y is gridded but not X, then griddedTo 1802 is a horizontal line 2023. In steps 2022 and 2023, each line is constructed by multiplying the origin (either x or y) by the arbitrary value of 2.0 to yield another point along the same axis. ToGrid concludes by returning.

Figure 21A:
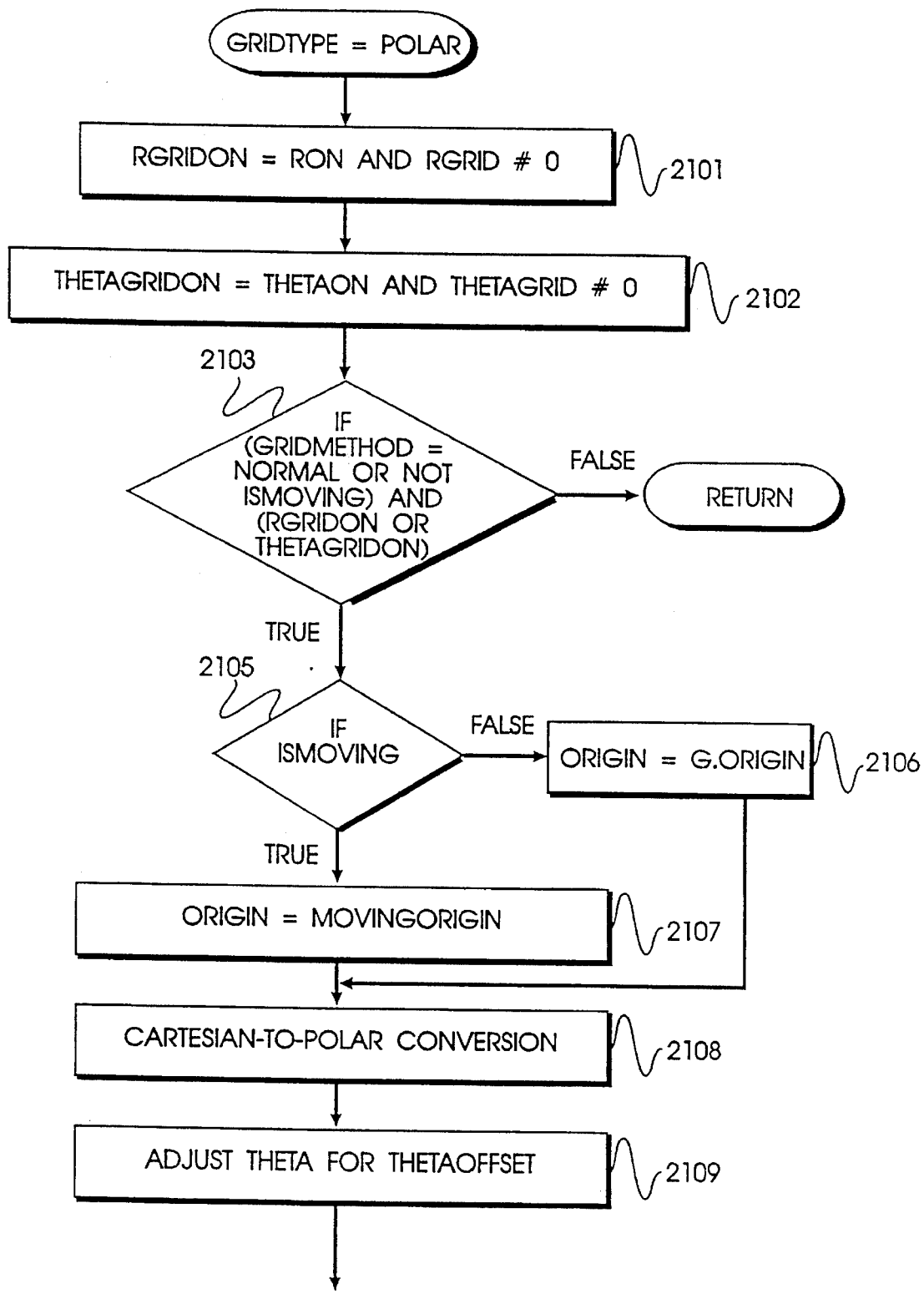
FIGS. 21A–B are a flow chart of polar gridding.
Figure 21B:
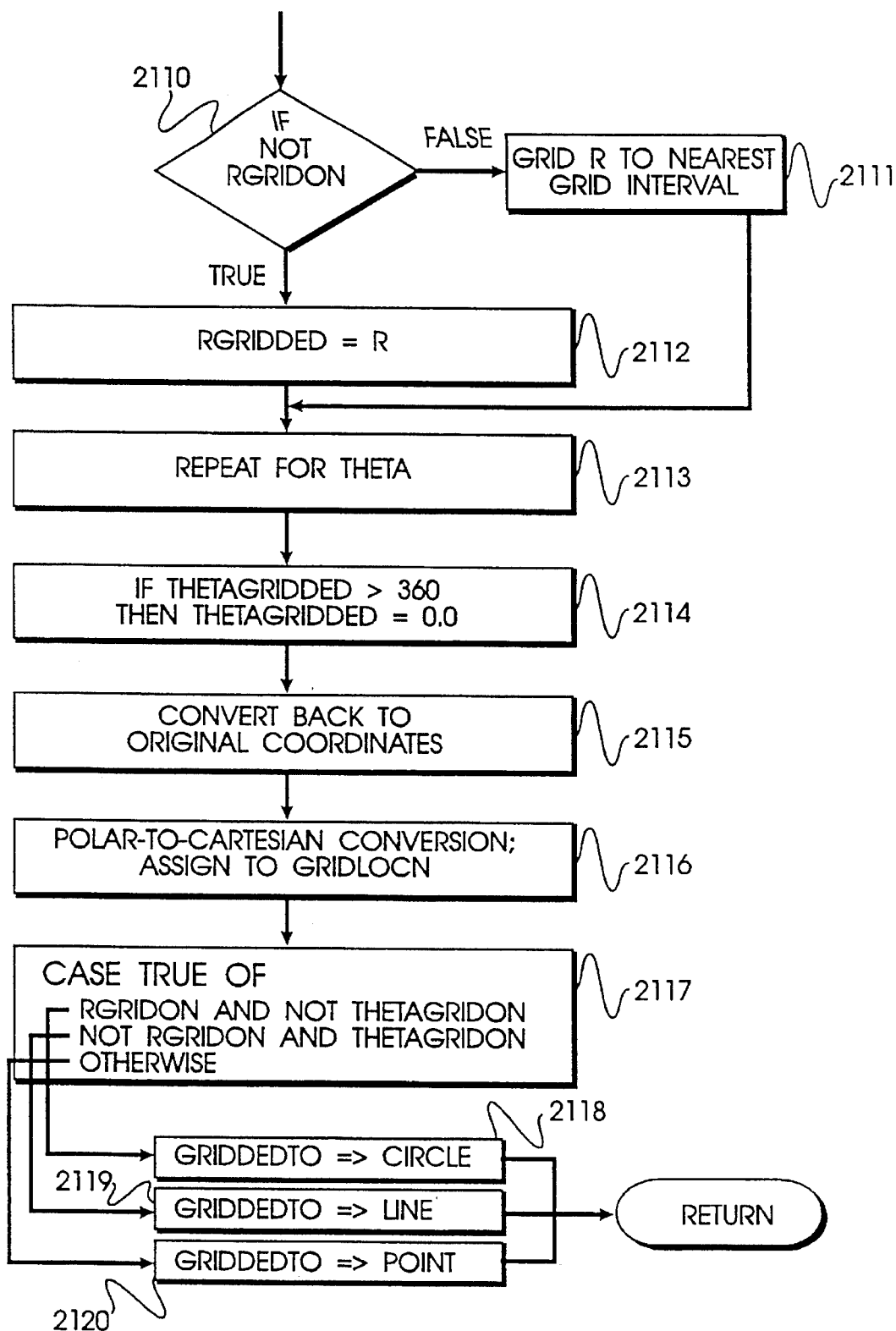

Referring to FIGS. 21A–B, polar gridding is illustrated. At step 2101, the local Boolean variable rGridOn is set to true if distance gridding is on (rOn) and the grid interval (rGrid) is not zero. A similar step is done for thetaGridOn in step 2102. At step 2103, if the gridMethod is fixed and grid is moving then no gridding is performed (procedure returns) because fixed and moving polar grids are not compatible.

At step 2105, if the grid is moving, the origin takes the value of movingOrigin stored in GridObject 1804 in step 2107; otherwise, it takes the value of the stationary origin in step 2106. A cartesian-to-polar conversion is done in step 2108, and theta is adjusted for thetaOffset in step 2109.

Referring to FIG. 21B, step 2110 begins the polar gridding. If in step 2110 distance gridding is not false, then in step 2111 r is gridded to the nearest grid interval by dividing by the grid interval, rounding that result, and multiplying back by the grid interval. Otherwise, if distance gridding is off, the value of rGridded is simply equal to r in step 2112. In step 2113, if angular gridding is on (thetaGridOn=true), then theta is gridded to the nearest grid angle and the value assigned to thetaGridded. At step 2114, the range of thetaGridded is checked. After the coordinates are rotated back to the original coordinate system by adding back in the thetaOffset in step 2115, a polar-to-cartesian conversion is performed and the result is assigned to gridLocn in step 2116.

In step 2117, griddedTo 1802 variable is set by the following case statement. If the distance gridding is on (rGridOn=true) and the angular gridding is not on (thetaGridOn=false), then griddedTo 1802 takes the value of circle in step 2118. If distance gridding is off and angular gridding is on, then griddedTo 1802 is line in step 2119. If both distance and angular gridding are on, then griddedTo 1802 is point in step 2120. The procedure concludes by returning.

Figure 22:
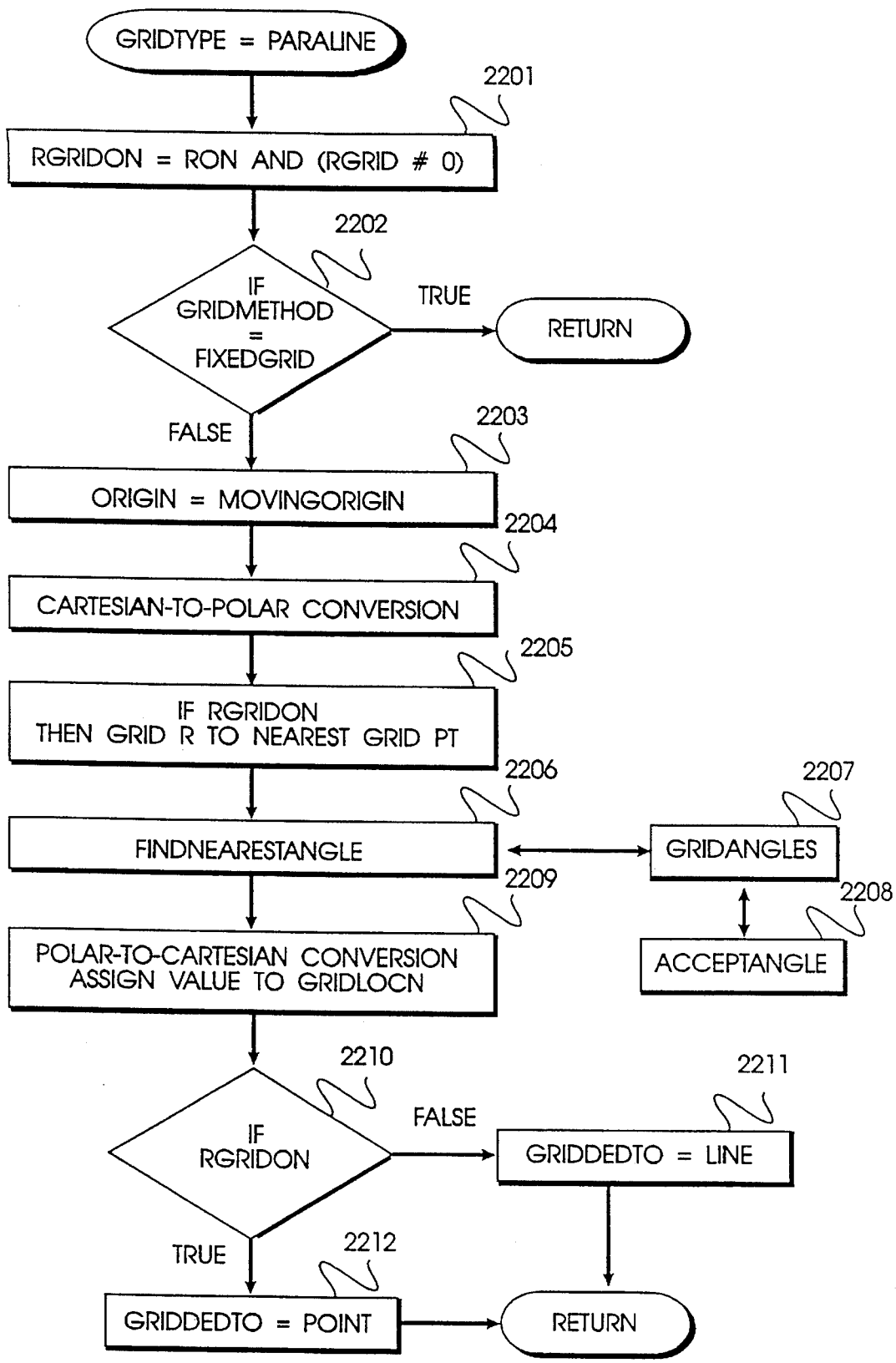
FIG. 22 is a flow chart of paraline gridding.

FIG. 22 describes paraline gridding. In step 2201, the Boolean variable rGridOn is set to true if distance gridding is on and the distance interval is not zero. Step 2202 terminates paraline gridding (procedure returns) if the grid is fixed. Otherwise, the origin is set equal to the moving origin in step 2203. In step 2204, the coordinates are converted from cartesian to polar values. If distance gridding is on, then the r value is gridded to the nearest grid point in step 2205.

To find the angle of theta, in step 2206 system 100 calls the FindNearestAngle procedure. FindNearestAngle takes as its parameter the GridAngles procedure at step 2207 (procedures can be passed as parameters). GridAngles calls the acceptAngle procedure at step 2208. The first call to acceptAngle is with theta1, one of the angles of the cube-Face stored in GridObject 1804. theta1 is derived by calling yet another procedure, GetGridHVAngles, and passing it the current grid. Next, theta1's extension (theta1+180 degrees) is passed. Then, GridAngles calls acceptAngle with theta2 and its extension. FindNearestAngle looks at these four angles and remembers the angle which is nearest to the angle that is passed. It returns that angle as its result.

In step 2209, the coordinates are converted back to the original coordinate system (polar-to-cartesian conversion) and assigned to the variable gridLocn. This variable stores the grid constraint information for return. In step 2210, the variable rGridOn is examined to determine if distance gridding is on. If rGridOn is true, gridding is to a point (griddedTo=point) at step 2212; otherwise, gridding is to a line at step 2211. The routine concludes by returning.

Figure 23:
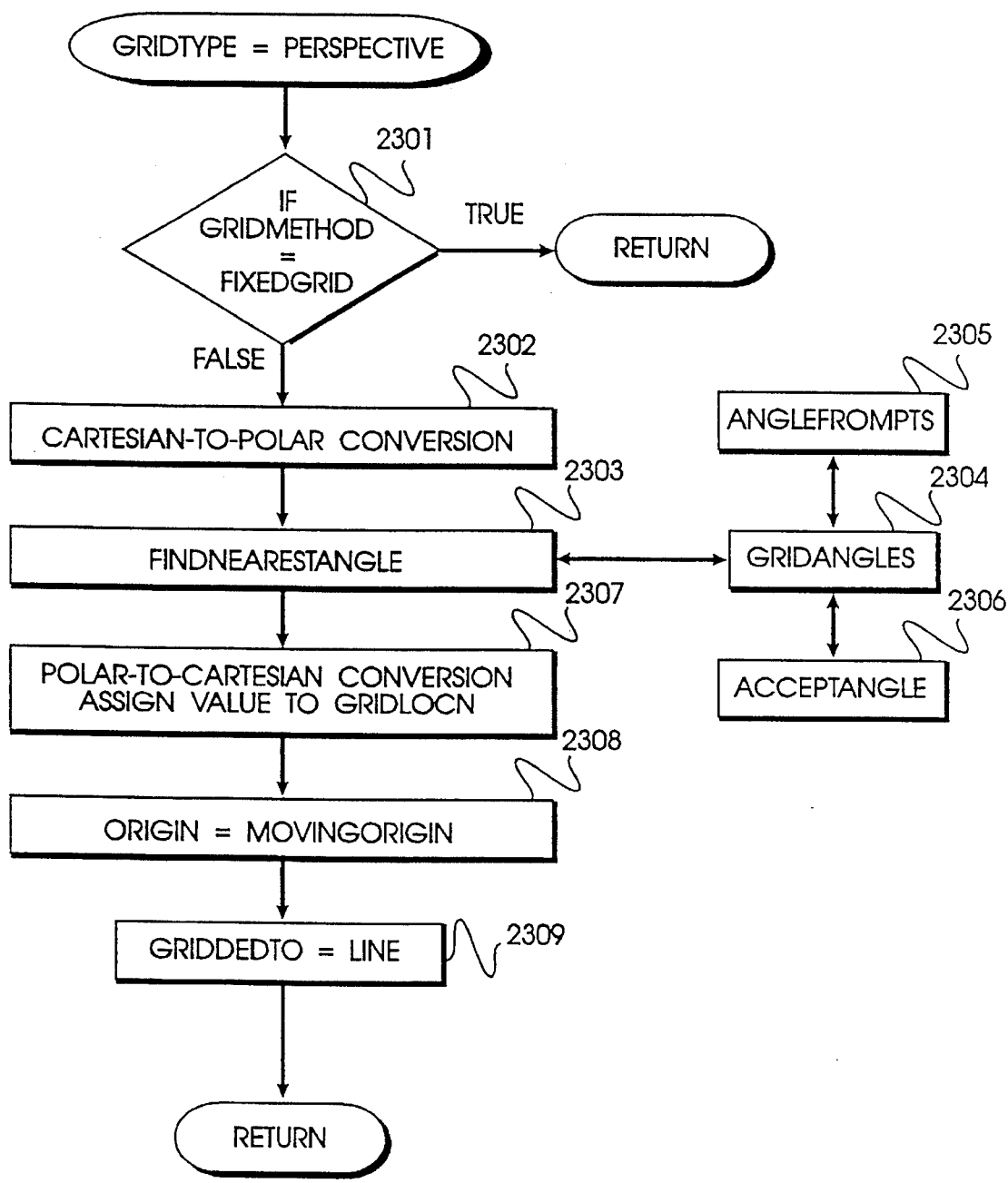
FIG. 23 is a flow chart of perspective gridding.

FIG. 23 represents perspective gridding. Again, the first step is to check whether the grid is fixed at step 2301. In step 2302, the screen coordinates are converted into polar coordinates. In step 2303, the FindNearestAngle procedure is called, which calls the GridAngles procedure in step 2304. GridAngles passes the moving origin and first vanishing point to the AngleFromPts procedure at step 2305. These two points define the first angle. This is repeated for any remaining vanishing points. If the number of vanishing points is less than 2, then the horizontal and/or vertical angles are used instead. These values are returned to GridAngles, which calls AcceptAngle, step 2306, to determine the nearest angle. This value is assigned to theta and returned to FindNearestAngle. In step 2307, the coordinates are converted back to cartesian and assigned to gridLocn. In step 2308, the origin is updated. At step 2309, the variable griddedTo 1802 is always set to a line as there is no distance gridding in perspective geometry.

Mouse Events

Figure 24:
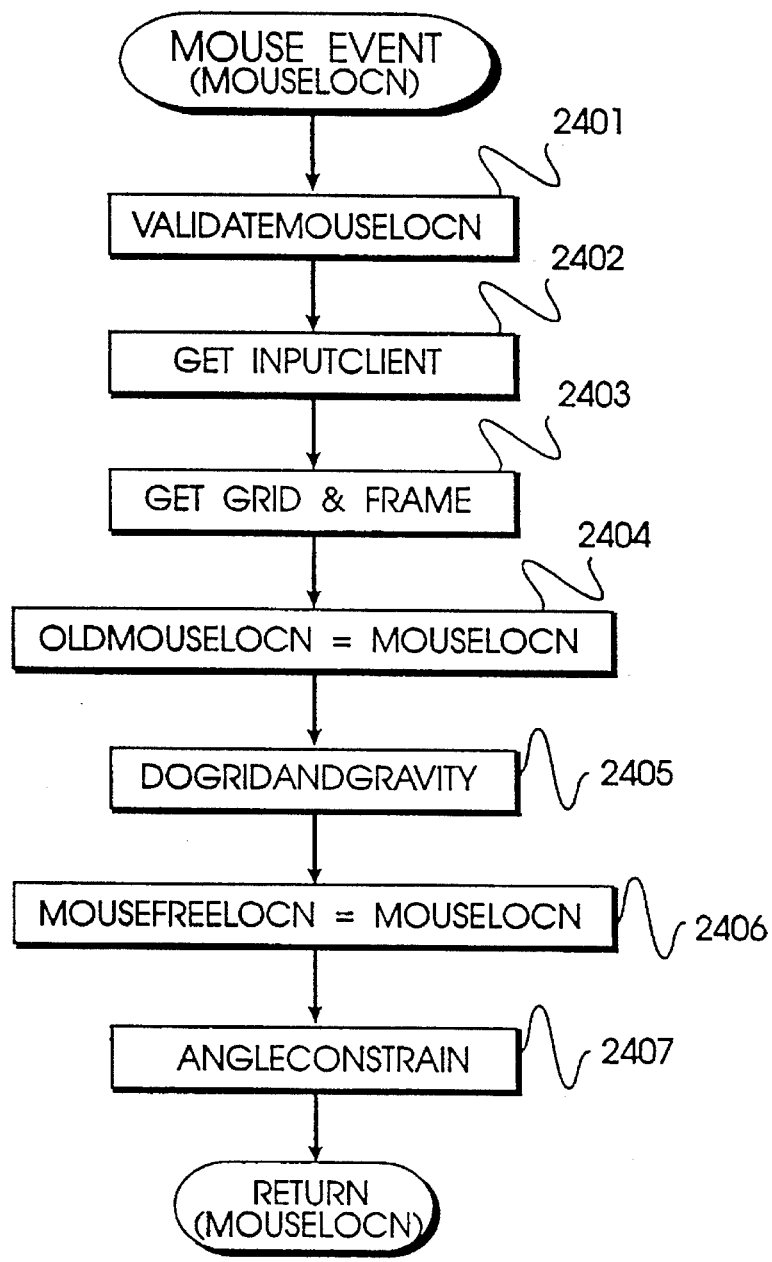
FIG. 24 is a flow chart of the procedures called upon a mouse event.

In addition to gridding, the preferred embodiment has gravity and angular constraints. As FIG. 24 illustrates, when the mouse location changes or the mouse button is pressed (mouse event), the ValidateMouseLocn procedure is invoked (step 2401). ValidateMouseLocn controls the relationship between gridding and gravity (DoGridAndGravity) and angle constraints (AngleConstrain). In steps 2402 and 2403, the procedure gets the InputClient, grid, and frame data structures. In step 2404, the mouse location is stored in an oldMouseLocn variable. At step 2405, DoGridAndGravity takes the mouse location and applies gridding and gravity constraints. It returns a new mouse location (or the same location if there is no gridding or gravity). In step 2406, this location is stored in a mouseFreeLocn variable, which represents the mouse location "free" of angle constraints. At step 2407, AngleConstrain is called to calculate a new mouse location, which is constrained with the cube face alignment angle farthest from the constraint angle. Thus, as a result of ValidateMouseLocn, angle constrain has priority over gridding and gravity; within DoGridAndGravity, gravity takes priority over gridding. The following order of precedence results: angle constrain, gravity, and gridding constrain.

Angle Constrain

Figure 25:
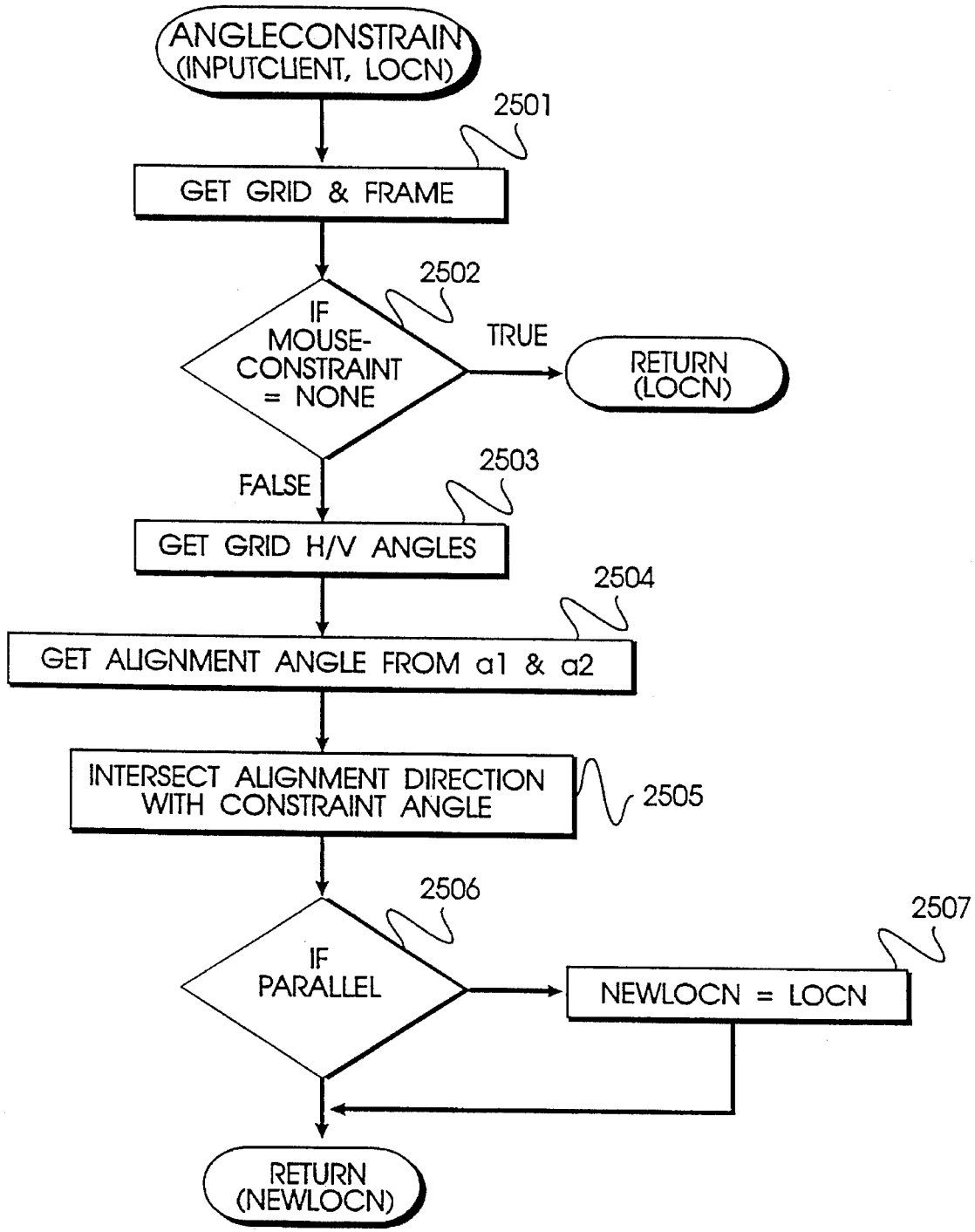
FIG. 25 is a flow chart of the AngleConstrain procedure.

The implementation of angle constraints in the preferred embodiment will now be described. FIG. 25 illustrates the AngleConstrain procedure. It accepts InputClient and Locn as parameters. The InputClient is a large record containing the information for the client-settable options and client's softkey table. Locn is the mouse location passed in. AngleConstrain returns the angle-constrained location in the variable newLocn.

The steps of the AngleConstrain procedure are as follows. At step 2501, the procedure gets the current frame and grid data from the InputClient record. In step 2502, the procedure checks the value of mouseConstraint for the current constraint angle; this can take the value of horizontal, vertical, lock angle, or none. If mouseConstraint is equal to none, then the AngleConstrain procedure returns the value of Locn that is passed to it.

In step 2503, the procedure GetGridHVAngles is called to compute the horizontal and vertical angles for the current plane or cube face (cubeFace) requested by the user. This subroutine takes as parameters the grid or geometry the user has specified and the current location. It returns the two angles to the variables a1 and a2. For gridType equal to paraline or perspective, GetGridHVAngles returns the two grid angles corresponding to the horizontal and vertical directions for the current cubeFace at the specified origin. If no origin is specified, the grid's moving origin is used. For other grid types, it returns 0.0 and 90.0 degrees.

In step 2504, the alignment angle is determined by called the procedure GetFarthestAngle with the constraint angle, a1, and a2 as parameters. At this step, the procedure determines which angle, either a1 or a2, is the farthest from the constraint angle. This value is assigned to the variable alignAngle.

FIG. 26A–B illustrates how GetFarthestAngle operates. Referring to FIG. 26A, the angle of a1 (2602) is equal to zero and the angle of a2 (2601) is equal to 90 degrees. The constraintAngle 2604 is equal to 200 degrees. If the procedure just found the closest angle, it would return 90 degrees (a2) as the closest angle to 200 degrees; this would be an incorrect result. Instead, GetFarthestAngle finds the closest angle in terms of direction (an angle or its 180 degree extension). In other words, the procedure finds the direction that is closest.

In FIG. 26A, since 180 degrees 2603 is the closest angle to the 200 degree constraintAngle 2604, a1 (2602) is the closest and a2 (2601) is the farthest angle. The farthest angle is returned by GetFarthestAngle and assigned to the variable alignAngle at step 2504.

Step 2505 finds the intersection between the alignment direction and the constraint angle. This is done by the procedure IntersectLineLine. It accepts as it parameters constraintOrigin and constraintAngle (defined in the InputClient), Locn (location passed to the procedure), and alignAngle (calculated by the GetFarthestAngle).

FIG. 26B illustrates this operation for vertical alignment with a line 2613. For cursor location (Locn) 2614, alignment direction 2615 (vertical), constraintOrigin 2611 (also the anchor point of line 2613 in this example), and constraint angle 2612, the procedure defines a new location (newLocn) 2616. As seen in FIG. 26C, for this example new location 2616 (now newLocn 2617) follows cursor 2614 to maintain vertical alignment.

However, if the procedure fails in step 2506, i.e., if the Boolean variable parallel is true indicating that the lines are parallel, the variable newLocn simply takes the value of Locn that is passed to the AngleConstrain procedure. The AngleConstrain procedure concludes by returning the value of newLocn.

DoGridAndGravity

The procedure central to both gridding and gravity techniques is the DoGridAndGravity procedure. It takes an integer mouse location in pixels relative to a screen window and a set of constraints (gravity, gridding, and mouse or angle constraints) and determines the constrained location. This is performed in floating point coordinates which are used by system 100 to describe the location of illustrator objects.

Figure 27:
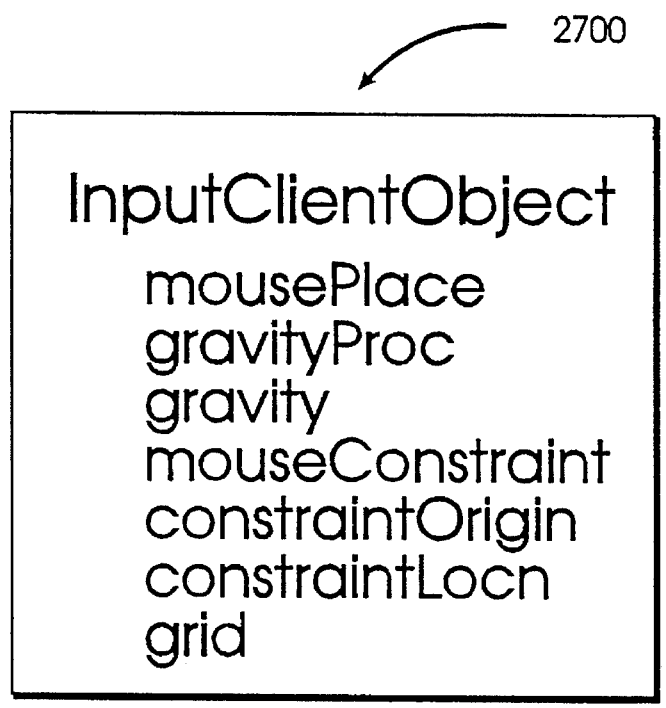
FIG. 27 illustrates the main data structure for the DoGridAndGravity procedure.

Referring to FIG. 27, the main data structure relevant to the DoGridAndGravity procedure is InputClientObject 2700. The following data fields are contained within it:

A. mousePlace—is a variable which stores the position of the mouse in screen coordinates.

B. gravityProc—allows the client to supply a special object which should be tested for gravity.

C. gravity—is an enumerated variable which takes the value of none, CtrlPt, intersection, or object.

D. mouseConstraint—is an enumerated variable which specifies the angular constraint. It can take the value of none, horizontal, vertical, or angular. Angular corresponds to "lock angle".

E. constraintOrigin and constraintLocn— contain locations which defines the direction of constraint (horizontal, vertical, or angular).

F. grid—is the variable which stores all the grid information.

Figure 28:
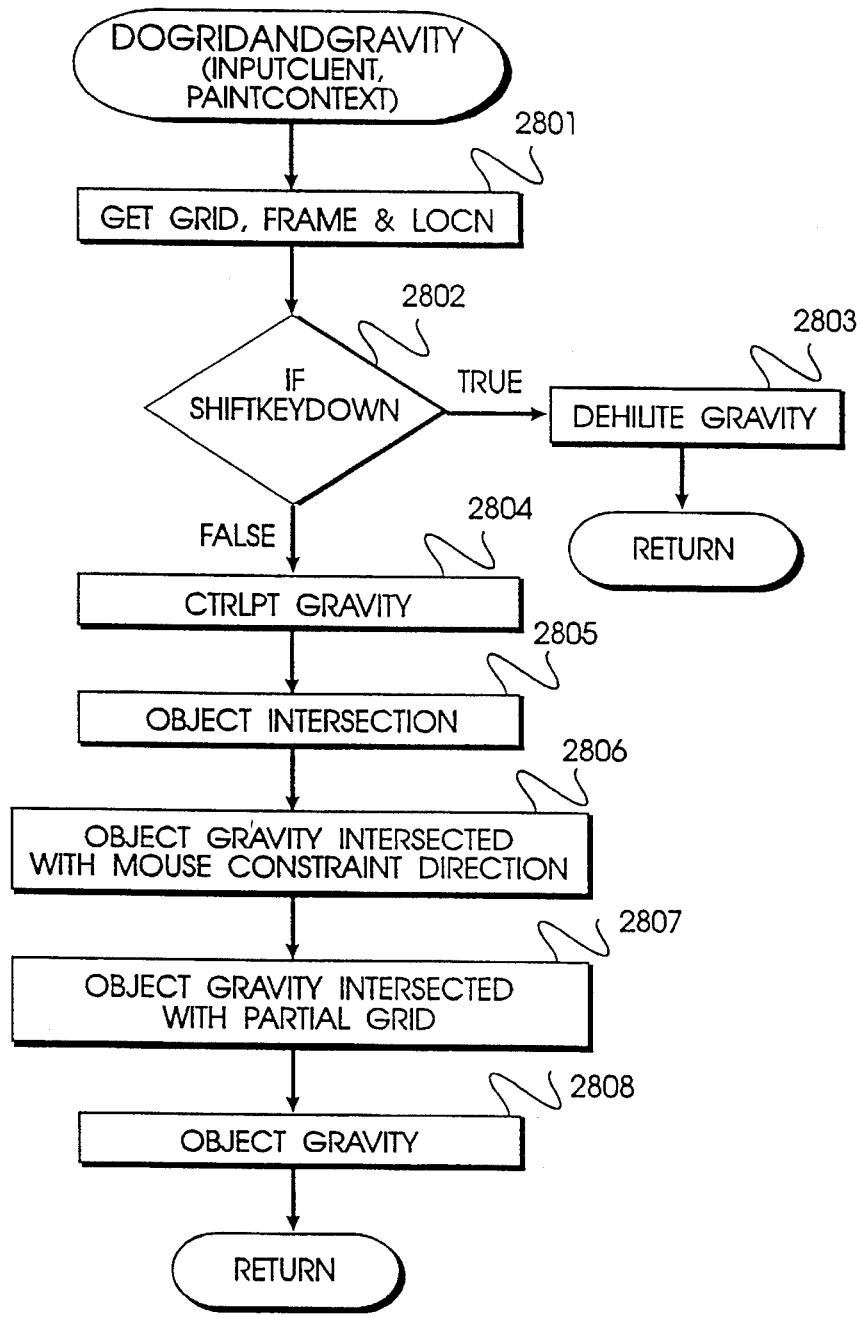
FIG. 28 is a flow chart of the DoGridAndGravity procedure.

FIG. 28 demonstrates the DoGridAndGravity procedure. In step 2801, the procedure gets the grid and frame information, and converts the mousePlace from screen coordinates to world coordinates storing the value in the local variable Locn. In step 2802, if the shift key is down (requesting no grid or gravity), then in step 2803 the procedure de-highlights gravity and returns to the calling procedure; otherwise, the procedure continues. In step 2804, control point gravity is calculated.

Figure 29:
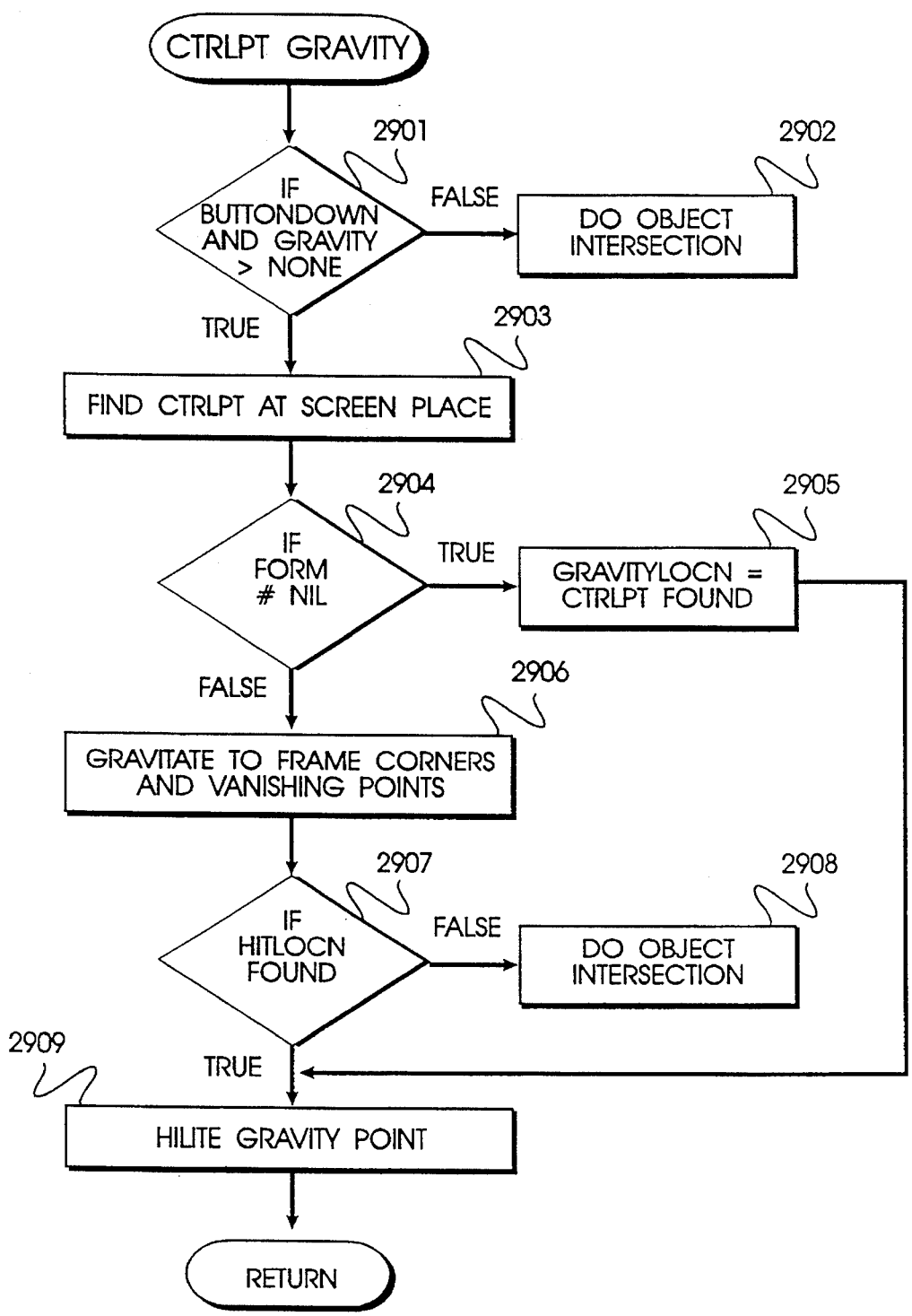
FIG. 29 is a flow chart of CtrlPt (control point) Gravity.

FIG. 29 further describes the determination of control point gravity. In step 2901 if the mouse button is down and gravity is greater than none, then the procedure continues to step 2903; otherwise, it branches to step 2902 to do object intersection gravity. At step 2903, the procedure looks for a control point. All forms in the frame attached to the PaintContext are searched in order from the bottom of the frame to the top. The first control point found that is within hitRadius4 is returned. The hitRadius4 variable represents the "hot zone" which is arbitrarily defined to have a radius of four pixels.

In step 2904, the procedure checks whether a form is found, i.e., whether an object is found that contained a valid control point within the hot zone. If one is found, then in step 2905 the variable gravityLocn is set to the control point found and that gravity point is highlighted. If no form is found, then step 2906 checks the frame corners and vanishing points for gravity. This is done by calling a procedure, GetBoundary, to determine the coordinates for the frame corners and by calling a procedure, HitLocn, to determine whether the mouse location is within the hot zone of each frame corner.

If system 100 is in perspective geometry, then HitLocn checks whether the mouse location is within the hot zone of the vanishing points. In step 2907, if gravity is found at the frame corners or vanishing points, then in step 2909 that gravity point is highlighted and returned as gravityLocn. Otherwise, in step 2808 the procedure branches to determine object intersection gravity. Since DoGridAndGravity checks for control point gravity to the exclusion of other gravity types, a hierarchy exists in which control point gravity is the strongest form of gravity in this system.

Figure 30:
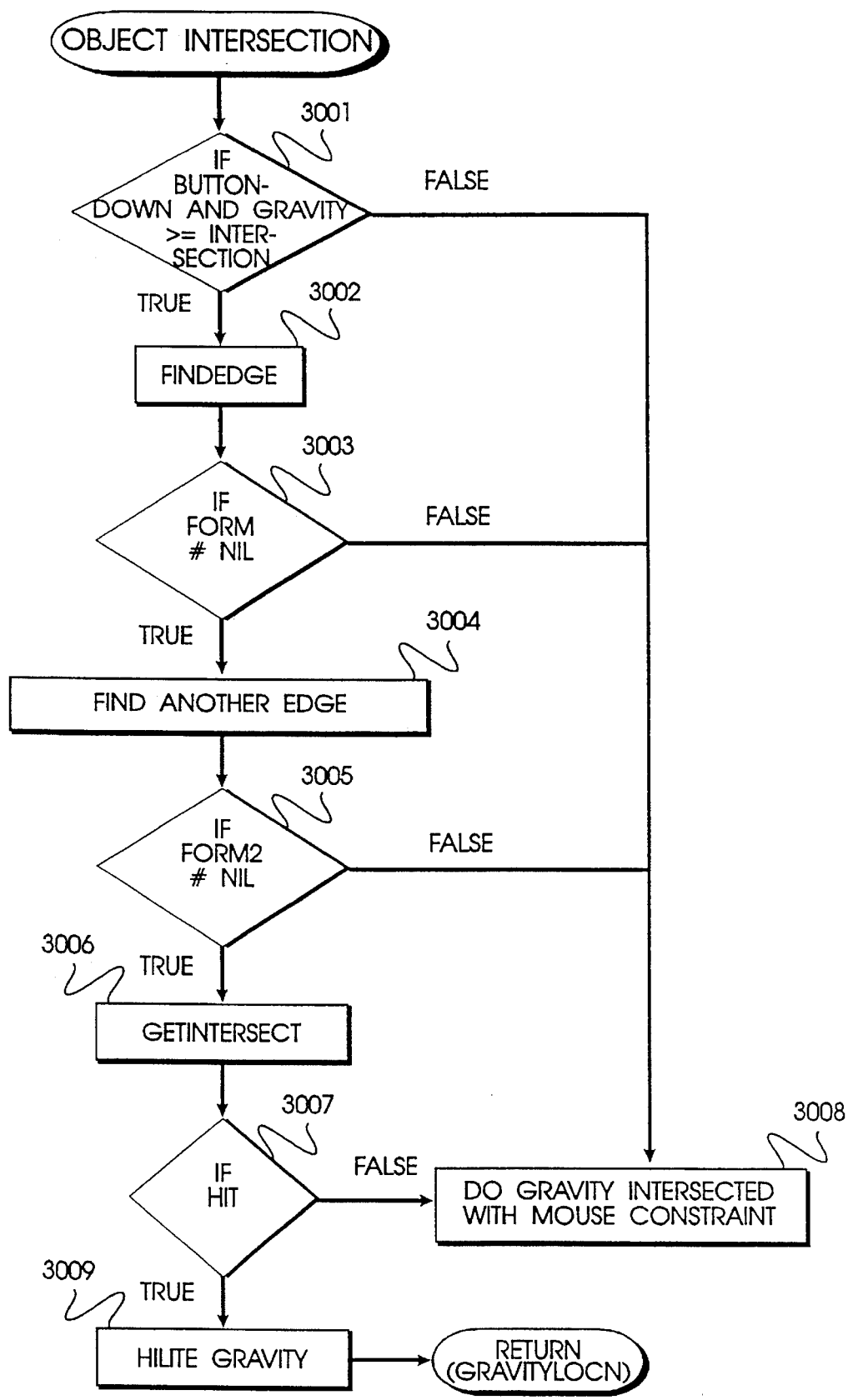
FIG. 30 is a flow chart of Object Intersection Gravity.

In step 2805 of DoGridAndGravity, Object Intersection gravity is determined. FIG. 30 demonstrates the methods of this step. In step 3001, if the mouse button is down and gravity is greater than or equal to intersection gravity, then the procedure continues on to step 3002; otherwise, the procedure skips to step 3008 to find gravity intersected with mouse constraint. In step 3002, a procedure, FindEdge, is called to find any edge in the frame that is within hitRegion4. If a form is found, then it is stored in the local variable "form" and the edge is stored in the local variable "edge". Otherwise, form is set to nil. In step 3003, if no form has been found, then the procedure goes to calculate gravity intersected with mouse constraint.

However, if a form is found, then in step 3004 the procedure looks for another edge. If another edge is found, it is stored in the variable edge2 and the corresponding form is stored in form2. In step 3005, if another edge has not been found, then the procedure goes to calculate gravity intersected with mouse constraint. If form2 has been found, then the procedure goes to step 3006 to calculate the intersection between the two forms. A procedure, GetIntersect, is called with five parameters: form, form2, edge, edge2, and hitRegion4. If GetIntersect finds an intersection of the specified edge of the forms, then it sets the local Boolean variable hit to true, otherwise hit is set to false. If hit is true at step 3007, then at step 3009 the procedure highlights the object intersection gravity point and returns that gravity location in the gravityLocn variable; otherwise, the procedure branches to step 3008 to find gravity intersected with mouse constraint.

Figure 31:
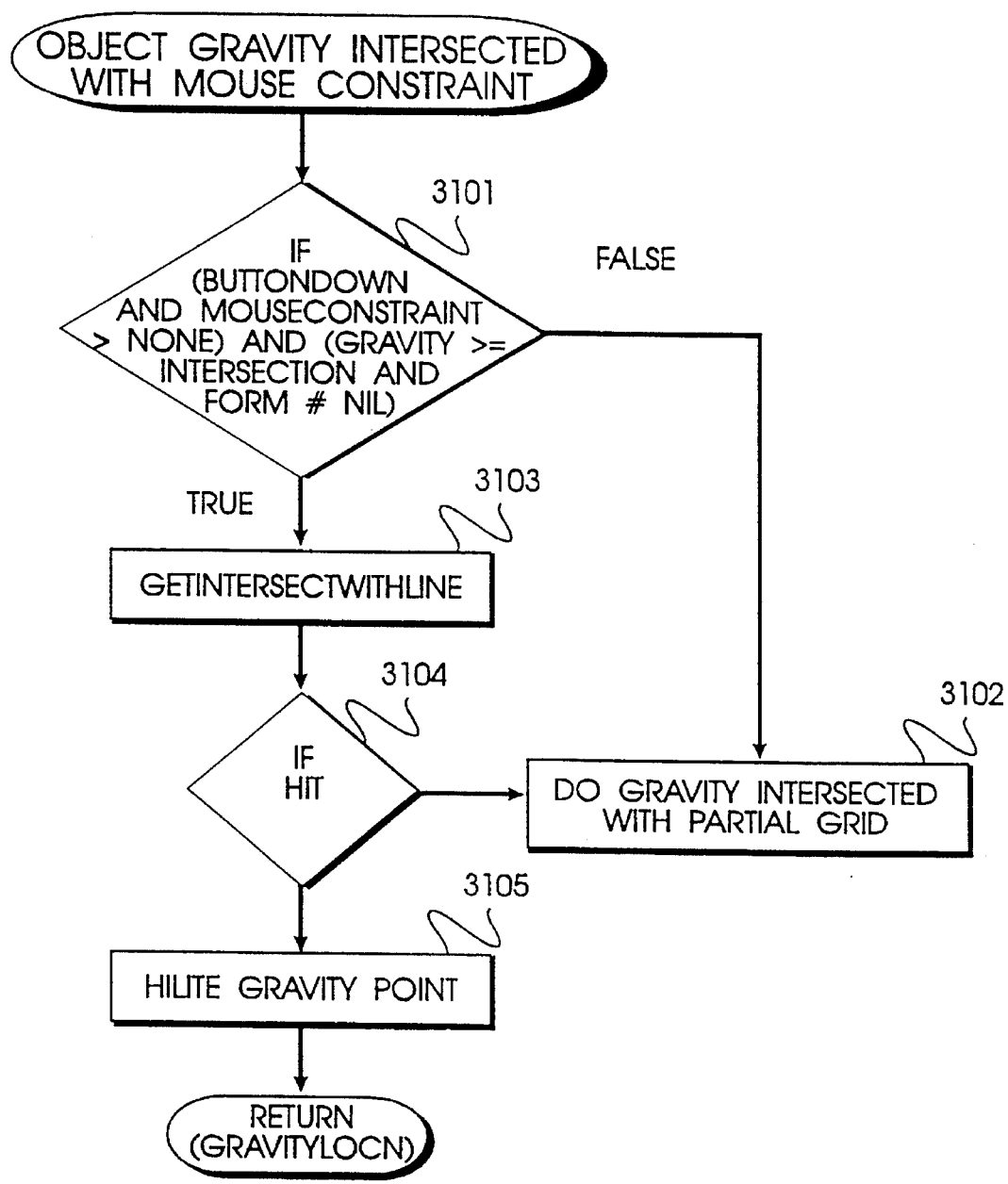
FIG. 31 is a flow chart of Object Gravity Intersected with Mouse Constraint.

In step 2806 of DoGridAndGravity, Object Gravity Intersected with Mouse Constraint is determined. FIG. 31 illustrates this technique. In step 3101, if mouse button is down and mouseConstraint is greater than none, and gravity is greater than or equal to intersection gravity and form is not equal to nil, then the procedure continues to perform the gravity calculations of step 3103. Otherwise, the procedure branches in step 3102 to do object gravity intersected with partial grid.

Step 3103 calculates the object gravity intersected with mouseConstraint direction by calling GetIntersectWithLine. This procedure takes as its parameter the form, edge, constraint line (defined by constraintOrigin and constraintLocn) and hitRegion4. The GetIntersectWithLine procedure finds the intersection of the specified edge of the specified form with the constraint direction or line that is set. If an intersection if found within the hit region then the local variable hit is set to true; otherwise hit is set to false. In step 3104, if hit is true, then the procedure continues to step 3105 to highlight the gravity point and return the gravity location (gravityLcon). If hit is false in 3105, then the procedure branches to calculate object gravity intersected with partial grid at step 3102.

Figure 32A:
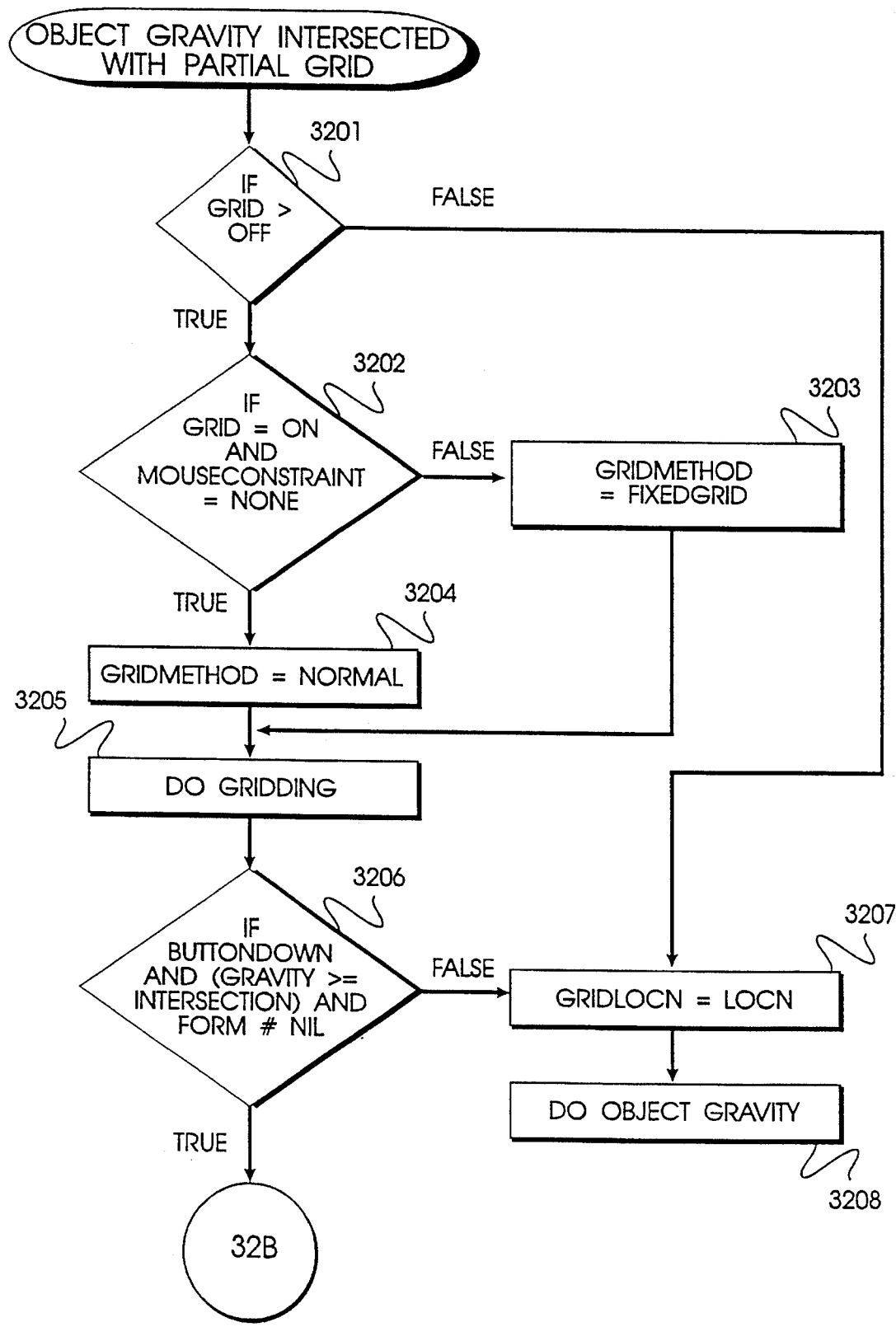
FIGS. 32A–B are a flow chart of Object Gravity Intersected with Partial Grid.
Figure 32B:
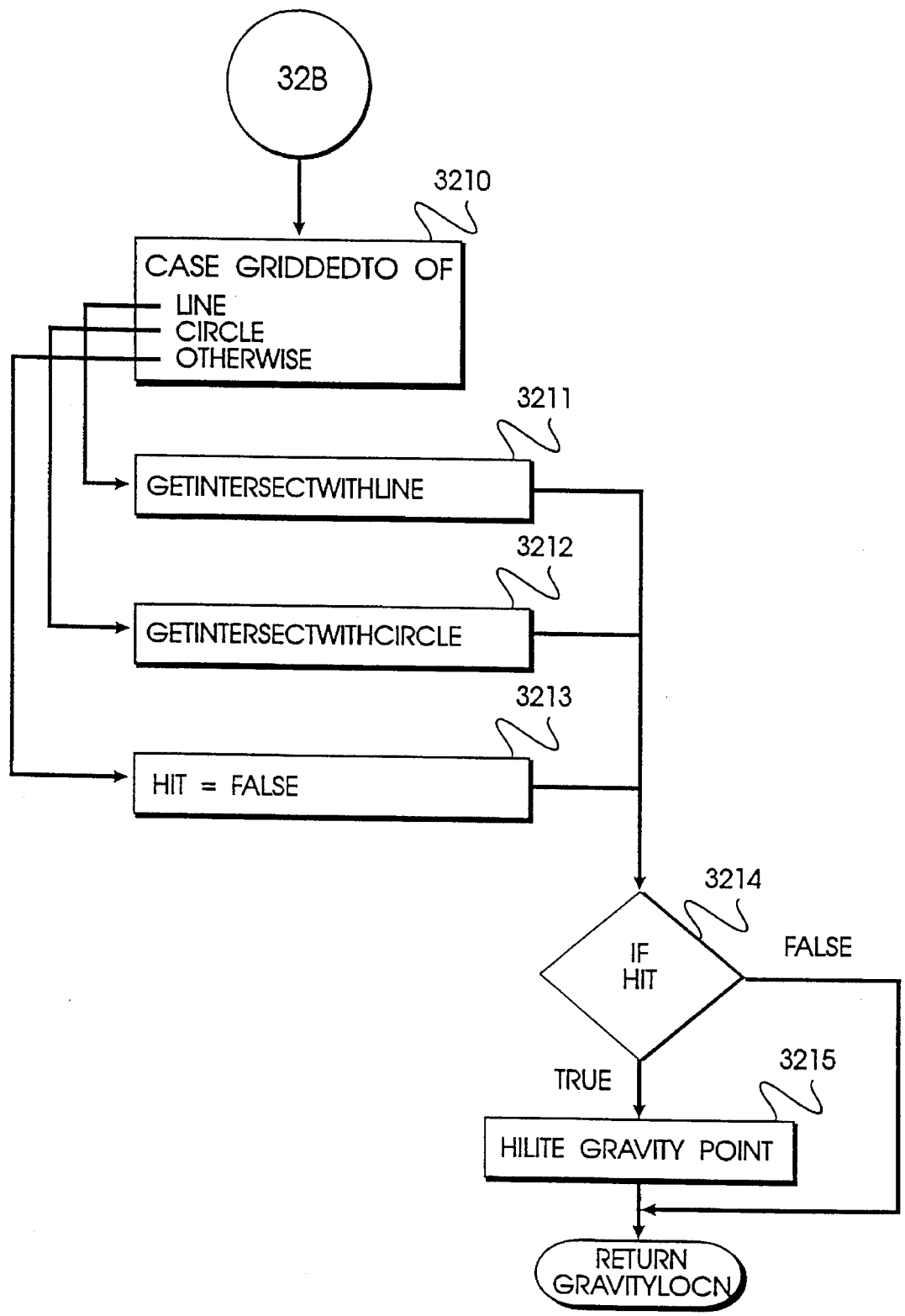

In step 2807 of DoGridAndGravity, Object Gravity Intersected with Partial Grid is determined. FIGS. 32A–B describe this method. In step 3201 if the grid is off, then at step 3207 the procedure assigns locn (mouse location) to gridLocn and jumps to step 3208 to do object gravity. In step 3202, if the grid is on and there is no angle constraint (mouseConstraint=none), then gridMethod 1803 is set to fixed grid at step 3203; otherwise, it is set to normal in step 3204.

In step 3205, the actual gridding is performed by calling the procedure ToGrid (FIG. 19) with the parameters frame, locn, and gridMethod 1803. ToGrid returns the grid location (gridLocn) and the grid origin (gridOrigin). In addition, it sets griddedTo 1802. In step 3206, if the mouse button is down and gravity is greater than or equal to intersection, and the form is not nil, then the procedure goes to step 3210 to check what type of gridding has been performed. Otherwise, gridLocn takes the value of the current mouse location and the procedure jumps to do object gravity.

Referring to FIG. 32B, at step 3210, the gridding operation is checked by testing the value of griddedTo 1802. If the gridding is to a line or circle (griddedTo=line or circle), then there is partial gravity. If griddedTo 1802 is not equal to a line or a circle, then the gridding operation is to a point and no intersection work is indicated.

For gridding to a line, GetIntersectWithLine is called in step 3211 with the parameters form, edge, gridOrigin, gridLocn, and hitRegion4. gridOrigin and gridLocn are the two points which specify the line, while hitRegion4 specifies the hot zone with a four pixel radius. GetIntersectWithLine checks to see if the edge intersects with the line, both being within the hot zone of the mouse cursor location. If this occurs, then there is a hit (hit=true) and that location is returned to the variable gravityLocn.

In a similar manner, if gridding is to a circle, GetIntersectWithCircle is called in step 3212 with the same parameters as GetIntersectWithLine had. The origin of the circle is defined by gridOrigin and a point on the circle, gridLocn. If the edge and the circle are within the hot zone, then hit is set to true and that location is assigned to the variable gravityLocn. In the case of gridding to a point (otherwise case), hit is set to false in step 3213.

After the completion of the case statement, step 3214 tests if there is a hit. If this is true, then the gravity point is highlighted in step 3215. If there is no hit, then step 3215 is skipped. The procedure concludes by returning the gravity location (gravityLocn).

Figure 33:
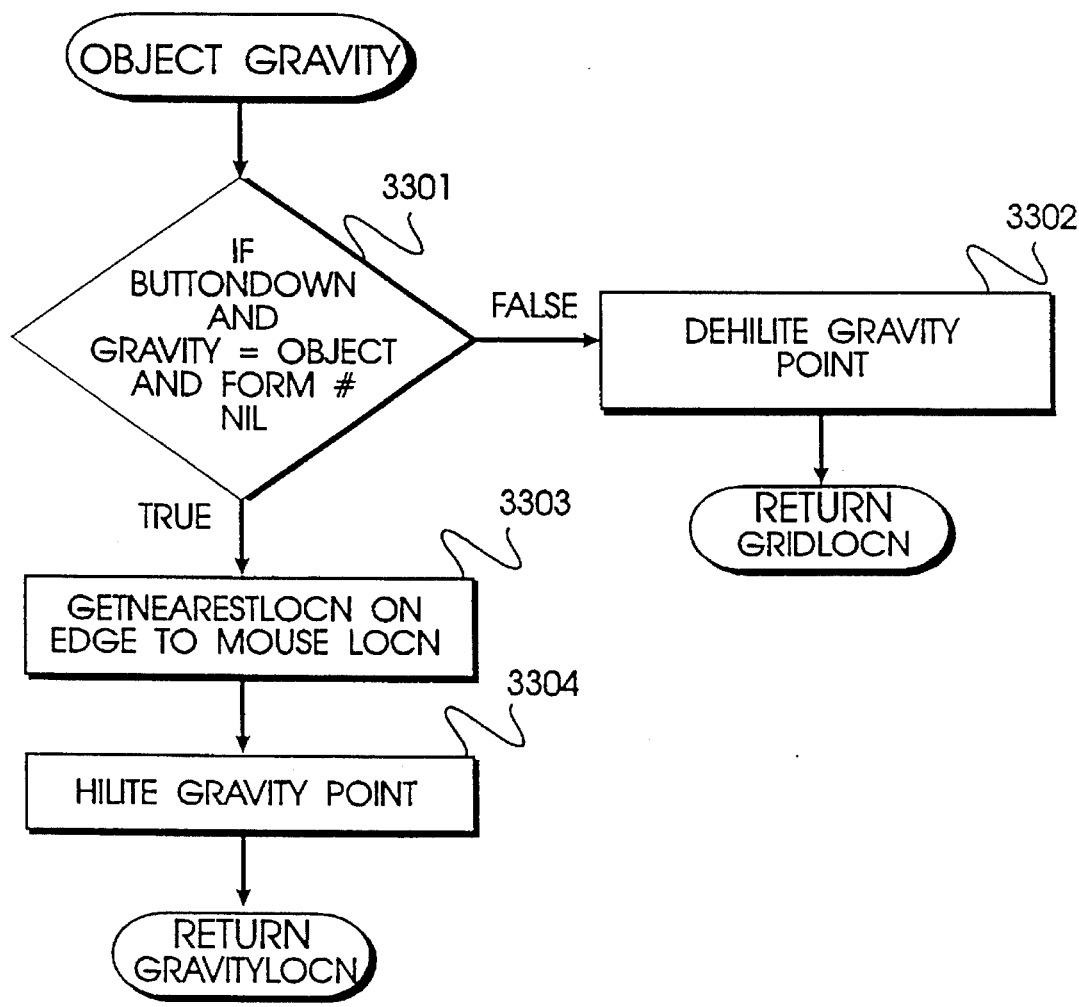
FIG. 33 is a flow chart of Object Gravity.

In step 2808 of DoGridAndGravity, Object Gravity is determined. FIG. 33 illustrates the determination of object gravity. In step 3301, if the mouse button is down and gravity is equal to object, and the form is not equal to nil, then the procedure continues to calculate object gravity. Otherwise, the procedure goes to step 3302 to de-highlight any gravity point that is set (by prior passes through DoGridAndGravity) and to return gridLocn.

Object gravity is calculated in step 3303 by GetNearestLocn. This procedure takes as its parameters form, edge, and Locn. The point on the edge of the form, which is nearest to the mouse location, is returned to the variable gravityLocn. In step 3304, this gravity point is highlighted. The procedure concludes by returning this gravity location.

Projection Planes

Next working in projection planes will be described in detail. On display 104, the user selects which plane of a cube face that he or she wishes to work in. To reflect the user's choice, the variable cubeFace is set in gridObject 1804. It can take the values of top, left, right, or any. Since the cubeFace is stored in gridObject 1804, it is available at any time regardless of the underlining geometry that the user has chosen.

Figure 34:
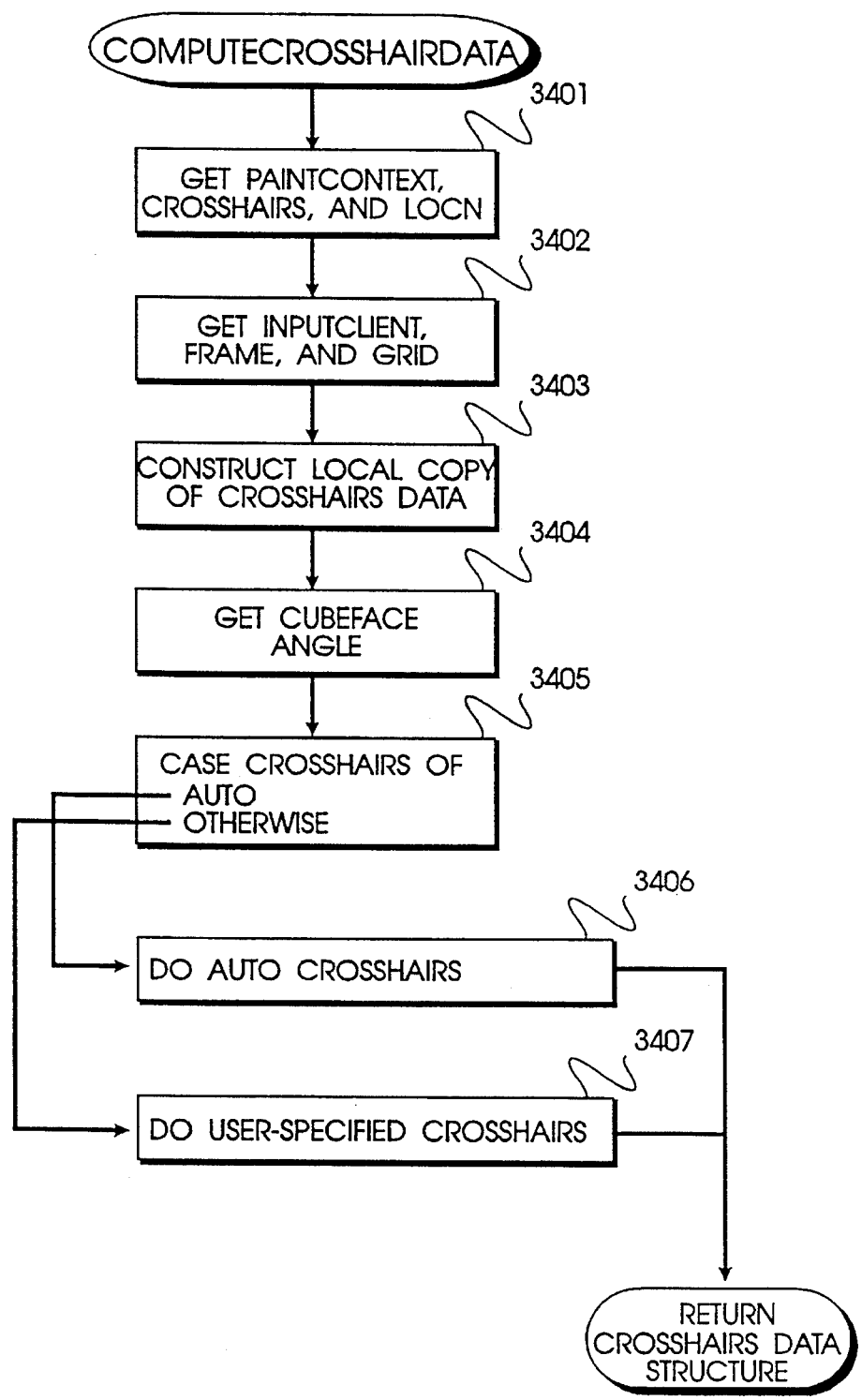
FIG. 34 is a flow chart of the ComputeCrosshairData procedure.

The preferred embodiment includes a method of displaying crosshairs which adheres to the underlying geometry. FIG. 34 illustrates this method which is accomplished by the ComputeCrosshairData procedure. In step 3401, the procedure accepts as parameters PaintContext, Crosshairs, and the current mouse location. "Crosshairs" is an enumerated variable representing the type of crosshairs: none, cartesian, cartesianH, cartesianV, polar, polarCircle, polarLine, or auto. The user can specify the type of crosshairs regardless of the underlying geometry. If the crosshairs are set to "auto," then system 100 calculates the crosshairs based upon the underlying geometry.

In step 3402, the procedure gets InputClient, frame, and grid data structures. In step 3403, local variables are defined so that a local copy of crosshairs data can be maintained. In step 3404, the two angles which define the current cube face are determined. This is done by calling GetGridHVAngles with grid and locn as parameters. This returns two angles which represent the horizontal and vertical angles that define the current cube face.

Step 3405 checks the type of crosshair in a case statement. If the crosshairs are set to auto, then in step 3406 the procedure calculates the crosshairs based on the underlying geometry. Otherwise, in step 3407 the crosshairs are computed from the type specified by the user. The procedure concludes by returning the crosshair data structure. This data structure contains Boolean variables specifying whether the crosshairs contain horizontal, vertical, or diagonal lines or a circle. If the crosshairs contain diagonal lines, starting and stop points are also specified.

Figure 35A:
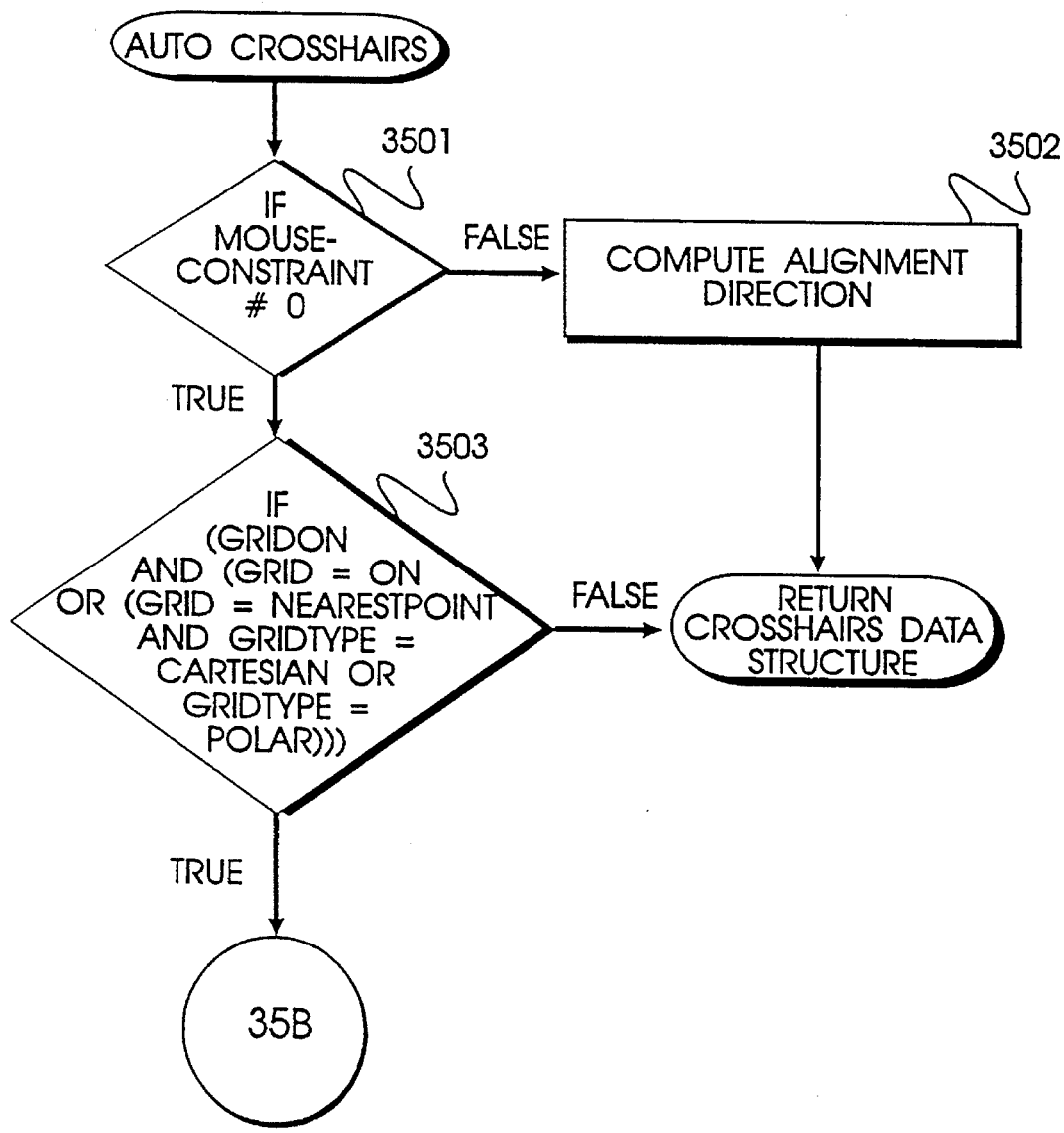
FIGS. 35A–B are a flow chart illustrating auto-crosshairs.
Figure 35B:
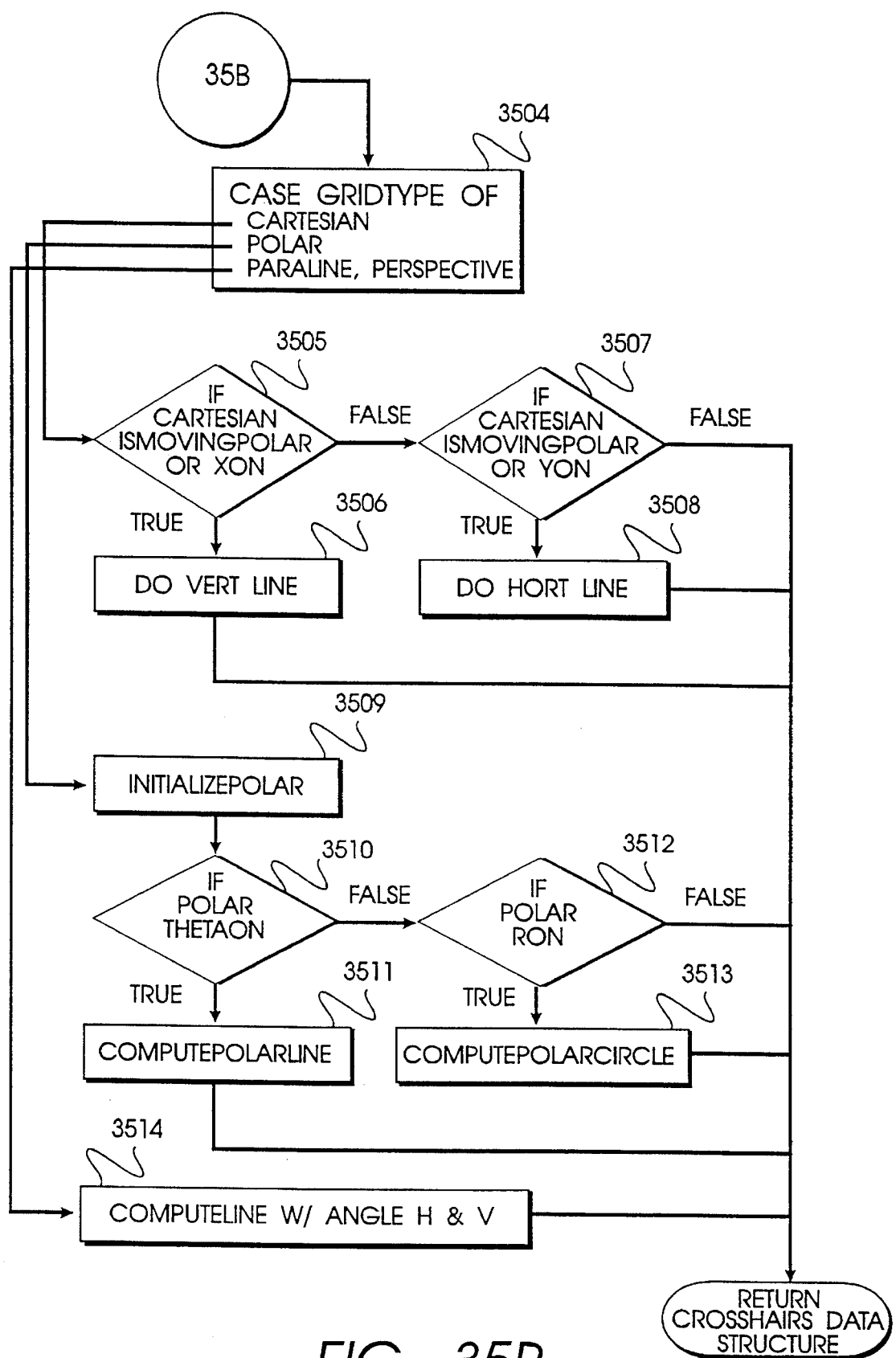

Referring to FIGS. 35A–B, the method for calculating auto crosshairs is illustrated. In step 3501, if there is an angular constraint then in step 3402 the procedure computes a single line indicating this alignment direction. This is done by calling the procedure GetFarthestAngle which calculates the farthest angle from the alignment angle of the two angles that define the cube face. This angle is passed to a procedure, ComputeLine, which computes the parameters to draw a crosshair line at the angle through the current mouse location.

Step 3503 checks if the grid is on by checking the value of GridOn and grid. It is necessary to check both of these variables as there are two places (FrameObject 1801 and InputClient) where gridding can be turned on. Step 3503 also checks whether grid is set to nearestPoint and whether the gridType is cartesian or polar. If this step is true, i.e., the user wants crosshairs controlled by the grid, then the gridType is checked by the case statement in step 3504. If the gridType is cartesian, then in step 3505 the procedure checks if the grid is moving (isMovingPolar) or if the horizontal grid is on (xOn). If either is true, then the procedures constructs a vertical line at step 3506. If the grid is moving or the vertical grid is on in step 507, then a horizontal line is constructed for the crosshairs in step 3508.

Thus, for x gridding a vertical line is shown, for y gridding a horizontal line is shown, and if the grid is a moving polar grid, both are shown. Horizontal gridding shows a vertical line because a vertical line best illustrates the horizontal snapping motion. Likewise, with a vertical grid a horizontal line is used to indicate the snapping. With a moving polar grid, the snapping is best illustrated by using both lines.

For crosshairs in polar grids in step 3504, the procedure branches to step 3509 to perform a polar initialization (InitializePolar) and at step 3510 check whether angular gridding is on (thetaOn). The procedure InitializePolar takes the grid center and computes the x and y components of the vector from the grid center to the mouse location. This is converted into screen coordinates using the viewing transformation and the result is assigned to the variables deltaXReal and deltaYReal. The grid center is also transformed into screen coordinates and assigned to the variable center. If angular gridding is on, then a radial line is computed at step 3511 which originates at the polar origin. At step 3512, if distance gridding is on (rOn), then the procedure computes the polar circle at step 3513.

If in step 3504 the grid type is either paraline or perspective, then in step 3514 the procedure computes the horizontal and vertical lines for the cube face. This is accomplished by using angleH and angleV, which are computed earlier in GetGridHVAngles, to yield two diagonal lines for the horizontal and vertical directions of the cube face. The procedure concludes by returning the crosshairs data structure.

Figure 36:
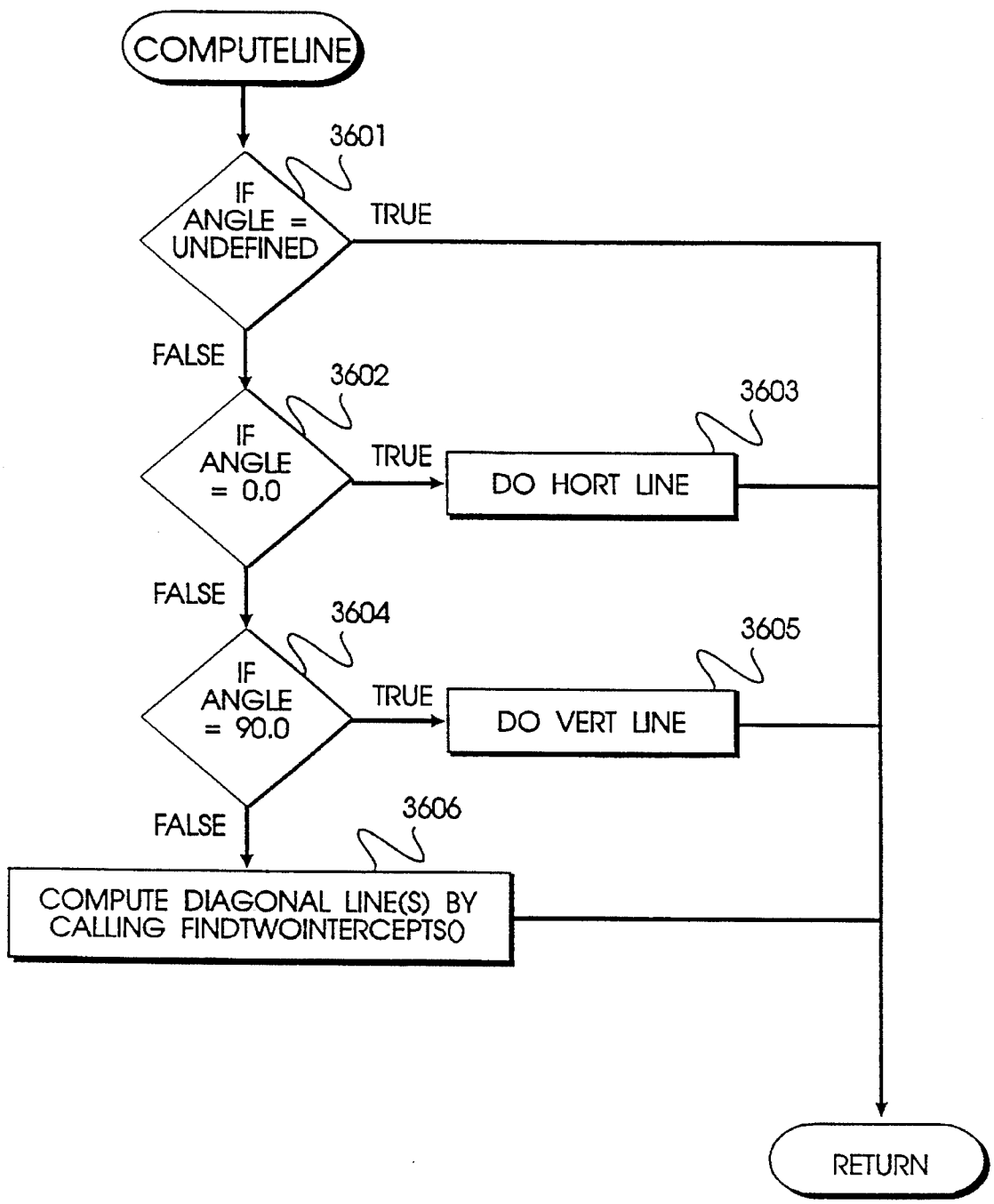
FIG. 36 is a flow chart of the ComputeLine procedure.

FIG. 36 illustrates the ComputeLine procedure used by ComputeCrosshairsData. In step 3601, if angle (angle returned by GetFarthestAngle for auto crosshairs) is undefined, then the procedure returns. In step 3602, if angle is zero, then a horizontal line is passed through the mouse location (doHLine=true) at step 3603. In step 3604, if angle equals 90.0 degrees, i.e., vertical, then a vertical line is passed through the mouse place (doVLine=true) at step 3605.

If the angle is neither horizontal nor vertical, then in step 3606 the procedure computes the diagonal lines which define the crosshairs by calling the procedure FindTwoIntercepts. If the mouse location is within a defined clipping box, then the procedure FindTwoIntercepts sets the Boolean variable doDiagonal to true and specify two points on a diagonal line. If this procedure is called a second time, then FindTwoIntercepts returns two points which define a second diagonal line. This procedure is called twice in paraline and perspective, hence, a maximum of two diagonal lines can be returned. However, one or both of the diagonal lines can be horizontal or vertical. Hence, FindTwoIntercepts finds the diagonal line(s) which passes through the mouse location and the edge of the clipping box.

ComputePolarLine 3511, used in ComputeCrosshairsData, is similar to ComputeLine except that it check whether the center point is within the clipping box. If the center point is within the box, then one line intersection is computed by calling the FindTwoIntercepts procedure. ComputePolarCircle 3513, used in ComputeCrosshairsData, computes the distance from the grid origin to the mouse location and assigns it to a variable, radius. A Boolean variable, doCircle, is set to true.

In the preferred embodiment, the graphic primitives can be constrained to a user-specified cube face. Specifically, newly created objects are projected into the specified face or plane. For example, to construct a rectangle, system 100 actually constructs a parallelogram which is defined by three points. Two of these points, which are the corners of the parallelogram, are specified by the user, and a third is calculated by system 100. For a simple rectangle, the horizontal component of one point (pointA.x) and the vertical component of another point (pointB.y) are used to specify the rectangle. Similarly, an ellipse is constructed by defining a parallelogram which circumscribes the ellipse. By using a parallelogram data structure, the transformation of objects from orthographic to paraline projection is simplified.

Figure 37:
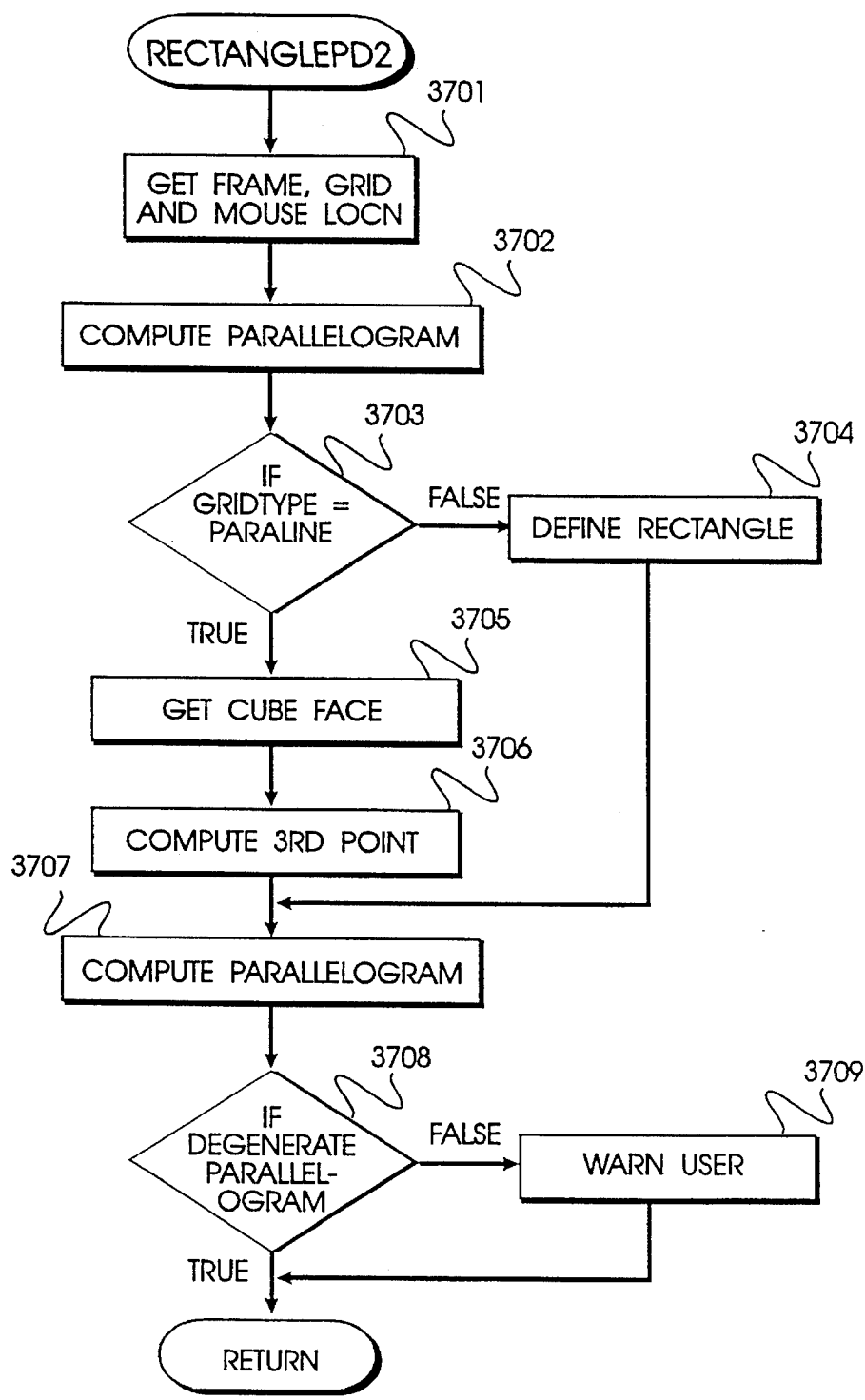
FIG. 37 is a flow chart of the RectanglePD2 procedure.

FIG. 37 illustrates the construction of a rectangle by the procedure RectanglePD2. In step 3701, the procedure gets the frame, grid, and mouse location. Here, the mouse location is the location where the user click the mouse button for the second point of a rectangle. In step 3702, the procedure computes the first two points (pointA, point B) which define the parallelogram or rectangle. In step 3703 if gridType is paraline, then the procedure continues to step 3705 to get the two angles which define the cube face. This is done by calling GetGridHVAngles. In step 3706 these two angles, along with the two user-specified points, are used by the procedure IntersectLineLine to calculate the third point for the parallelogram (pointC).

However, if in step 3703 the gridType is not equal to paraline, then in step 3704 the procedure defines a rectangle by setting pointB equal to the horizontal component of pointA and the vertical component of pointC:

pointB.x, pointB.y=pointA,x, pointC.y

In step 3707, a parallelogram is constructed from the three specified points. In step 3708, if the parallelogram is degenerate (i.e., almost collapsed), then a warning message is given to the user in step 3709. Otherwise, step 3709 is skipped. The procedure concludes and returns at this point.

The construction of an ellipse is similar to that of a rectangle since the data structure (parallelogram) is the same. A procedure, CreateEllipse, is called by the procedure EllipsePD2 with pointA, pointB, and pointC to create an ellipse. To create an arc, three points are used to specify an ellipse on which the arc lies, and two more points are used to specify the beginning and ending points of the arc.

Transformations in Projection Plane

Figure 38:
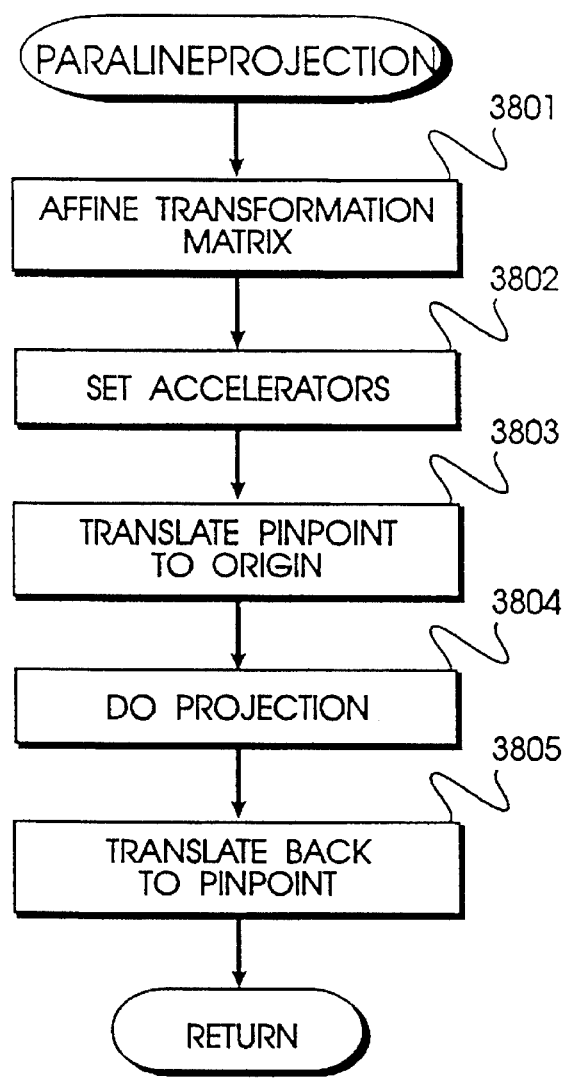
FIG. 38 is a flow chart illustrating ParalineProjection.

The transformations in projection planes will now be described in detail. FIG. 38 illustrates the paraline projection transformation. The ParalineProjection procedure is the workhorse for orthographic-to-paraline projections, as well as for transformations within the paraline geometry. In step 3801, the procedure takes the two angles that define the cube face and computes the projection transformation matrix. In step 3802, the procedure sets up acceleration variables to check whether a floating point operation is needed. For example, if a value in the matrix is equal to 1, then multiplication (floating point operation) is not needed. It is much faster to check a Boolean variable than to execute a floating point operation.

In step 3803, the "pinpoint" of the transformation is translated to the origin. This allows for paraline projection transformations from points other than the origin. Step 3804 performs the actual paraline projection transformation based upon the matrix that is calculated in step 3801. In step 3805, a translation back to the pinpoint is performed to restore the projection back to its proper location. The procedure concludes by returning the matrix that is calculated.

Figure 39:
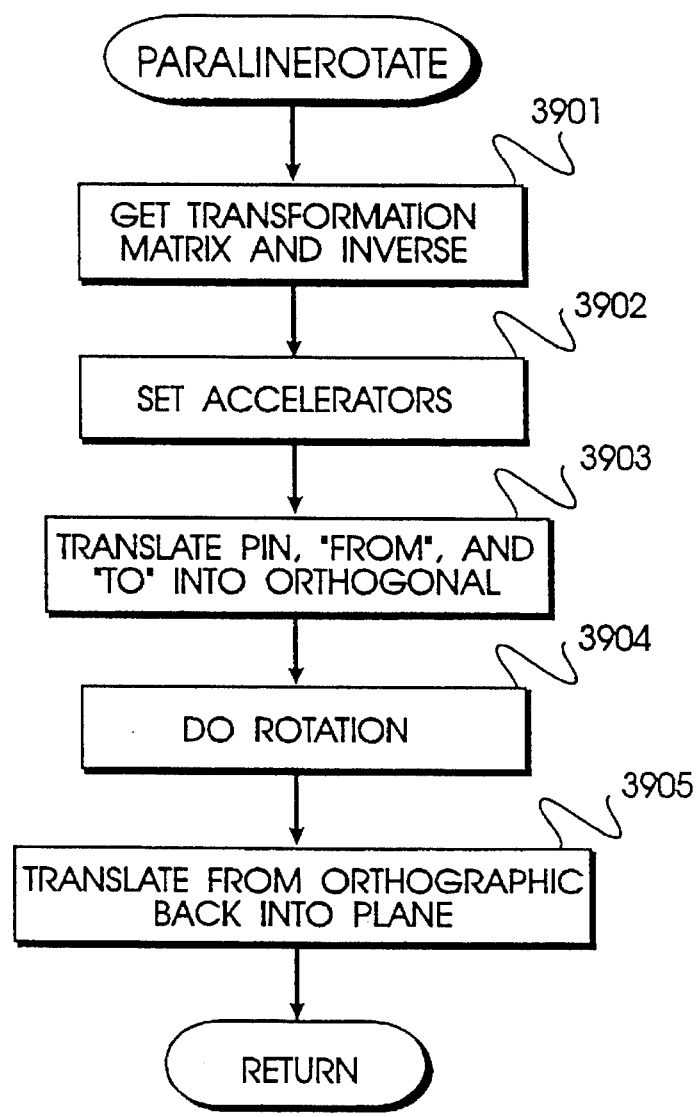
FIG. 39 is a flow chart illustrating ParalineRotate.

FIG. 39 illustrates a rotation transformation in paraline geometry performed by ParalineRotate. In step 3901, the affine transformation matrix and its inverse are defined. In step 3902, Boolean accelerators are set up. Step 3903 illustrates the parameters that are used to specify the rotate transformation. The angle of transformation is specified by the variables "from" and "to." Generally "from" is the guide point and "to" is the cursor location. In addition, the variable "pin" describes the axis of rotation. In step 3903, these variables are transformed into orthogonal coordinates.

In step 3904, the rotation transformation is performed by a procedure, RotateLocn, with the parameters pin, from, and to. In step 3905, the coordinates are transformed from orthographic back into the original paraline plane coordinates. ParalineRotate concludes by returning this matrix. In the preferred embodiment, other transformations (such stretch, flip, shear, and move) are accomplished in a similar manner.

While the invention is described in some detail with specific reference to a single preferred embodiment and certain alternatives, there is no intent to limit the invention to that particular embodiment or those specific alternatives. The true scope of the invention is defined not by the foregoing description but by the following claims.

What is claimed is:

1. In a computer-aided drawing system having a display and a cursor-control means for positioning a cursor on the display, a method for assisting the creation and editing of illustrations comprising the steps of:

selecting a geometric mode from a set of geometric modes, at least one of the geometric modes of said set of geometric modes being adapted to facilitate drawing in two dimensions a two-dimensional representation of a three-dimensional object;

displaying on said display a grid representing the selected geometric mode, the grid having an origin;

placing a control point at a position on the displayed grid, said position being a point on said grid nearest to the cursor; and moving automatically the grid origin to the placed control point.

2. The method of claim 1 wherein said set of geometric modes includes a geometric mode selected from the group consisting of linear, polar, paraline, and perspective geometric modes.

3. The method of claim 1 further comprising:

displaying a crosshairs representing the selected geometric mode.

4. The method of claim 1 further comprising:

placing a second control point at a second position on the displayed grid, thereby defining a user-specified angle;

setting an angle with respect to an axis of the displayed grid, the angle being equal to the user-specified angle, the angle representing a directional constraint; and constraining a next control point to lie at a position corresponding to the cursor on a line passing through the origin of the displayed grid and having a direction defined by the directional constraint.

5. The method of claim 1 wherein said selected geometric mode is a paraline geometric mode that defines three angles, and further comprising the step of:

using the moved grid origin, a grid distance unit, and said three angles to determine a moved grid.

6. The method of claim 1 wherein said selected geometric mode is a perspective geometric mode that defines at least one vanishing point, and further comprising the step of:

using a line passing through the moved grid origin and said at least one vanishing point to define said perspective geometric mode.

7. The method of claim 1 wherein said at least one geometric mode adapted to facilitate drawing in two dimensions a two-dimensional representation of a three-dimensional object is selected from the group consisting of paraline and perspective geometric modes.

8. In a computer-aided drawing system having a display and a cursor-control means for positioning a cursor on the display, a method for assisting the creation and editing of illustrations comprising the steps of:

selecting a geometric mode from a set of geometric modes, at least one of the geometric modes of said set of geometric modes being adapted to facilitate drawing in two dimensions a two-dimensional representation of a three-dimensional object;

displaying on said display a grid and at least one object, said grid representing said selected geometric mode;

setting a hit radius equal to a particular distance from said cursor;

if a portion of said at least one object is located within the hit radius of the cursor, testing said portion of said at least one object for an intersection with said grid, said intersection being located within said hit radius of the cursor; and if said intersection is found, constraining a control point to lie at a position on said intersection.

9. The method of claim 8 further comprising:

if said intersection is found, highlighting on said display said intersection as feedback to a user.

10. In a computer-aided drawing system having a display and a cursor-control means for positioning a cursor on the display, said cursor being suited for placing control points, a method for assisting a user in the creation and editing of illustrations comprising the steps of:

(a) providing the user with an ability to select a geometric mode from a set of geometric modes, and displaying a grid representing the selected geometric mode on the display device responsively to an exercise by the user of said selecting ability;

(b) providing the user with an ability to specify an arbitrary angle representing a directional constraint, and selecting said angle responsively to an exercise by the user of said specifying ability;

(c) setting a hit radius equal to a particular distance from said cursor;

(d) displaying on said display at least one object capable of being described by a plurality of control points; and (e) if a portion of said at least one object is located within the hit radius of the cursor, testing said portion of said at least one object for a first point representing at least one of said plurality of control points located within said hit radius of said cursor, and if said first point is found, constraining a next control point to lie at a position corresponding to said first point;

if said first point is not found, testing said portion of said at least one object for a second point representing an intersection with at least one other object, said second point being located within said hit radius of said cursor, and if said second point is found, constraining a next control point to lie at a position corresponding to said second point;

if said second point is not found, testing said portion of said at least one object for a third point representing an intersection with a line passing through a point of origin and having a direction defined by said angle, said point of origin being the origin of the displayed grid if said geometric mode was selected, said third point being located within said hit radius of said cursor, and if said third point is found, constraining a next control point to lie at a position corresponding to said third point;

if said third point is not found, testing said portion of said at least one object for a fourth point representing an intersection with said grid, said fourth point being located within said hit radius of said cursor, and if said fourth point is found, constraining a next control point to lie at a position corresponding to said fourth point; and if said fourth point is not found, constraining a next control point to lie at a position corresponding to said at least one object that is closest to said cursor.

11. In a computer-aided drawing system having a display and a cursor-control means for positioning a cursor on the display, said cursor being suited for placing a plurality of control points, a method for assisting a user in the creation and editing of illustrations by constraining the placement of said plurality of control points comprising the steps of:

defining a plurality of planes representing a projection from three dimension into two dimensions by a cube having a plurality of faces;

selecting one of said faces; and constraining said plurality of control points to lie in a plane defined by said selected face;

wherein said constraining step comprises:

selecting an object on said display in said plane;

selecting a transformation mode adapted to facilitate a graphical transformation of said selected object;

placing at least one control point at a position in said plane; and in response to said placed control point, effecting said graphical transformation on said selected object according to said selected transformation mode in said plane.

12. The method of claim 11 wherein said graphical transformation is an affine transformation.

13. The method of claim 11 wherein said graphical transformation is selected from the group consisting of stretch, shear, flip, scale, rotate, and move transformations.

14. A computer-aided drawing system comprising:

a computer having a memory and a processor;

a display device coupled to said computer;

a cursor-control device coupled to said computer for moving a cursor on said display device;

means for selecting a geometric mode from a set of geometric modes including a geometric mode selected from the group consisting of linear, angular, paraline, and perspective geometric modes;

means for displaying a grid representing the selected geometric mode on the display device, the grid having an origin;

means for placing a control point at a position on the displayed grid nearest to the cursor; and means for moving the grid origin to the placed control point in response to said placing means.

15. A computer-aided drawing system comprising:

a computer having a processor and a memory;

a display coupled to said computer for displaying illustrations to a user;

a cursor-control means for positioning a cursor on the display, said cursor being suited for placing control points;

means for optionally selecting a geometric mode from a set of geometric modes and displaying a grid representing the selected geometric mode on the display;

means for optionally selecting a user-specified angle representing a directional constraint;

means for setting a hit radius equal to a particular distance from said cursor;

means for displaying on said display at least one object capable of being described by a plurality of control points;

means, responsive to whether a portion of said at least one object is located within the hit radius of the cursor, for testing said portion of said at least one object for a first point representing at least one of said plurality of control points located within said hit radius of said cursor, and if said first point is found, constraining a next control point to lie at a position corresponding to said first point;

means, responsive to said first point's not being found, for testing said portion of said at least one object for a second point representing an intersection with at least one other object, said second point being located within said hit radius of said cursor, and if said second point is found, constraining a next control point to lie at a position corresponding to said second point;

means, responsive to said second point's not being found, for testing said portion of said at least one object for a third point representing an intersection with a line passing through a point of origin and having a direction defined by said directional constraint, said point of origin being the origin of the displayed grid if said geometric mode was selected, said third point being located within said hit radius of said cursor, and if said third point is found, constraining a next control point to lie at a position corresponding to said third point;

means, responsive to said third point's not being found, for testing said portion of said at least one object for a fourth point representing an intersection with said grid, said fourth point being located within said hit radius of said cursor, and if said fourth point is found, constraining a next control point to lie at a position corresponding to said fourth point; and means, responsive to said fourth point's not being found, for constraining a next control point to lie at a position corresponding to said at least one object that is closest to said cursor.

16. In a computer-aided drawing system having a display and a cursor-control means for positioning a cursor on the display, a method for assisting the creation and editing of illustrations with directional constraints comprising the steps of:

selecting an arbitrary angle representing a directional constraint; and constraining a control point to lie at a position that is:
on a line passing through a point of origin and having a direction defined by the directional constraint, and
aligned with the cursor in an alignment selected from the group consisting of horizontal alignment and vertical alignment, said alignment selected consistently with placing said control point as near as possible to the cursor.

17. In a computer-aided drawing system having a display and a cursor-control means for positioning a cursor on the display, a method for assisting the creation and editing of illustrations comprising the steps of:

selecting a geometric mode from a set of geometric modes, at least one of the geometric modes of said set of geometric modes being adapted to facilitate drawing in two dimensions a two-dimensional representation of a three-dimensional object;

displaying on said display a grid representing the selected geometric mode; and using the cursor to place a control point in relation to the displayed grid.

18. A computer-aided drawing system comprising:

a computer having a memory and a processor;

a display device coupled to said computer;

a cursor-control device coupled to said computer for moving a cursor on said display device;

means for selecting a geometric mode from a set of geometric modes, at least one of the geometric modes of said set of geometric modes being adapted to facilitate drawing in two dimensions a two-dimensional representation of a three-dimensional object;

means for displaying a grid representing the selected geometric mode on the display device; and means, responsive to the selected geometric mode, for placing a control point in relation to the displayed grid.

19. In a computer-aided drawing system having a display and a cursor-control means for positioning a cursor on the display, said cursor being suited for placing control points, a method for assisting a user in the creation and editing of illustrations by constraining the placement of said plurality of control points comprising the steps of:

defining a plurality of planes to represent a projection from three dimensions into two dimensions;

selecting a plane from said plurality of planes;

selecting an object on said display in said selected plane;

selecting an affine transformation mode for effecting an affine transformation of said selected object;

placing at least one control point at a position in said selected plane;

performing a coordinate system transformation of said at least one control point and said selected object from a coordinate system of said selected plane to an orthogonal coordinate system;

in response to said at least one control point, effecting said affine transformation in said orthogonal coordinate system on said selected object; and performing a coordinate system transformation of said selected object from said orthogonal coordinate system to said coordinate system of said selected plane.

20. In a computer-aided drawing system having a display and a cursor-control means for positioning a cursor on the display, said cursor being suited for placing control points, a method for assisting a user in the creation and editing of illustrations by constraining the placement of said plurality of control points comprising the steps of:

defining a plurality of planes to represent a projection from three dimensions into two dimensions;

selecting a plane from said plurality of planes;

selecting an arbitrary angle representing a directional constraint;

performing a coordinate system transformation of said angle from a coordinate system of said selected plane to an orthogonal coordinate system;

constraining at least one control point to lie in said selected plane according to said angle; and performing a coordinate system transformation from said orthogonal coordinate system to said coordinate system of said selected plane.

21. The method of claim 20 further comprising the steps of:

performing a coordinate system transformation of:
a horizontal direction, and
a vertical direction, from said coordinate system of said selected plane to said orthogonal coordinate system;

further constraining said at least one control point to lie at a position that is aligned with the cursor in an alignment selected from the group consisting of horizontal alignment and vertical alignment, said alignment selected consistently with placing said at least one control point as near as possible to the cursor.

22. In a computer-aided drawing system having a display and a cursor-control means for positioning a cursor on the display, said cursor being suited for placing control points, a method for assisting a user in the creation and editing of illustrations comprising the steps of:

(a) providing the user with an ability to select a geometric mode from a set of geometric modes, and displaying a grid representing said selected geometric mode on the display device responsively to an exercise by the user of said selecting ability;

(b) providing the user with an ability to specify an angle representing a directional constraint, and selecting said angle responsively to an exercise by the user of said specifying ability;

(c) setting a hit radius equal to a particular distance from said cursor;

(d) if said angle is selected, constraining a next control point to lie at a position corresponding to the cursor on a line passing through the origin of the displayed grid and having a direction defined by the directional constraint;

(e) if a portion of at least one object capable of being described by a plurality of control points is displayed on said display within the hit radius of the cursor, testing said portion of said at least one object for a first point representing at least one of said plurality of control points located within said hit radius of the cursor, and if said first point is found, constraining a next control point to lie at a position corresponding to said first point;

if said first point is not found, testing said portion of said at least one object for a second point representing an intersection with at least one other object, said second point being located within said hit radius of the cursor, and if said second point is found, constraining a next control point to lie at a position corresponding to said second point;

if said second point is not found, testing said portion of said at least one object for a third point representing an intersection with a line passing through a point of origin and having a direction defined by said directional constraint, said point of origin being the origin of the displayed grid if said geometric mode was selected, said third point being located within said hit radius of the cursor, and if said third point is found, constraining a next control point to lie at a position corresponding to said third point;

if said third point is not found, testing said portion of said at least one object for a fourth point representing an intersection with said grid, said fourth point being located within said hit radius of the cursor, and if said fourth point is found, constraining a next control point to lie at a position corresponding to said fourth point; and if said fourth point is not found, constraining a next control point to lie at a position corresponding to said at least one object that is closest to said cursor;

(f) if said at least one object is not displayed within the hit radius of the cursor and said geometric mode is selected, placing a next control point corresponding to a position on said grid, said position being a point on said grid nearest to the cursor; and (g) if said geometric mode is not selected, placing a next control point corresponding to the cursor.

* * * * *